United States Patent
Arbeiter et al.

[11] Patent Number: 6,055,882
[45] Date of Patent: May 2, 2000

[54] TWIST-GRIP SHIFTER FOR BICYCLES

[75] Inventors: Markus Arbeiter, Würzburg; Nico Lemmens, Bergrheinfeld, both of Germany

[73] Assignee: Fichtel & Sachs AG, Germany

[21] Appl. No.: 08/844,099

[22] Filed: Apr. 25, 1997

Related U.S. Application Data

[63] Continuation of application No. 08/610,620, Mar. 4, 1996, abandoned, which is a continuation of application No. 08/566,284, Dec. 1, 1995, Pat. No. 5,666,859, and application No. 08/563,996, Nov. 29, 1995, Pat. No. 5,588,925
[60] Provisional application No. 60/004,006, Sep. 20, 1995.

[51] Int. Cl.$^7$ ..................................................... G05G 11/00
[52] U.S. Cl. ........................... 74/489; 74/502.2; 264/255; 264/513
[58] Field of Search ............................. 74/489, 488, 485, 74/500.5, 501.6, 502.2; 264/255, 328.1, 513

[56] References Cited

U.S. PATENT DOCUMENTS

| | | |
|---|---|---|
| D. 269,850 | 7/1983 | Preisler et al. . |
| D. 298,309 | 11/1988 | Coue . |
| D. 299,333 | 1/1989 | Coue . |
| D. 324,634 | 3/1992 | Chen . |
| D. 351,776 | 10/1994 | Schuchard et al. . |
| 2,862,401 | 12/1958 | Gwin, Jr. . |
| 3,218,879 | 11/1965 | Reed . |
| 4,021,524 | 5/1977 | Grimsley . |
| 4,232,565 | 11/1980 | Leonheart . |
| 4,686,865 | 8/1987 | Rivera . |
| 4,785,495 | 11/1988 | Dellis ....................................... 16/111 |
| 4,885,121 | 12/1989 | Patel . |
| 4,900,291 | 2/1990 | Patterson . |
| 4,938,733 | 7/1990 | Patterson . |
| 4,945,785 | 8/1990 | Romano . |
| 5,030,406 | 7/1991 | Sorensen . |
| 5,102,372 | 4/1992 | Patterson et al. . |
| 5,134,897 | 8/1992 | Romano . |
| 5,155,878 | 10/1992 | Dellis . |

(List continued on next page.)

FOREIGN PATENT DOCUMENTS

| | | |
|---|---|---|
| 0671315 | 9/1995 | European Pat. Off. . |
| 2540818 | 8/1984 | France . |
| 2657062 | 7/1991 | France . |
| 2817627 | 11/1978 | Germany . |
| 3215426 | 10/1983 | Germany . |
| 3215427 | 10/1983 | Germany . |
| 8504060 | 12/1985 | Germany . |
| 3823741 | 1/1989 | Germany . |
| 3727933 | 3/1989 | Germany . |
| 9412207 | 2/1995 | Germany . |
| 29502403 | 6/1995 | Germany . |
| 0180484 | 8/1962 | Sweden . |
| 9319977 | 10/1992 | WIPO . |
| 9318960 | 9/1993 | WIPO . |
| 9318961 | 9/1993 | WIPO . |

OTHER PUBLICATIONS

U.S. application No. 8,610,665, Neumann, filed Mar. 1996.
U.S. application No. 8,610,651, Arbeiter, filed Mar. 1996.
U.S. application No. 8,610,657, Arbeiter, filed Mar. 1996.

*Primary Examiner*—Charles A. Marmor
*Assistant Examiner*—David Fenstermacher
*Attorney, Agent, or Firm*—Nils H. Ljungman and Associates

[57] ABSTRACT

A twist-grip shifter for bicycles having a twist grip, which twist grip includes an outer grip part and an inner twist part. The twist grip has an area with a small diameter, a transitional area, and an area with a large diameter, and the twist grip can be positively and detachably connected to a twist grip shifter in the axial direction. The twist grip can have an elastic rubber grip part and a non-elastic rotary part, and can have a surface structure with root-like, sharp ribs on the external surface of the grip part. The surface structure on the grip part has the advantage that the fins or peaks extend axially along the surface lines, and fit into the bends underneath the joints of the index finger, to essentially guarantee the optimum transmission of torque from the hand of the rider to the twist grip.

20 Claims, 39 Drawing Sheets

U.S. PATENT DOCUMENTS

| | | |
|---|---|---|
| 5,197,927 | 3/1993 | Patterson et al. . |
| 5,241,877 | 9/1993 | Chen . |
| 5,298,215 | 3/1994 | Krause . |
| 5,315,891 | 5/1994 | Tagawa . |
| 5,390,565 | 2/1995 | Tagawa et al. . |
| 5,421,219 | 6/1995 | Tagawa et al. . |
| 5,496,863 | 3/1996 | Kitagawa et al. .................... 521/50.5 |
| 5,588,925 | 12/1996 | Arbeiter et al. ......................... 474/81 |

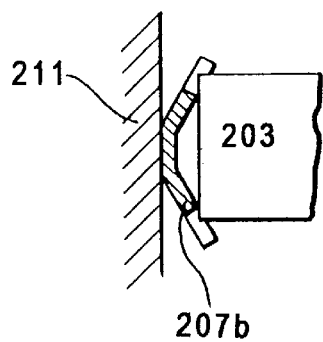
FIG. 8
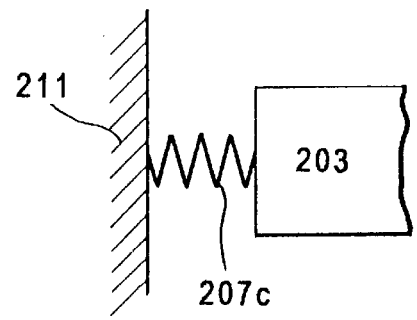
FIG. 9
FIG. 10
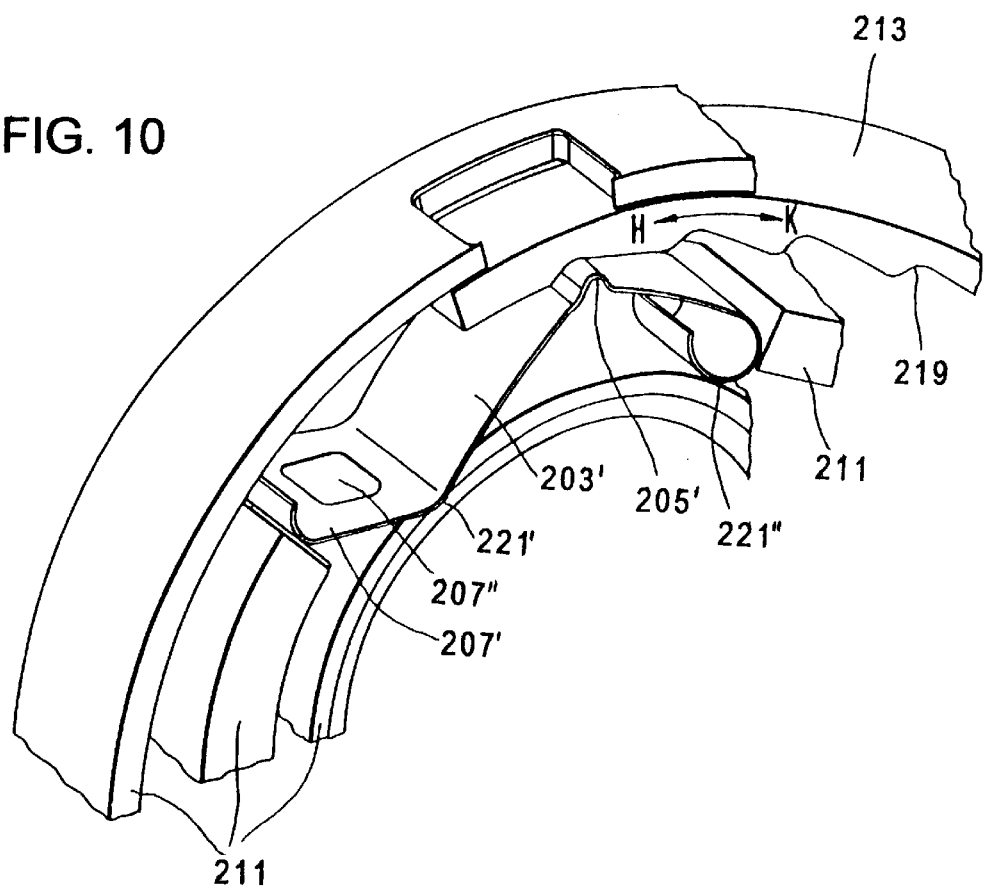

A-A

B

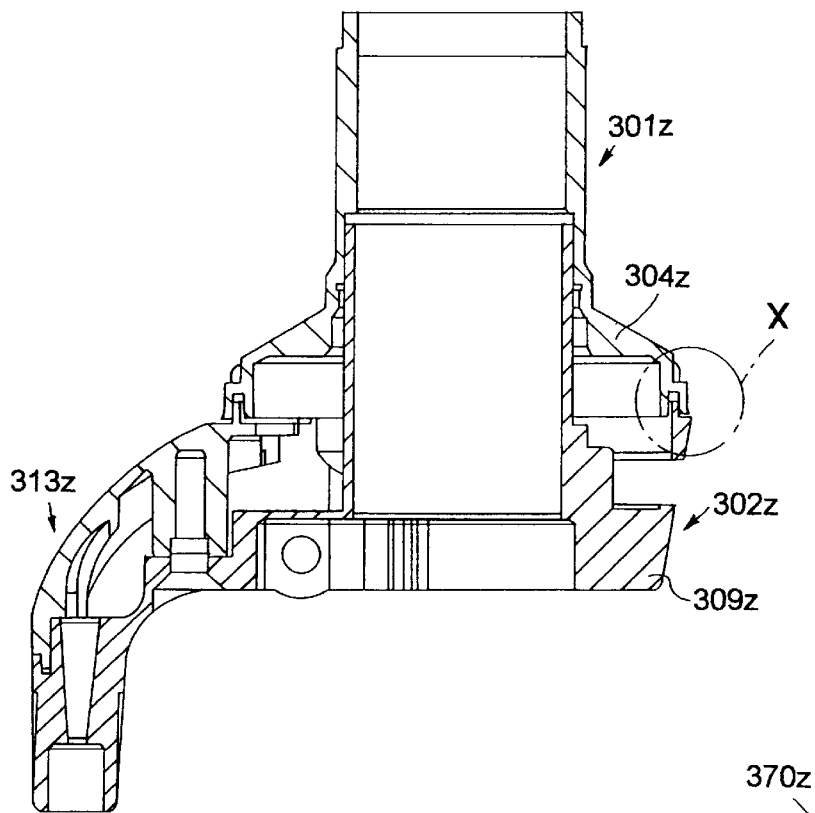
FIG. 34
FIG. 35
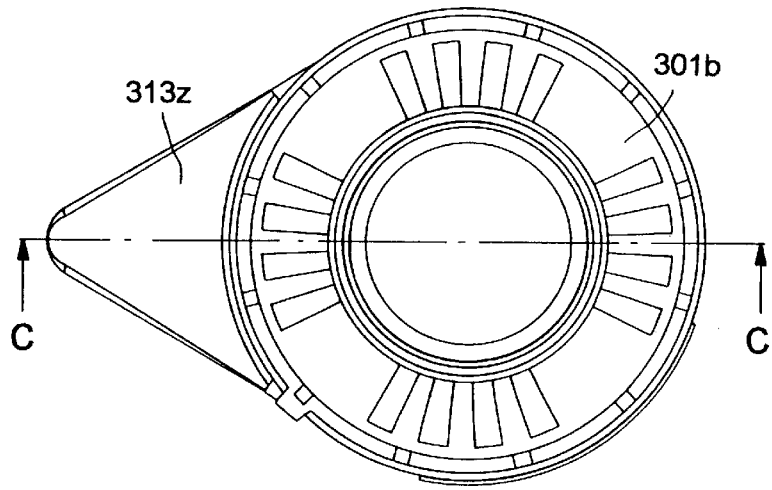
FIG. 36

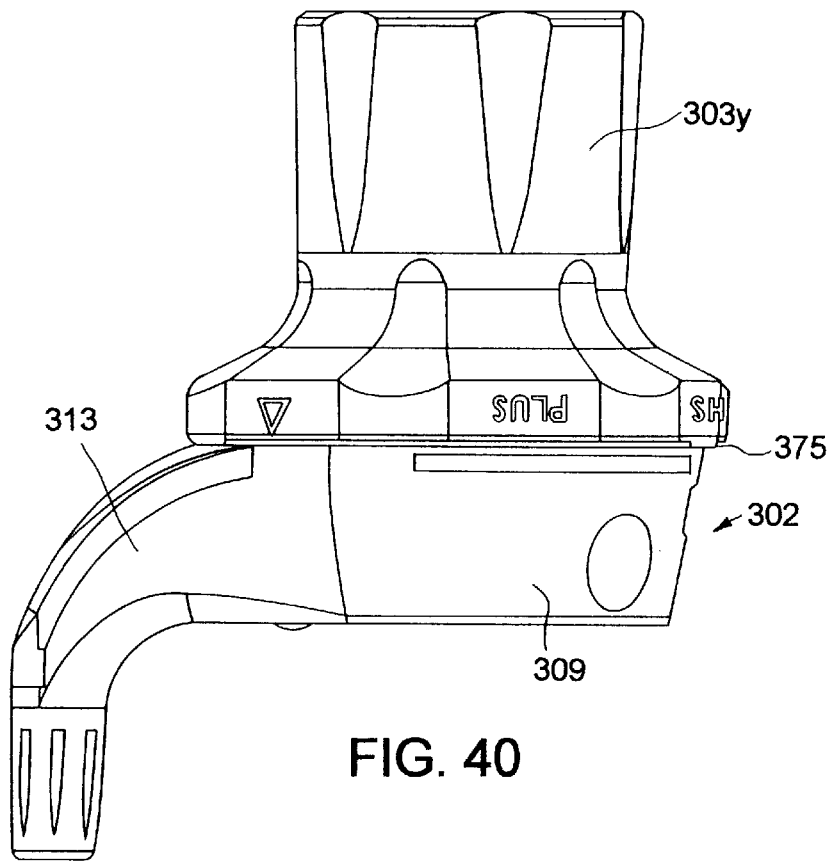
FIG. 40
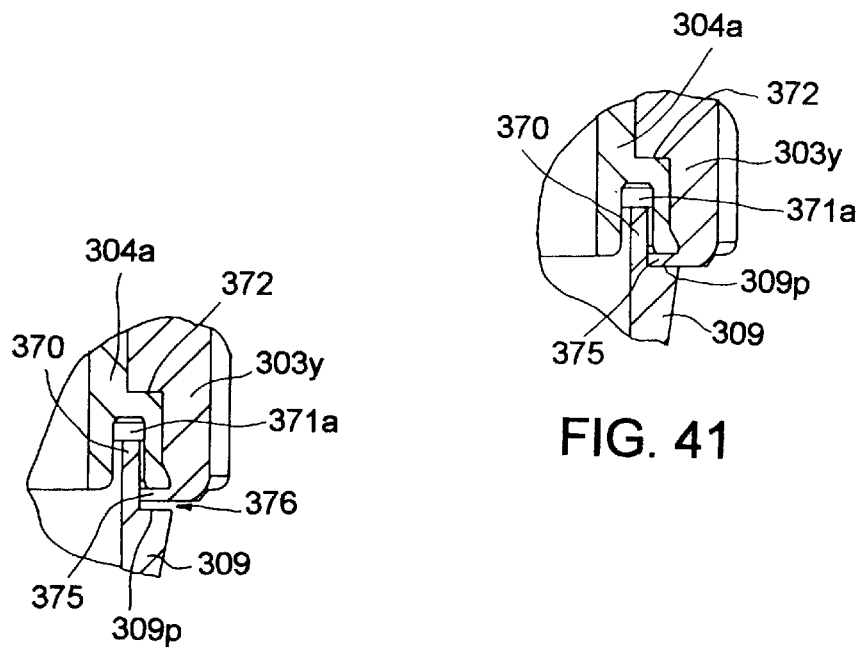
FIG. 41
FIG. 41a

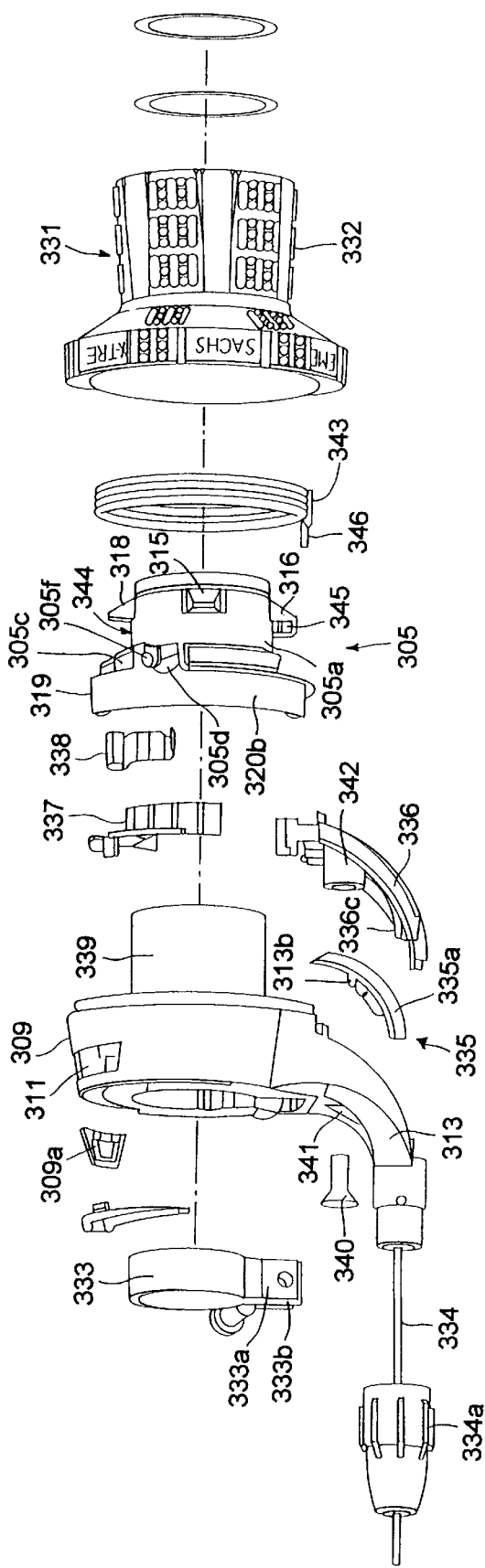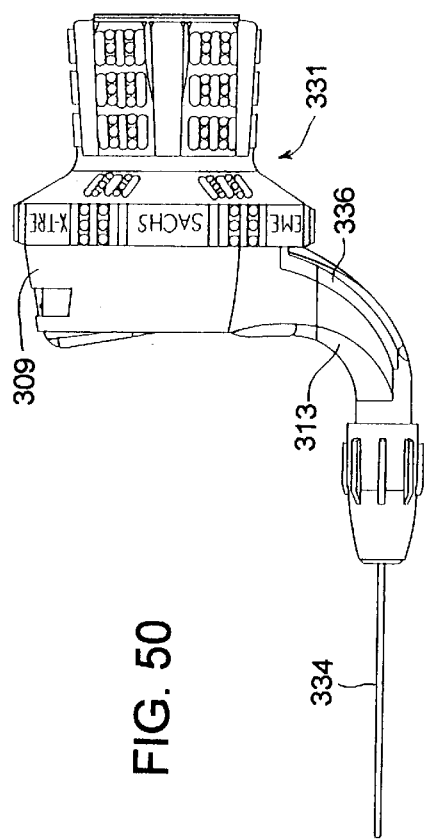
FIG. 49
FIG. 50

TWIST-GRIP SHIFTER FOR BICYCLES

This application is a continuation of U.S. patent application Ser. No. 08/610,620, which was filed on Mar. 4, 1996. U.S. patent application Ser. No. 08/610,620 was pending as of the filing date of the present application, and has since been abandoned. U.S. patent application Ser. No. 08/610,620 claimed continuing status from U.S. patent application Ser. No. 08/566,284, which was filed on Dec. 1, 1995, and also from U.S. patent application Ser. No. 08/563,996, which was filed on Nov. 29, 1995 and U.S. Provisional Application Serial No. 60/004,006, which was filed on Sep. 20, 1995. U.S. patent application Ser. Nos. 08/566,284, 08/563,996 and 60/004,006 were pending as of the filing date of U.S. patent application Ser. No. 08/610,620. U.S. patent application Ser. No. 08/566,284 issued on Sep. 16, 1997 as U.S. Pat. No. 5,666,859, U.S. patent application Ser. No. 08/563,996 issued on Dec. 31, 1996 as U.S. Pat. No. 5,588,925, and U.S. patent application Ser. No. 60/004,006 is abandoned.

BACKGROUND OF THE INVENTION

1. Field of the Invention

The present invention generally relates to a twist grip for a twist-grip shifter for bicycles.

2. Background Information

A twist-grip shifter can typically be located on the handlebar of a bicycle, adjacent a fixed hand grip. The type of twist-grip shifter to which the present invention relates can be utilized by the rider to change gears of the transmission of the bicycle, in order to adjust for varying riding surface conditions, such as the grade and evenness of the riding surface. The twist-grip shifter can be disposed adjacent the part of the handlebar which the rider typically grips, such as a hand grip, so that the rider can, by movement of the index finger and thumb, shift the gears of the bicycle transmission without a major movement of the hand and/or arm, which movement could result in loss of control of the bicycle.

A known twist-grip shifter which has a surface structure is disclosed in European Patent No. 0 671 315 A2, where a surface is disclosed which has five rows of knobs or buttons which run axially, which are located in strips along the surface lines, and form strip-shaped areas between these rows of knobs which are not occupied by knobs. This five-axis structure is said to be ergonomically the most favorable shape for this diameter, since such a shape is required by the configuration of the finger joints.

However, ergonomic analyses have shown that when a twist grip is rotated, it is primarily the first two joints of the index finger, which is the finger involved here and is curved around the twist grip, which are decisive in the generation and application of the torque. But the bends of these two joints of the fingers are at a distance from another which corresponds to six to eight strip-shaped elevations over the periphery of a twist grip of the twist grip shifter. The driving of the twist grip then becomes significantly more efficient if the surface has ribs which are engaged in both bends of the index finger. Such ribs are elevations which run axially along the surface lines of the grip part, with a peak which runs in precisely this direction, and which fit best into the joints of the index finger at approximately 90 degrees.

The joints of the fingers are placed in the remaining spaces or depressions, which are defined laterally by sets of ribs which consist of at least one intermediate rib each. Extensions of the ribs and intermediate ribs run in the axial direction through a transitional region toward a larger diameter, where they are not as important ergonomically, but improve traction, which means that the same torque can be applied with less expenditure of effort. Since the twisting force applied by the rider's hand to the twist-grip shifter must be transmitted to the inner components of the twist-grip shifter in order to shift the gears of the bicycle transmission, a rigid, non-rotational connection between the part of the twist grip shifter which the rider rotates when a gear change is desired and the inner components of the twist-grip shifter is highly desirable. Therefore, there is a need for a reliable and economical connection between the inner components of the twist-grip shifter and the portion of the twist-grip shifter which the rider rotates to change gears.

With regard to the connection between the twist grip and the rotary part or inner twist part, one additional type of shifting mechanism which is located directly on the handlebar of the bicycle is disclosed in U.S. Pat. No. 4,938,733. This particular shifting mechanism includes front and rear handgrip shift actuators which have a cup-shaped cam member arranged generally coaxially with respect to the handlebar end portions. The cam member nests within a complementary cam cover member. After the cam member has been assembled within the cover member, a cover bushing is mounted on one end of the cover member. The cover member, being the outermost part of the above assembly, can be gripped by the rider's hand to change the gears of the bicycle transmission. The cam member, the cover member, and the bushing are connected to one another by a registration system which permits these components to rotate along with one another.

OBJECT OF THE INVENTION

An object of the invention is to create a surface structure of a twist grip which is designed so that the index finger of an average adult fits optimally around the periphery, for the application of torque. An additional object is to create a non-rotatable and reliable connection between the inner and outer components of a twist-grip shifter.

SUMMARY OF THE INVENTION

A twist-grip shifter in accordance with the present invention is typically located immediately adjacent a fixed hand grip on a handlebar of a bicycle. The fixed hand grip is typically located near the end of the handlebar, but can be located at other places along the handlebar depending on the particular curvature of the handlebar in question. The fixed hand grip is typically gripped by the rider's hand in order to steer and therefore control the movement of the bicycle, and the fixed hand grip and the twist-grip shifter can be connected to one another.

The invention teaches that the above-mentioned object can be achieved by providing a twist grip for a twist grip shifter for bicycles, which twist grip has a portion having a small diameter, a transitional area, and a large diameter. The twist grip can be positively and detachably connected to the twist grip shifter in the axial direction, and can include an elastic rubber grip part as well as a non-elastic rotary part. The grip part can preferably be non-detachably connected with the rotary part, and the grip part can also have a surface structure including roof-like ribs. The roof-like ribs have a peak which runs axially approximately along the surface lines, whereby the distance between the peaks of the ribs is approximately equal to the two bends of the index finger of an adult human being.

In addition, between each two ribs, there can be an intermediate rib, which intermediate rib is interrupted at the location of the index finger.

Further, the ribs, and possibly the intermediate ribs, can have a flank angle of approximately 90 degrees at their peak, and the rib, on the side on which the force is applied when the cable is being wound up, can have a flank which can be approximately flat, while the opposite flank can be curved convexly.

A further feature of the invention is that the connection between the grip part and the rotary part can be achieved by coating the rotary part with elastic rubber material.

One aspect of the invention resides broadly in a handlebar mountable twist grip shifter for shifting bicycle gears, the twist grip shifter comprising: a shift actuator device to be mounted on a handlebar generally coaxially with a handlebar; a control cable; the control cable having a first end and a second end; the first end of the control cable being connected to the shift actuator device, the second end of the control cable to be operatively connected to gearing; the shift actuator device comprising a rotatable grip part, the rotatable grip part having an axis of rotation, the axis of rotation defining an axial direction parallel to the axis of rotation; the rotatable grip part to be operatively connected to gearing; a cable winding mechanism; the cable winding mechanism comprising apparatus to actuate the first end of the control cable; the rotatable grip part comprising: a first end and a second end disposed a substantial axial distance from one another; an inner portion; the inner portion comprising apparatus to non-rotationally connect the inner portion to the cable winding mechanism; an outer portion; the outer portion being disposed about the inner portion and being non-rotatably attached to the inner portion; the outer portion comprising a surface to be gripped by the fingers of the rider; at least one projection disposed on the surface of the outer portion, the at least one projection extending in a radial direction with respect to the axis of rotation; and the at least one projection comprising a continuous and smoothly changing surface, the continuous and smoothly changing surface extending in the axial direction over a substantial portion of the rotatable grip part from the first end of the rotatable grip part to the second end of the rotatable grip part.

Another aspect of the invention resides broadly in a twist grip for a handlebar mountable twist grip shifter for shifting bicycle gears, the twist grip comprising: a rotatable grip part, the rotatable grip part having an axis of rotation, the axis of rotation defining an axial direction parallel to the axis of rotation; the rotatable grip part to be operatively connected to gearing; the rotatable grip part comprising: a first end and a second end disposed a substantial axial distance from one another; an inner portion; the inner portion comprising apparatus to non-rotationally connect the inner portion to a cable winding mechanism-of a twist-grip shifter; an outer portion; the outer portion being disposed about the inner portion and being non-rotatably attached to the inner portion; the outer portion comprising a surface to be gripped by the fingers of the rider; at least one projection disposed on the surface of the outer portion, the at least one projection extending in a radial direction with respect to the axis of rotation; and the at least one projection comprising a continuous and smoothly changing surface, the continuous and smoothly changing surface extending in the axial direction over a substantial portion-of the rotatable grip part from the first end of the rotatable grip part to the second end of the rotatable grip part.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention, The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is described in greater detail below with reference to the accompanying drawings, in which:

FIG. 8 illustrates a variant in which the transition spring is realized in the form of a plate spring;

FIG. 9 illustrates an additional variant of the transition spring, in which it is realized in the form of a coil spring;

FIG. 10 shows a view in perspective as in FIG. 6 with a detent spring made of steel band material and an integrated transition spring;

FIG. 34 shows an additional embodiment of a twist-grip shifter;

FIG. 35 shows a cross-sectional, enlarged view "X" of the seal between the cable winding portion and twist grip of FIG. 34;

FIG. 36 shows an end view of the twist-grip shifter of FIG. 34;

FIG. 38 shows a cross-section of the twist grip of FIGS. 37 and 37a;

FIG. 40 shows an additional embodiment of a twist-grip shifter;

FIG. 41 shows a cross-section of the seal of FIG. 40;

FIG. 41a shows a view similar to FIG. 41, but shows an additional embodiment of a seal;

FIG. 49 shows an exploded view of a complete twist-grip shifter;

FIG. 50 shows the twist-grip shifter of FIG. 49 fully assembled;

FIG. 57 shows an overview of an injection molding machine for molding the twist part of the twist grip shown in FIGS. 5 and 5a.

DESCRIPTION OF THE PREFERRED EMBODIMENTS

A hand grip with a twist-grip shifter, which hand grip can preferably be located on the handlebar of a bicycle, can include a fixed hand grip for the safe control of the bicycle by the rider, who is able to hold the hand grip with his entire hand. The fixed hand grip can preferably be located near the end of the handlebar, or can be located more centrally along the handlebar, depending on the particular configuration of the handlebar.

Figure 1:
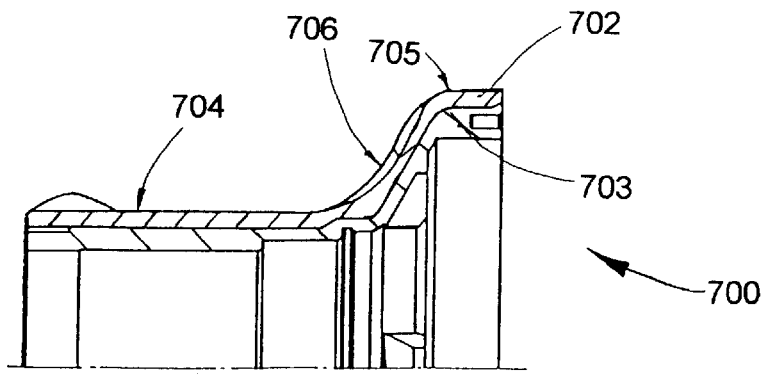
FIG. 1 is a partial section through a twist grip with a grip part and a rotary twist part.

Connected to this fixed hand grip is a twist grip shifter with a twist grip 700 as illustrated in FIG. 1, whereby the twist grip 700 is located toward the center of the handlebar, which the rider can reach with his index finger and thumb without having to make major movements of his hand or arm which might have an adverse effect on rider safety. The twist grip 700, which is positively connected to a cable winding mechanism, has a grip part 702 and a twist part 703, whereby it is the rigid twist part 703 which has an internal shape which makes it possible to connect it with the cable winding mechanism, as discussed above.

Located on this twist part 703 is the grip part 702 made of elastic rubber material which must also participate in a non-rotating connection with the twist part 703. In this case, the connection is achieved by coating the rotary part with the elastic rubber material in an injection mold, which guarantees the non-rotational connection and eliminates the need for a subsequent assembly of the two parts 702 and 703 to one another.

The twist grip 700, on its side adjacent to the fixed hand grip, has a small diameter 704 which does not differ significantly from the diameter of the fixed hand grip. The area with the small diameter 704 is wide enough for the application of the index finger and the thumb on the rider's hand, whereby the index finger can be supported axially on a transitional area 706 which ends in a large diameter 705 of the twist grip 700. This large diameter 705 is slightly larger than the diameter of the cable winding mechanism, so that the rider can grasp and turn the twist grip 700 on this large diameter 705.

Figure 1A:
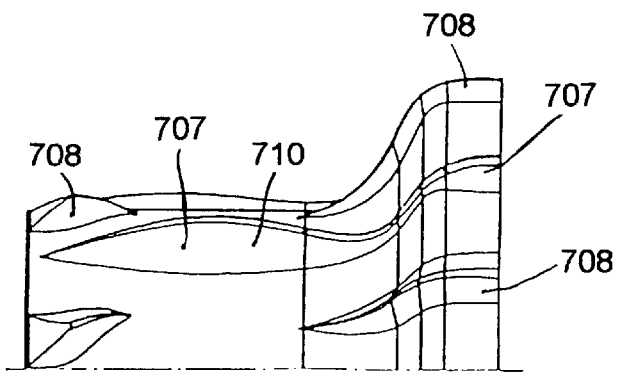
FIG. 1a is a plan view of the grip part of FIG. 1 with ribs and intermediate ribs.
Figure 2:
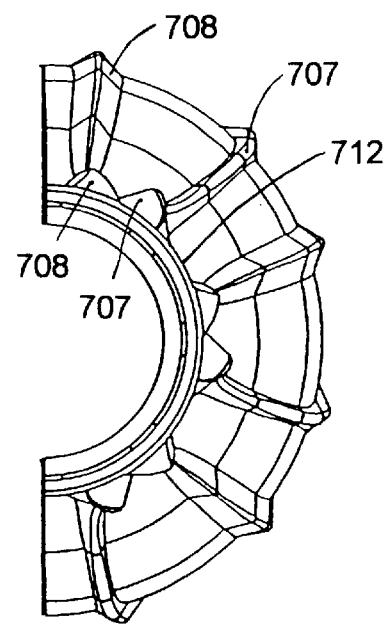
FIG. 2 illustrates the arrangement of the ribs and intermediate ribs distributed over the circumference.
Figure 3:
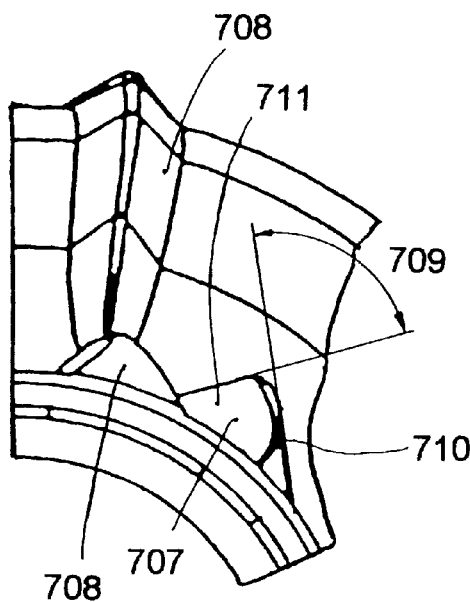
FIG. 3 is an enlarged detail which illustrates the shape of the ribs.

As illustrated in FIGS. 1*a*, 2 and 3, the grip part 702 has ribs 707 and intermediate ribs 708 which extend over the area with the small diameter 704, through the transitional area 706, and through the area of the large diameter 705, primarily in the axial direction. The ribs 707 are of different heights, and are at their highest where the index finger is applied around the small diameter 704 of the twist grip 700. The intermediate ribs 708, on the other hand, are interrupted at the points where they contact the index finger, and leave sufficient room there in the form of a depression 712 without ribs to fit the shape of the joints of the index finger. The ribs 707, along their radially outermost extension, have a sharp-edged tip which approximately equals a right angle. The ribs 707 are therefore sharp, so that they fit optimally into the bends underneath the joints of the index finger, and thus guarantee a secure contact of the entire finger so that the grip can be twisted essentially without the index finger slipping. The ribs 707 and 708, as indicated above, have a flank angle 709 of approximately 90 degrees, and are elevated above the small diameter 704 by different amounts. The ribs 707 begin near the end surface of the twist grip 700 closer to the fixed hand grip and reach their maximum height approximately in the center of the small diameter 704. They are at their minimum in the transitional area 706, and become larger once again at the large diameter 705. The intermediate ribs 708 are located close to the end surface of the twist grip 700 facing the fixed hand grip, so that they can act as guide ribs for the joints of the index finger. The intermediate ribs 708 disappear toward the middle of the area with the small diameter 704, begin near the transitional area 706, and increase up to the large diameter 705 following essentially the same curve as the ribs 707.

One feature of an invention resides broadly in the twist grip 700 for a twist grip shifter for bicycles which: has a small diameter 704, a transitional area 706 and a large diameter 705, is positively and detachably connected to the twist grip shifter in the axial direction, consists of an elastic rubber grip part 702 as well as a non-elastic rotary part 703, the grip part 702 of which is non-detachably connected with the rotary part 703, and the grip part 702 of which has a surface structure, characterized by the fact that on the surface of the grip part 702, there are roof-like ribs 707 having a peak which runs axially approximately along the surface lines, whereby the distance between the peaks of the ribs 707 is approximately equal to the two bends of the index finger of an adult human being.

Another feature of an invention resides broadly in the twist grip characterized by the fact that between each two ribs 707 there is an intermediate rib 708 which is interrupted at the location of the index finger.

Yet another feature of an invention resides broadly in the twist grip characterized by the fact that the ribs 707 have a flank angle 709 of approximately 90 degrees at their peak.

Still another feature of an invention resides broadly in the twist grip characterized by the fact that the rib 707 on the side on which the force is applied when the cable is being wound up, has a flank 711 which is approximately flat, while the opposite flank 710 is curved convexly.

A further feature of an invention resides broadly in the twist grip characterized by the fact that the connection between the grip part 702 and the rotary part 703 is achieved by coating the rotary part 703 with elastic rubber material.

The portion of the twist-grip shifter which the rider rotates in order to change the gears of the bicycle can include an outer grip part and an inner twist part or rotary part, which inner twist part can be located within the outer grip part, as mentioned briefly above. The inner twist part can be rigid in construction, and can be connected to a cable winding mechanism of the twist-grip shifter. Thus, the rider shifts gears by gripping the outer grip part located adjacent the fixed hand grip, and rotating the outer grip part until the desired gear setting is achieved. A rigid, non-rotational connection between the outer grip part and the inner twist part is therefore highly desirable, since the twisting force applied by the rider's hand must be transmitted to the cable winding mechanism via the inner twist part.

The present invention also teaches that one of the above objects can be achieved by coating the inner twist part or rotary part, which inner twist part can preferably be made of a plastic and/or thermoplastic material, with an elastic or rubber material to form the grip part, which coating can form a reliable connection between the grip part and the inner twist part or rotary part. This coating can preferably be achieved by means of injection molding. Of course, other types of molding processes may also be utilized in accordance with the present invention. The elastic or rubber coating which is applied to the inner twist part can thus form the outer twist part of the twist-grip shifter, and can provide a non-slip surface for the rider's fingers and/or thumb during a shifting procedure.

This type of connection between the outer grip part and the inner twist part of the twist-grip shifter can preferably simplify the assembly process by eliminating the need for subsequent assembly of the two parts with respect to one another. In other words, if, for example, the outer grip part was instead formed by a separate molding procedure, i.e. the outer grip part was formed completely separately from the inner twist part as an elastic or rubber sleeve, and the inner twist part was also formed by a separate molding procedure, the two parts would then have to be firmly attached to one another. Thus, the outer twist part would most likely have to be slipped over the inner twist part and would then have to be fixedly attached to the twist part, for example with adhesive or some other type of fastening means. Therefore, the present invention can preferably simplify the assembly of these two parts, since the outer grip part can be formed and attached to the inner twist part in a single molding procedure.

Figure 4:
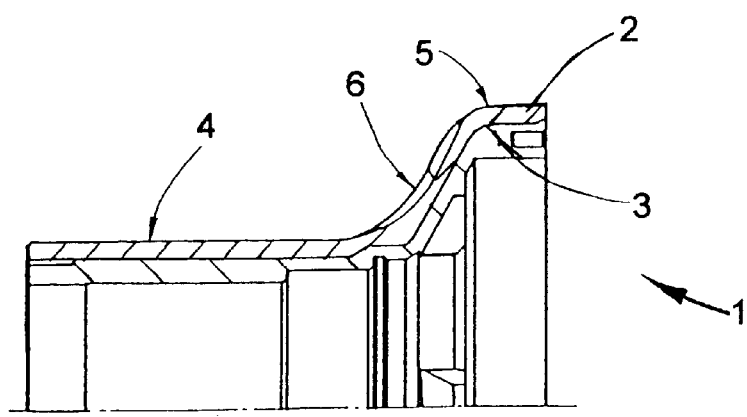
FIG. 4 shows a partial section taken through the twist grip of a twist-grip shifter, the twist grip having a grip part and a twist part.

In this regard, an additional twist grip 1 which can be connected to the fixed hand grip is illustrated in FIG. 4. The twist grip 1 can be located toward the center of the handlebar, so that the rider can shift gears by reaching with his index finger and thumb and rotating the twist grip 1, essentially without having to make major movements of the hand or arm, which movements might have an adverse effect on rider safety. The twist grip 1, which can be positively connected to a cable winding mechanism (for example, see FIG. 26), can have a grip part 2 and a twist part 3. The twist part 3 can preferably be rigid, and can have an internal shape adapted for connection with the cable winding mechanism. This connection between the twist part 3 and the cable winding mechanism is discussed in detail further herebelow.

The grip part 2 can be located on, or on top of, the twist part 3, and can preferably be made of an elastic rubber material. The grip part 2 should preferably be non-rotatably connected to the twist part 3, since the twist part 3 must transmit the rotational movement of the rider's hand from the grip part 2 to the cable winding mechanism in order to shift the gears of the bicycle. In this case, the connection can be achieved by coating the rotary part or twist part 3 with elastic rubber material in an injection mold, which process can essentially guarantee the non-rotational connection needed between the twist part 3 and the grip part 2. By connecting the twist part 3 and the grip part 2 to one another in this manner, the need for a subsequent assembly of the two parts 2 and 3 to one another can essentially be eliminated. That is, if the grip part 2 and the twist part 3 were instead formed by completely separate molding procedures, the grip part 2 would then have to be slipped around the twist part 3, and the grip part 2 would also have to be firmly attached to the twist part 3 in some manner, for example by adhesive. Thus, in accordance with the present invention, the grip part 2 can be formed and attached to the twist part 3 in essentially one molding procedure, which procedure can essentially eliminate any further steps which would typically be necessary for the attachment of the grip part 2 to the twist part 3.

The twist grip 1, on the side adjacent to the fixed hand grip, can preferably have a portion having a small diameter 4, which diameter 4 which does not differ significantly from the diameter of the fixed hand grip. The portion or area with the small diameter 4 is wide enough for the application of the index finger and the thumb on the rider's hand, whereby the index finger can be supported axially on a frustoconical transitional area 6, which transitional area 6 ends or leads into a portion having a large diameter 5 of the twist grip 1. This large diameter 5 can preferably be slightly larger than the diameter of the cable winding mechanism, so that the rider can grasp and turn the twist grip 1 by grasping the twist grip 1 at this large diameter 5.

Figure 56A:
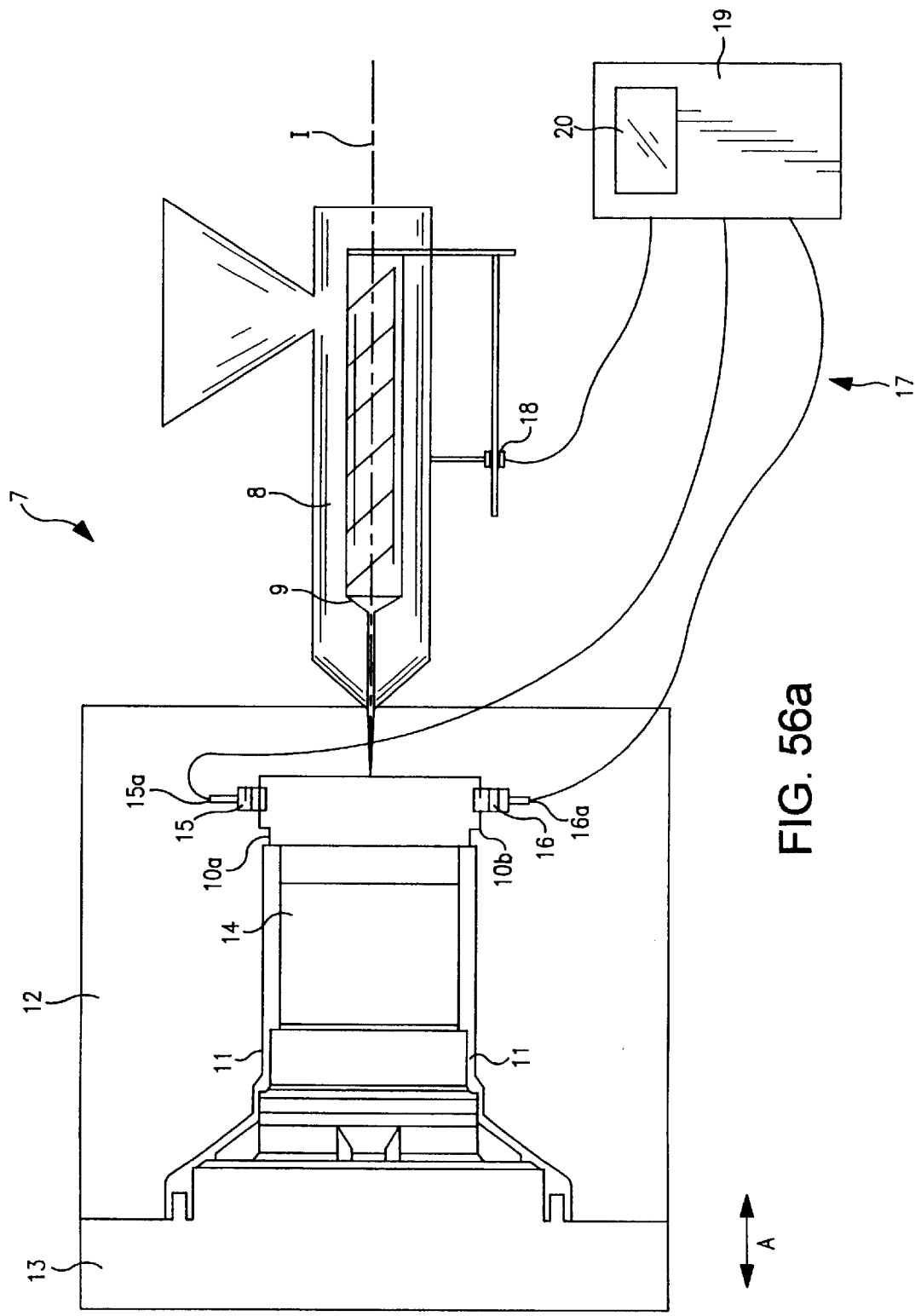
FIG. 56a shows an overview of an injection molding machine for molding the inner twist part of the twist-grip shifter.
Figure 56B:
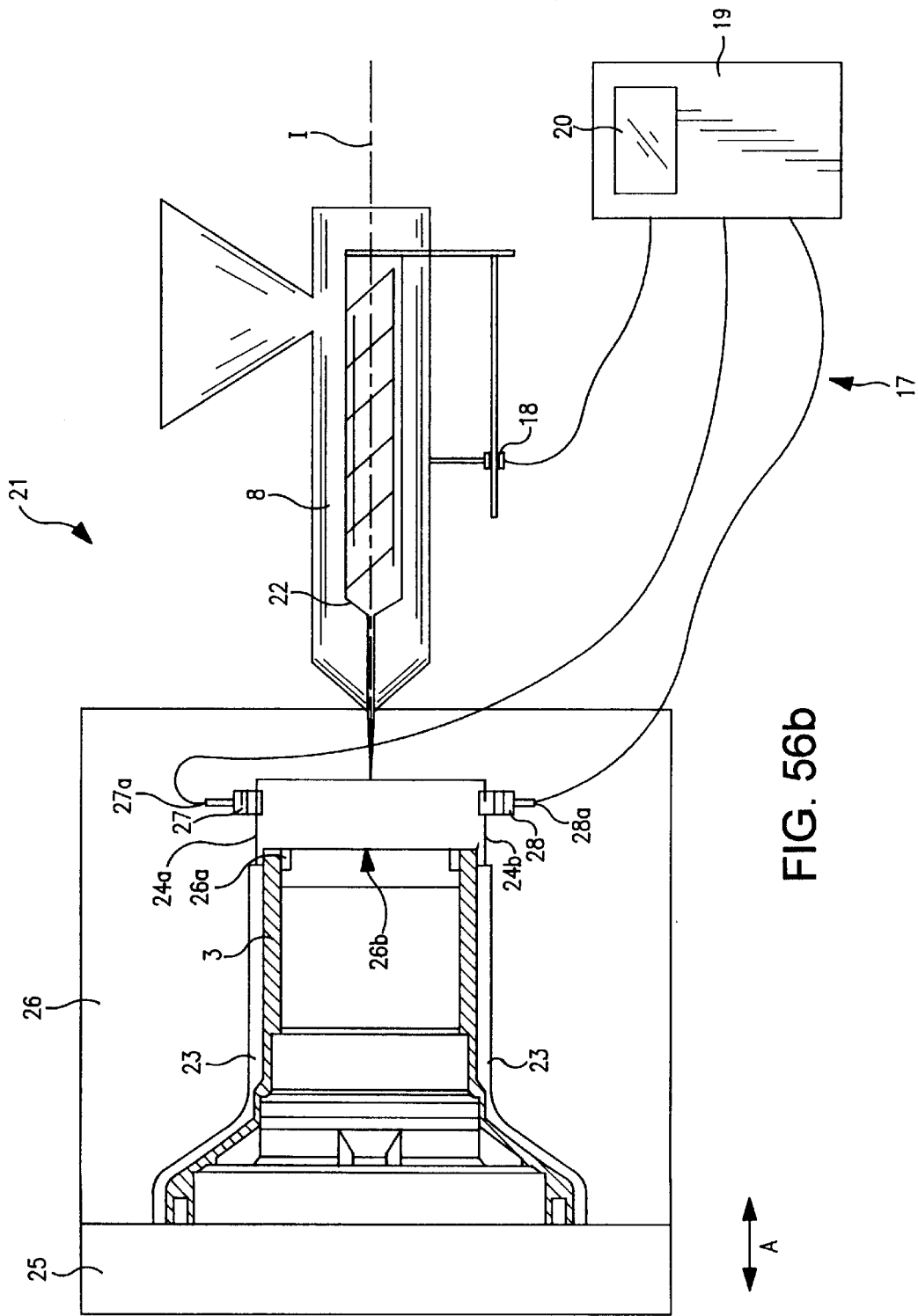
FIG. 56b shows an overview of an injection molding machine for coating the inner twist part of the twist-grip shifter with an elastic coating to form the outer grip part.

Referring to FIGS. 56a and 56b, these figures illustrate one possible method of making the twist grip 1 of the present invention, which method preferably includes injection molding. The twist part 3 can be constructed of thermoplastic and/or plastic material, and, as mentioned above, the grip part 2 can be made of rubber and/or elastic material.

First, the twist part 3 can be injection molded as illustrated in FIG. 56a. FIG. 56a shows one type of injection molding machine 7 which can be utilized to mold the inner twist part 3. The injection molding machine 7 can preferably have an axis I. Of course, other types of injection molding machines may be utilized to mold twist part 3, thus, the molding machine 7 illustrated herein is presented by way of example only. The injection molding machine 7 can include an injection molding screw 8, which screw 8 can inject molding compound 9, by means of hot channels 10a and 10b (shown schematically), into a mold cavity 11. That is, injection screw 8 can drive molding compound 9 into the hot channels 10a and 10b, which channels 10a and 10b then direct the molding compound 9 into the mold cavity 11.

The cavity 11 can be formed by a mold clamping device, which mold clamping device includes a stationary mold part 12 and a movable mold part 13. Mold part 13 can preferably move in the directions indicated by arrow A, i.e. in directions parallel to axis I. Movable mold part 13 can preferably fit centrally into the stationary mold part 12, and can have a protruding molding portion 14. The protruding mold portion 14 ultimately forms the interior portion of the twist part 3. As mentioned briefly above, the interior part of twist part 3 is configured for connection to a cable winding mechanism, which connection is discussed further below. The movable mold part 13 and the stationary mold part 12 can be clamped to one another during the molding process, and together define the circular mold cavity 11.

The hot channels 10a and 10b which lead to the mold cavity 11 can be opened and/or closed by valves 15 and 16, which valves 15 and 16 can have control elements 15a and 16a, respectively.

The injection molding machine 7 shown in FIG. 56a can also be equipped with measurement components 17. The measurement components 17 can include a displacement transducer 18, which displacement transducer 18 can be connected, for measurement and control purposes, to an evaluation device 19. The evaluation device 19 can be connected to control elements 15a and 16a of valves 15 and 16. The evaluation device 19 can also have a graphic display element 20 for the graphic display of the measurement data received.

In order to mold the inner twist part 3, movable mold part 13 can be clamped to stationary mold part 12, so as to form mold cavity 11. Molding compound 9 can then be driven into the channels 10a and 10b via the molding screw 8, and from the channels 10a and 10b into the mold cavity 11. In accordance with at least one preferred embodiment of the present invention, the molding compound 9 can be a plastic and/or thermoplastic material, examples of which can be found further below. Once the mold cavity 11 has been filled, that is, after a sufficient amount of molding compound 9 has been driven into the cavity 11 as controlled by the measurement and control components 17, the molding compound 9 can then be hardened or allowed to harden. Once the molding compound 9 has hardened, mold part 13 can then be moved to the left in the drawing, which is one direction indicated by arrow A, and the newly formed twist part 3 can then be removed, possibly along with mold part 13, from the stationary mold part 12.

Thus, the resulting inner twist part 3 is preferably rigid in construction, and can have load-bearing properties. Additionally, the twist part 3 can be molded to have locking components which participate in a locking connection with the cable winding mechanism. These load-bearing properties and locking components of the twist part 3 will also be discussed in detail further below.

Once the inner twist part 3 is formed, the inner twist part 3 can then be coated with rubber and/or elastic material to form the outer grip part 2. FIG. 56b illustrates this process. In accordance with one embodiment of the present invention, the injection molding machine 7 shown in FIG. 56a can be utilized for this second procedure, if the mold clamping device is changed to accommodate the inner twist part 3, and if the thermoplastic molding compound 9 used to form the twist part 3 is replaced with rubber and/or elastic molding compound. Alternatively, the molding of the twist part 3 and grip part 2 can be performed with two separate molding machines. For the purpose of simplicity, many of the individual components of the molding machine 21 shown in FIG. 56b have been given the same reference numbers as their corresponding components shown in FIG.

56a, however, as mentioned above, it should be understood that the same molding machine can conceivably be utilized for both molding processes, except, of course, for the mold clamping devices themselves and the molding compound used.

As shown in FIG. 56b, the injection molding machine 21 can also include an injection molding screw 8 for injecting molding compound 22, which in this case can be rubber and/or elastic molding compound. Some examples of elastic and rubber molding compounds which may be utilized in accordance with the present invention can be found further herebelow. As discussed above with regard to FIG. 56a, the molding screw 8 drives molding compound 22 into a mold cavity 23 by means of hot channels 24a and 24b. The cavity 23 can be formed by a mold clamping device including a movable mold part 25 and a stationary mold part 26. Movable mold part 25 can move in the directions indicated by arrow A. The hot channels 24a and 24b can be opened and/or closed by means of shutters or valves 27 and 28, respectively. In addition, valves 27 and 28 can be controlled by means of control elements 27a and 28a, respectively.

Similarly to the injection molding machine shown and described with respect to FIG. 56a, the injection molding machine 21 can preferably be equipped with measurement and control components 17, including a displacement transducer 18, and an evaluation device 19. The functions of these elements are discussed above and will therefore not be discussed further here.

In order to provide the twist part 3 with an elastic coating, twist part 3 can be placed on the inside of the stationary mold part 26, which mold part 26 can have a centering element 26a for centering the twist part 3 inside mold part 26. Centering element 26a can be in the form of a continuous ring which projects from a base portion 26b of the mold part 26, or, alternatively, the element 26a can be embodied by segmented projections which extend outwardly from base portion 26b of mold part 26. Once the twist part 3 is correctly positioned inside of the mold part 26, mold part 25 can then be moved in a direction corresponding to the right in the figure and clamped to mold part 26 so as to form mold cavity 23. Thus, mold cavity 23 is formed by the outside surface of the twist part 3, mold part 25, and mold part 26. Molding compound 22 can then be driven into the channels 24a and 24b via the molding screw 8, and from the channels 24a and 24b into the mold cavity 23. Once the mold cavity 23 has been filled, the molding compound 22 can then be hardened or permitted to harden. After the molding compound 22 has hardened, movable mold part 25 can then be moved in a direction corresponding to the left in the figure, and the twist part 3, along with the grip part 2 coated thereon, can be removed from the mold part 26.

Thus, the twist part 3 and the grip part 2 will now be non-rotatably connected to one another, and no further assembly of the two parts with respect to one another is necessary. That is, the grip part 2 can be formed and attached to the twist part 3 in essentially a single molding procedure.

It should be understood that the desired shape and surface configuration of the twist part 2 can be determined by the shape of the mold cavity 23. Thus, if particular surface characteristics are desired, as discussed further below with reference to FIGS. 5 and 5a, such as depressions, raised portions (see, for example, 42, 43 and 43a in FIGS. 5 and 5a), raised or sunken lettering (see, for example, 44 in FIGS. 5 and 5a), etc., the cavity 23 formed in the stationary mold part 26 can be configured accordingly to form the desired surface on the grip part 2.

Figure 56C:
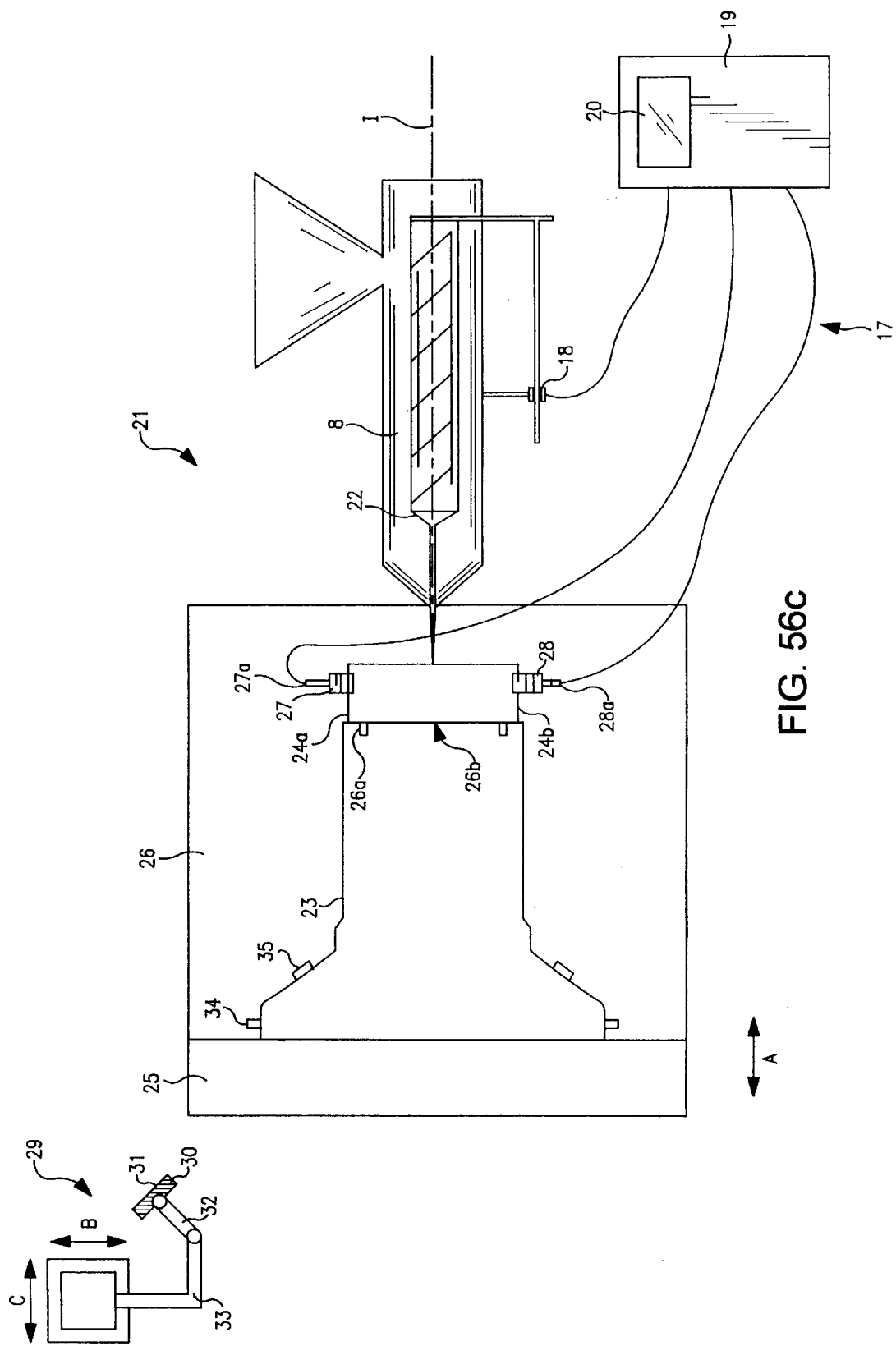
FIG. 56c shows an overview of an injection molding machine for coating the inner twist part of the twist-grip shifter with an elastic coating and for addition decorative and/or functional material to the elastic coating.

In addition, if some type of decorative or functional marking is desired on the outer grip part 2, for example lettering indicating a brand name or marking relating to the gear numbers, positions, etc., this marking can be done during the second molding procedure as discussed above. For example, FIG. 56c shows an alternative embodiment of the molding machine 21 illustrated in FIG. 56b which can be utilized for this particular procedure. As shown in FIG. 56c, in the vicinity of the mold clamping device including the movable mold part 25 and the stationary mold part 26, there can preferably be a transport device 29. The transport device 29 can have a gripper element, possibly a needle gripper 30, which gripper 30 holds the decorative and/or functional material 31. The gripper 30 can be used to insert the decorative material 31 into the mold cavity 23, before the twist part 3 is placed inside stationary mold part 26. The stationary mold part 26 is shown in FIG. 56c without the twist part 3 placed inside for purposes of simplicity.

The transport device 29 can be moved in the directions indicated by the arrows B and C. Further, the gripper 30 can be pivotably mounted on an arm 32 of the transport device 29, which arm 32 can itself pivot with respect to a stationary arm 33 of the transport device 29. In order to place the decorative material 31 inside the stationary mold part 26, the mold part 25 can be moved in a direction corresponding to the left in the figure, to open the mold cavity 23, and the transport device 29 can then be moved downward along direction B and to the right along direction C. The movements of the mold part 25 and the transport device 29 can preferably be coordinated to bring the decorative material 31 into the open cavity 23. Depending upon the desired location of the decorative material 31 along the external side of the grip part 2, the arm 32 and gripper 30 of the transport device 29 can be pivoted to the appropriate positions to effect the transfer of the material 31 to the side of the mold part 26. For example, if a marking is desired at the portion of the grip part 2 having the large diameter 5, the arm 32 can be pivoted to bring the material 31 into contact with a holding element 34 located inside mold part 26. The holding element 34 can extend about the entire inside circumference of the mold cavity 23 or can be located at desired positions about the circumference of the cavity 23. If a marking is desired near or at the transitional area 6 of the grip part 2, the arm 32 can be pivoted to the appropriate position to bring the material 31 into contact with a holding element 35 located in the mold part 26. As stated above with regard to holding element 34, the holding element 35 can extend around the entire inside circumference of the mold cavity 23, or can be located at other positions about the circumference. Of course, holding elements can also be located at other points inside the mold cavity 23, wherever markings are needed. A similar method and device for adding decorative material by an injection molding process is disclosed in U.S. Pat. No. 5,356,576 which issued to Fischbach on Oct. 18, 1994, which patent is hereby incorporated by reference.

The transport device 29 can be embodied by a robotic arm controlled by a computer, which devices are well known in the art and will not be discussed further here.

Once the decorative material 31 has been secured inside the cavity 23, twist part 3 can be placed inside the stationary mold part 26 as discussed above with reference to FIG. 56b, and molding compound 22 can then be injected into the cavity 23. Thus, the material 31, whether decorative or functional, can then bond directly with the molding compound 22 at the desired locations along the grip part 2.

It should be understood that other methods of adding decorative or functional material to the grip part 2 may be utilized, and that the above described method is presented only by way of example.

In summary, the outer grip part and the inner twist part of the twist grip can be non-rotatably connected to one another by a molding process, wherein an elastic coating is applied to the inner twist part, which elastic coating forms the outer grip part. The elastic coating thus provides a non-slip surface to aid the rider in shifting gears.

One aspect of the invention resides broadly in a method of injection molding a twist-grip shifter for the handlebar of a bicycle, the twist-grip shifter having a rotatable outer part and an inner part for transmitting the torque received from the rotatable outer part, the method comprising: providing an injection molding apparatus; providing a first mold, the first mold being configured for forming a first predetermined shape; providing a second mold, the second mold being configured for forming a second predetermined shape; providing a first molding compound; providing a second molding compound; the method further comprising forming the inner part of the twist-grip shifter by: injecting, with the injection molding apparatus, the first molding compound into the first mold; permitting the first molding compound to harden; removing the inner part of the twist-grip shifter from the first mold; the method further comprising forming the rotatable outer part of the twist-grip shifter by: disposing the inner part of the twist-grip shifter inside the second mold; injecting, with the injection molding apparatus, the second molding compound into the second mold and around the inner part of the twist-grip shifter; permitting the second molding compound to harden on the inner part of the twist-grip shifter; and removing the inner part and the rotatable outer part of the twist-grip shifter from the second mold.

Figure 5:
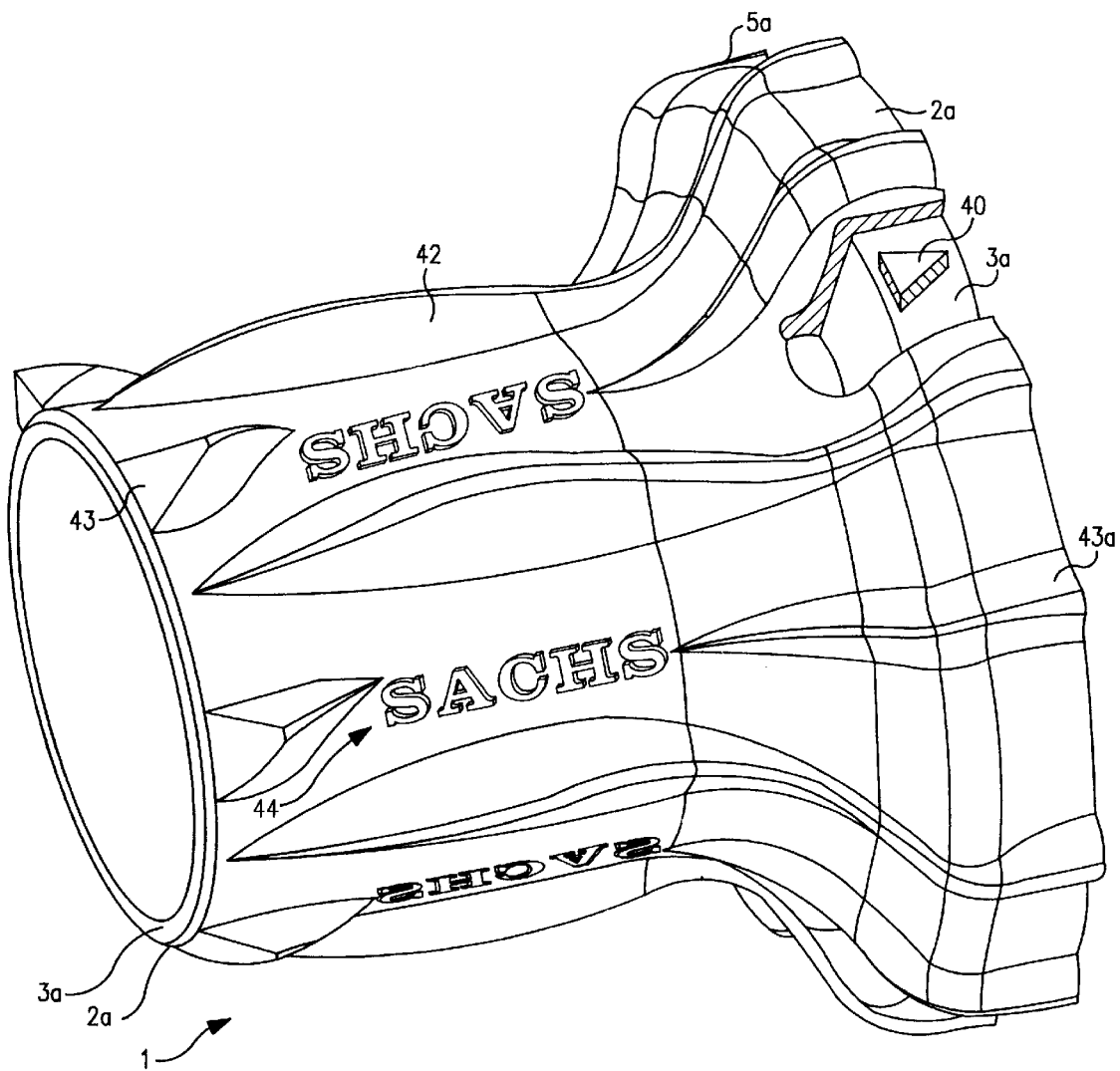
FIG. 5 shows a perspective view of an additional embodiment of a twist grip for a twist-grip shifter, with a portion of the grip part of the twist grip cut away.
Figure 5A:
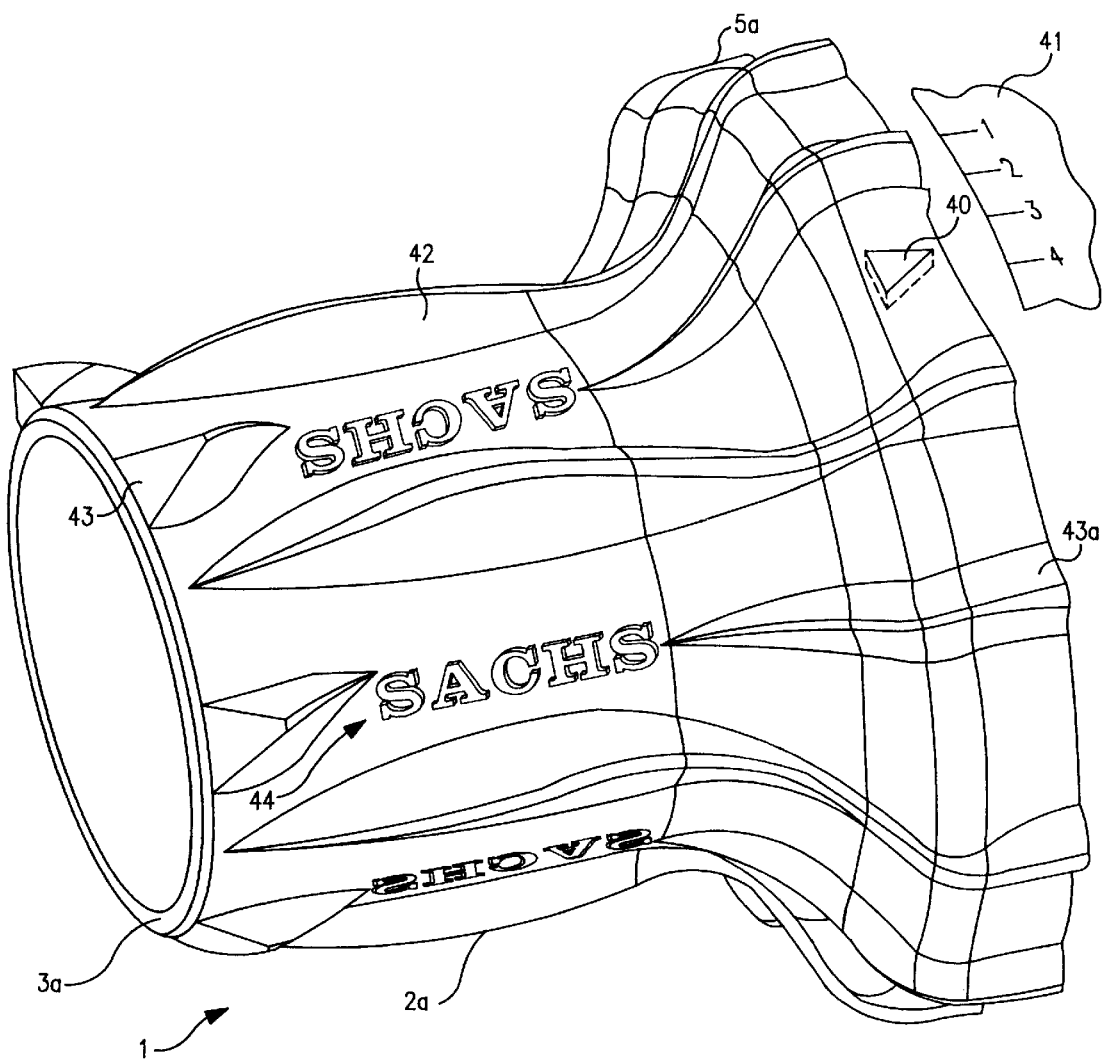
FIG. 5a shows a perspective view of the twist grip shown in FIG. 5, as a finished product.

FIGS. 5 and 5a show an additional embodiment of a twist grip 1 for a twist-grip shifter in perspective view. The twist grip 1 shown in FIGS. 5 and 5a can preferably have raised portions 42, 43 and 43a, as mentioned briefly above. The grip part 2a shown here has already been molded onto the twist part 3a. FIGS. 5 and 5a show a marking 40, which in this case is in the form of an arrow, which marking 40 can be located near the portion of the grip part 2a having the large diameter 5a. The marking 40 can preferably be used to indicate the current gear of the bicycle transmission, by pointing to the gear number in a gear display 41. The gear display 41 can be located on the cable winding mechanism, which cable winding mechanism can be non-rotationally connected to the twist grip 1.

Figure 57:
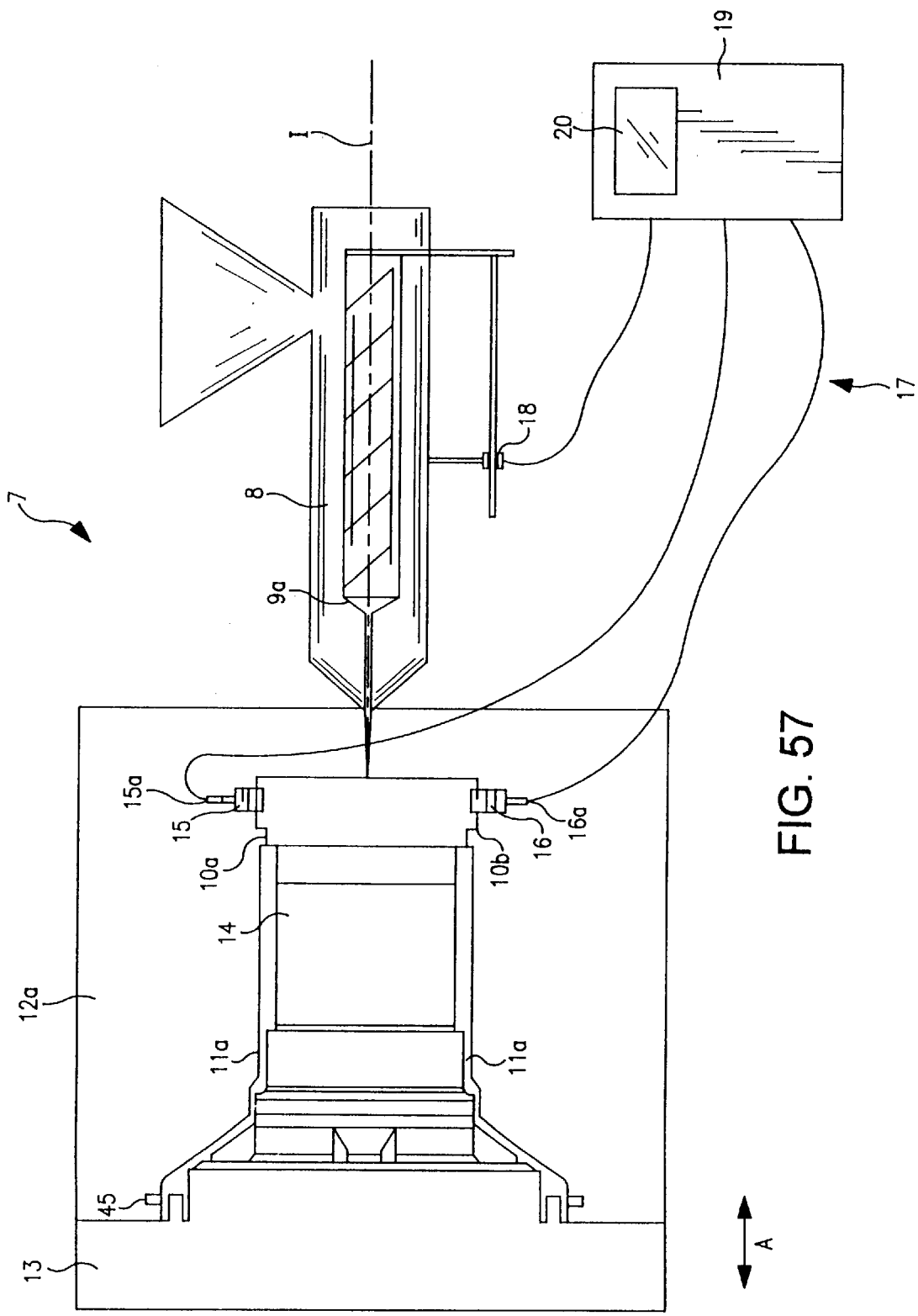

The marking or arrow 40 can preferably be a raised portion of the twist part 3a. FIG. 5 shows the twist grip 1 with a portion of the grip part 2a cut away to show the raised arrow marking 40 of the twist part 3a, and FIG. 5a shows the finished twist grip 1, with the lower portion of the arrow 40, which cannot be seen, shown in phantom. The twist part 3a shown in FIGS. 5 and 5a can be formed by essentially the same molding procedure for the twist part 3 discussed above with reference to FIG. 56a. However, as shown in FIG. 57, a differently configured stationary mold part 12a can be used in order to mold the twist part 3a with the raised arrow 40. The stationary mold part 12a shown in FIG. 57 can, in this case, have a recess 45 having the shape of an arrow, which shape would correspond to the shape of the arrow 40.

In accordance with this particular embodiment, the molding compound 9a can be a different color than the molding compound 22a used to subsequently mold the grip part 2a onto the twist part 3a. When molding compound 9a is driven into the cavity 11a, molding compound 9a will fill the arrow-shaped recess 45 and thus form the raised arrow 40 on the large diameter portion of the twist part 3a. The molding procedure in this case can be essentially the same as the procedure described above with regard to FIG. 56a.

Figure 57A:
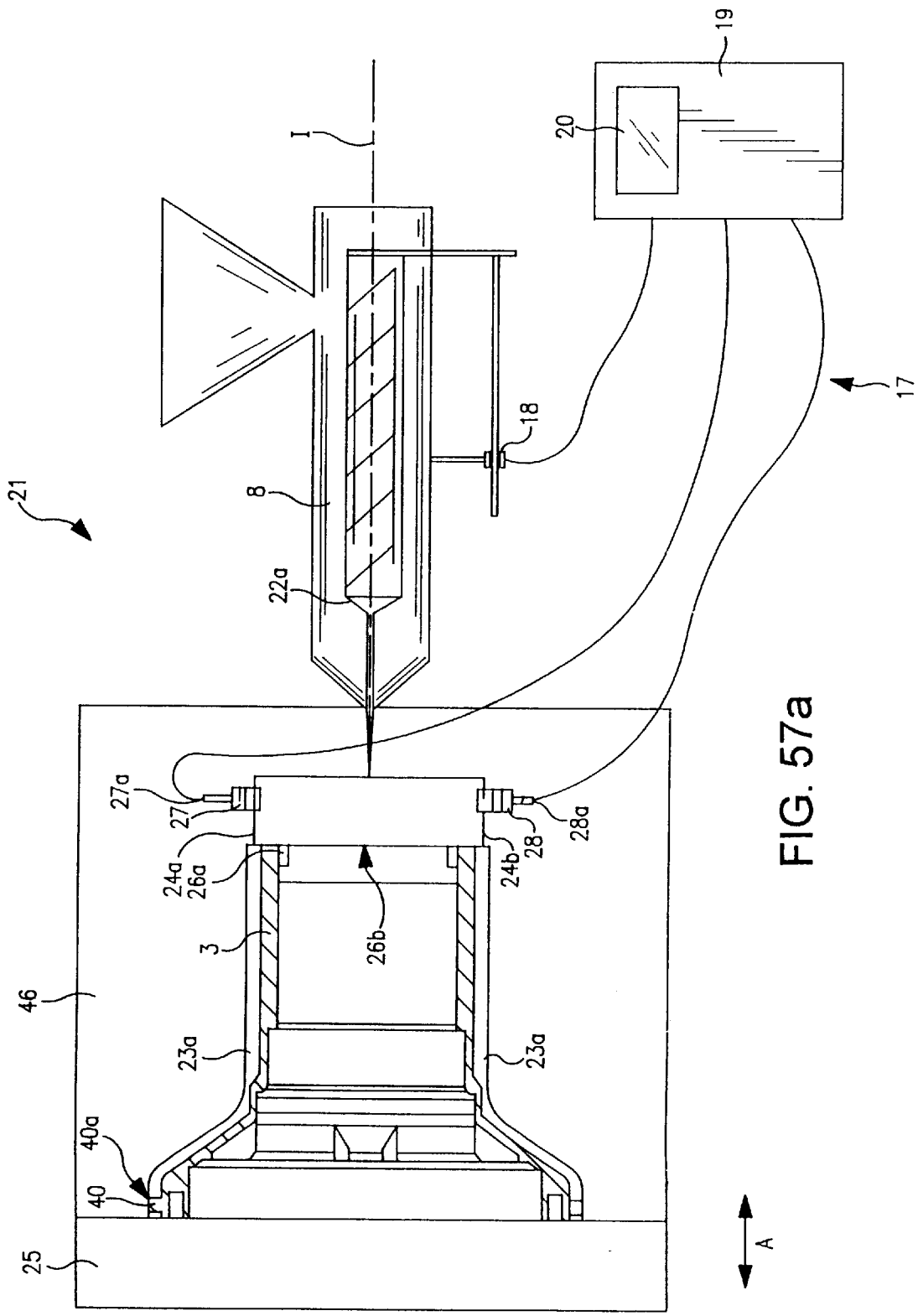
FIG. 57a shows an overview of an injection molding machine for molding the grip part onto the twist part formed by the injection molding machine shown in FIG. 57.

After the twist part 3a is formed, the grip part 2a can then be molded onto the twist part 3a. FIG. 57a shows the twist part 3a inserted into a stationary mold part 46, which stationary mold part 46 can be configured to form the raised portions 42, 43 and 43a, and the raised or sunken lettering 44. The recessed portions of the mold part 46 which would ultimately form the raised portions 42, 43 and 43a of the grip part 2a are not shown in FIG. 57a due to the particular cross-section of the mold part 46 shown. In addition, the raised or recessed portions of the mold part 46 which would ultimately form the lettering 44 of the grip part 2a are not shown for purposes of simplicity, but the configuring of the mold part 46 to achieve the desired shape of the grip part 2a would be well known to one of ordinary skill in the art.

Thus, once molding compound 22a, which is a different color than the molding compound 9a, is driven into the mold cavity 23a and around the raised marking 40 of the twist part 3a, the twist grip 1 shown in FIG. 5a can preferably result. Since the marking 40 of the twist part 3a presses against the wall of the mold cavity 23a, no molding compound 22a can be deposited on the surface 40a of the marking 40, and the marking 40 can thus be visible in the finished product shown in FIG. 5a. The marking 40 in the finished twist grip 1 shown in FIG. 5a can have essentially the same height or thickness as the height or thickness of the grip part 2a. Further, since the twist part 3a and the grip part 2a can have different colors, the arrow marking 40 can be easily detected in the finished twist grip 1.

Alternatively, the arrow marking 40 can instead be embodied by an outline of an arrow formed around an exposed portion of the twist part 3a. The outline of the arrow 40 could be formed by the rubber and/or elastic material of the grip part 2a. Thus, the arrow 40 can be considered to be a "window" through grip part 2a to the twist part 3a. In this case, the stationary mold part 12 shown in FIG. 56a could be used to form the twist part 3a, and a mold similar to the mold part 46 shown in FIG. 57a could be used to form the grip part 2a. However, the mold part used to form the grip part 2a could instead have a projection in the shape of an arrow instead of the recess 40. This projection can then press against the twist part 3a during the forming of the grip part 2a, and the molding compound 22a would then surround this projection and leave a "window" in grip part 2a in the shape of an arrow. Since the twist part 3a and the grip part 2a can be different colors as mentioned above, the twist part 3a can then be seen through the grip part 2a.

The disclosure now turns to various aspects of a twist-grip shifter relating to the present invention. It should be understood that components discussed herebelow may be considered to be interchangeable with similar components discussed hereinabove.

Figure 6:
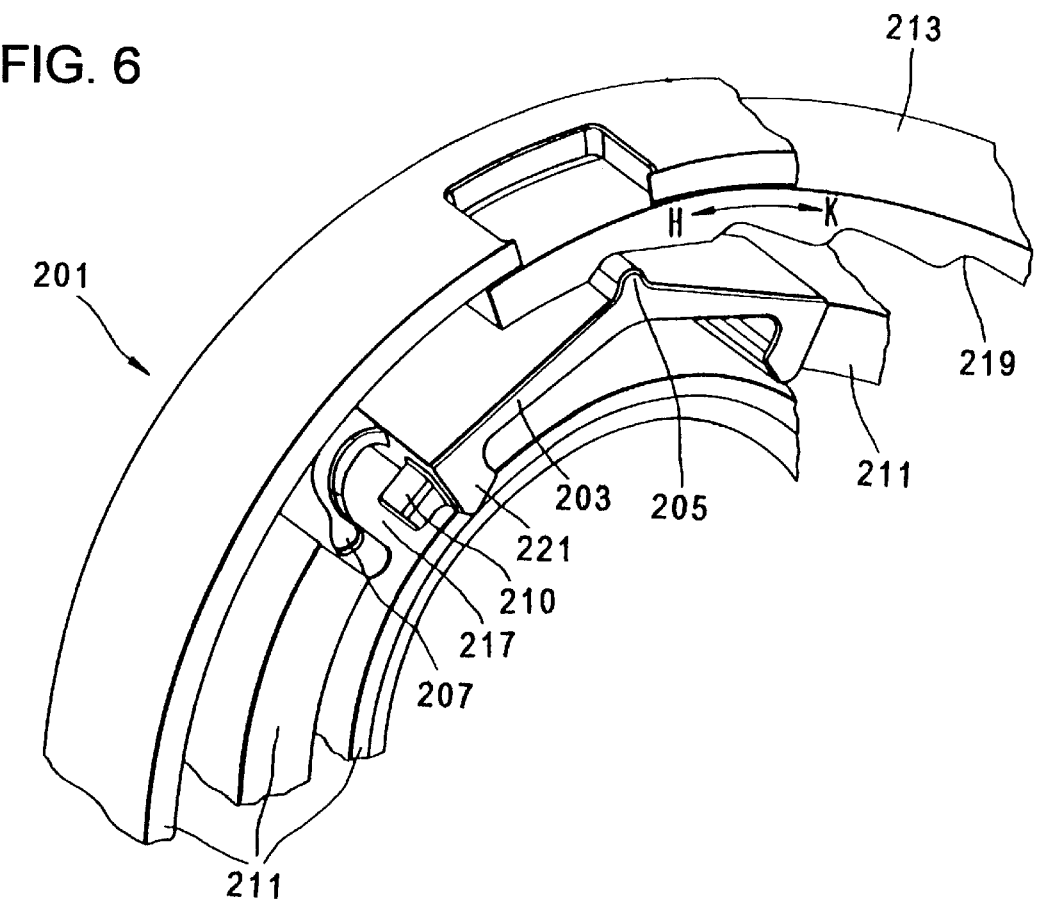
FIG. 6 shows a view in perspective of a shifter with a housing, a detent element and a detent spring with a transition spring.

FIG. 6 includes a latching or detent shifter for the actuation of a derailleur K. This detent shifter consists of a housing 211 which can be permanently connected or connected in a non-rotational manner to a part of a bicycle, a detent element 213 which is movably located inside this housing 211 and which is connected, possibly by means of a cable, on one hand to a manual actuator (designated H for direction indication in the figure) and on the other hand to the derailleur (designated K for direction indication in the figure) to be shifted to change the gear on the bicycle. The embodiment illustrated in FIG. 6 shows a twist-grip shifter located around a handlebar, the manual actuator H which is connected to the detent element 213. The detent element 213 is also connected to the first end of a control cable of a Bowden cable, while the second end of the control cable is connected to the derailleur K (see FIG. 7). The detent element 213 has detents 219 in which a lug 205 of a detent spring 203 is engaged. In this case, the detent spring 203 is in a stirrup-shape, and is supported by means of two projections 221 on the housing 211, by means of which the lug 205 is biased with respect to the detent element 213.

The detent spring 203 lies in a recess in a circumferential portion in the housing 211 (see FIG. 11), by means of which the detent spring 203 is fixed in position in the circumferential direction. This fixing includes some additional play, namely the transition distance 217, within which the detent spring 203 can move back and forth in the circumferential direction. To orient the detent spring 203 on a particular side, namely on the side facing the manual actuator H, there is a transition spring 207 which can preferably be connected in one piece with the detent spring 203, but which transition spring 207 can also be in the form of a spring plate 207b (FIG. 8), or as a separate transition spring in the form of a coil spring 207c (FIG. 9). There can also be a stop 210 which correctly limits the travel of the transition spring 207 and defines the transition distance 217.

FIG. 10 shows a detent spring 203' which is also in the shape of a stirrup and includes a leaf spring made of steel band material. This detent spring 203' also has a lug 205' to increase a retaining force with respect to the detents 219 in the detent element 213, which force results from a bias which is generated by two projections 221' and 221", which projections 221' and 21" are supported on the housing 211. At the projection 221', the detent spring 203' can be connected in one piece to a transition spring 207', which transition spring 207' can be applied against the flank on the housing 211. To increase the flexibility of the transition spring 207', notches 207" can be created which reduce the thickness of the band material in certain places and make possible a softer spring constant than the regular thickness of the band material of which the detent spring 203' is made.

Figure 7:
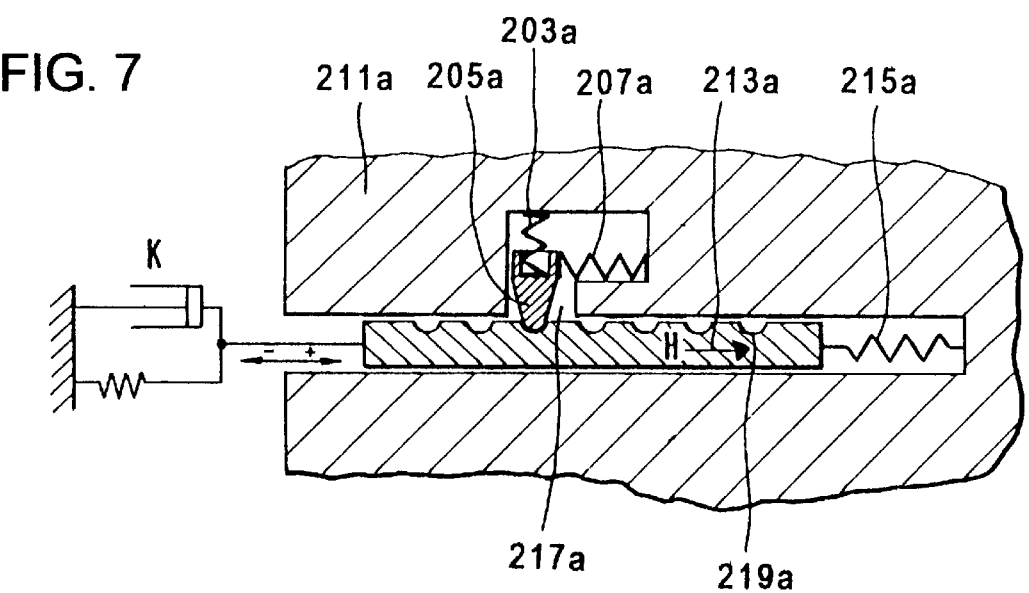
FIG. 7 shows a schematic illustration of the elements which participate in the shifting action.

FIG. 7 is a schematic diagram which illustrates the function of the detent shifter 201. By analogy to FIG. 6, the parts shown in FIG. 7 are identified by the same numbers plus the letter "a".

If the detent element 213a in the housing 211a is pulled by the manual actuator H toward the manual actuator H, the chain is to be shifted from a smaller sprocket to the next larger sprocket. On account of the lower tendency of the chain to ascend in this direction of shifting, the desired position of the derailleur K is overshot by the transition distance 217a, as a result of which the angle of ascent of the chain with respect to the larger sprocket increases and the shifting takes place. With the current quality of the shifting elements of derailleurs, it is sufficient to hold this transition position only for a very brief time, which means that the user need only shift to the next resistance, and then let go. Without noticing or even intending to do so, the rider has used the transition distance 217a.

As shown in FIG. 7, the detent element 213a can be connected to the housing 211a by means of a compensation spring 215a, which has the advantage that the shifting motion toward the next larger sprocket is made easier, since the compensation spring 215a, acting as a tension spring, counteracts the spring force of the parallelogram of the derailleur K. Also, the compensation spring 215a can be eliminated, since the process of shifting between the detent element 213a and the detent spring 203a is not directly affected. If the detent element 213a is then moved further toward the manual actuator H, first the transition spring 207a is pressed together by the detent lug 205a and the transition distance 217a is reduced by the detent lug 205a to the detent spring 203a. Essentially only then does the detent lug 205a jump out of the respective detent 219a and slide into the next detent 219a, whereby the position of the detent lug 205a on the detent spring 203a does not change. Only after the manual actuator H is released does the transition spring 207a, in connection with the return spring in the derailleur K, bring the detent element 213a back into the desired correct shifting position.

In other words, in accordance with one embodiment of an invention, when the manual actuator H pulls the detent element 213a, the detent lug 205a compresses the transition spring 207a. When the detent lug 205a fully reduces the transition distance 217a, the detent lug 205a rises out of the current detent 219a and slides into the next detent 219a. The rising of detent lug 205a compresses the detent spring 203a. The force of the detent spring 203a pushes the detent lug 205a into the next detent 219a. After the manual actuator H is released, the force of the transition spring 207a, along with effect of the return spring in the derailleur K, brings the detent element 213a back into the desired correct position wherein the derailleur K is aligned with the chain over the newly selected gear.

One feature of an invention resides broadly in the shifter for a derailleur for bicycles, comprising a housing 211, a detent element 213 which is connected both to the manual actuator H and to the derailleur K, as well as a detent spring 203 made of elastic plastic material, the lug 205 of which interacts with detents 219 of the detent element 213 and can have a transition distance 217 between the housing 211 and the detent spring 203, characterized by the fact that the detent spring 203 is located in a recess of the housing 211, whereby also located in the recess, in addition to the detent spring 203, located downstream in the direction of movement toward the manual actuator H, is a transition spring 207 which can apply a bias between the housing 211 and the detent spring 203 and can be compressed into a block.

Another feature of an invention resides broadly in the shifter characterized by the fact that the spring travel of the transition spring 207 corresponds to the specified transition distance on the derailleur K.

Yet another feature of an invention resides broadly in the shifter characterized by the fact that the transition spring 207 is connected in one piece with the detent spring 203.

Still another feature of an invention resides broadly in the shifter characterized by the fact that the detent spring 203 has a stop 210 which limits the transition distance 217 by interaction with the transition spring 207.

A further feature of an invention resides broadly in the shifter characterized by the fact that the transition spring 207b is realized in the form of a plate spring.

Another feature of an invention resides broadly in the shifter characterized by the fact that the transition spring 207c is realized in the form of a coil spring.

Yet another feature of an invention resides broadly in the shifter for a derailleur for bicycles, comprising a housing 211, a detent element 213 which is connected both to the manual actuator H and to the derailleur K, as well as a detent spring 203', the lug 205' of which interacts with detents 219 of the detent element 213 and can have a transition distance 217 between the housing 211 and the detent spring 203', characterized by the fact that the detent spring 203' is located in a recess of the housing 211, whereby also located in the recess, downstream of the detent spring 203' in the direction of movement toward the manual actuator, there is a transition spring 207' which is connected in one piece with the detent spring 203', and which can apply a bias between the housing 211 and the detent spring 203'.

Still another feature of an invention resides broadly in the shifter characterized by the fact that the detent spring 203 is made of steel band material.

An invention generally relates to a twist grip shifter for a bicycle transmission. The twist grip shifter can be a latching shifter for the actuation of bicycle transmissions, such as hub transmissions or derailleurs. The latching shifter includes a housing and a latching element, which latching element has notches. The latching shifter further includes a latching spring, which latching spring has at least one latching lug. The latching spring also has two projections, which projections are located opposite the latching lug, viewed in the direction of the transmission of force. The latching shifter includes a recess for the latching spring and stop surfaces located on the housing.

French Patent No. 25 40 818 discloses a latching shifter which, as shown in that publication's FIG. 7, has a biased latching spring with a latching lug which is engaged with bias in a profile of the latching element. This bias is constant and is a function of the level of the recess in the housing of this shifter in which the latching spring rests to generate the bias by means of two clip-like or bracket-like ends. The arrangement operates, as shown in the publication's FIG. 6 or 9, to generate sound, whereby in this case, the bias is constant.

An object of an invention, in particular, with twist grip shifters, is to advantageously increase or decrease the latching of the latching spring with the latching element by increasing or decreasing the bias. The rider can thereby individually select a shifting force which can be to suit the rider's own requirements regarding the relationship between the shifting force which must be exerted and the retention force of the latching. Unintentional shifts can be prevented, if the rider can adjust the retention force of the latching of the latching shifter so that the manual actuator on the latching shifter can stop rotating just as it enters the new gear.

An object of an invention is, therefore, to create a shifter for bicycle transmissions, the latching of which shifter, in relation to the retention force of the shifter, can be individually adjusted by modifying the bias of the parts which are to be latched with one another.

The object can be achieved by designing the latching spring to interact with a slide or bar, to generate a bias of the latching lug in the notches of the latching element. The two projections can thereby be biased at different levels by selectively changing the position of the slide from a first bias area, which first bias area can include a first level, or to a second bias area, which second bias area can include a second level, or to a third bias area, which third bias area can include a third level, etc.

In accordance with an embodiment of an invention, the bias areas can be designed, in terms of the width of the bias areas, such that a displacement of the latching spring can be possible by the order of magnitude of a transition distance. The transition distance can be specified by the latching spring and a stop surface essentially without changing the level.

In accordance with another embodiment of an invention, the slide can permit a continuous change of the level of the projections by means of an inclined plane, which inclined plane can correspond to each of the bias areas.

Figure 11:
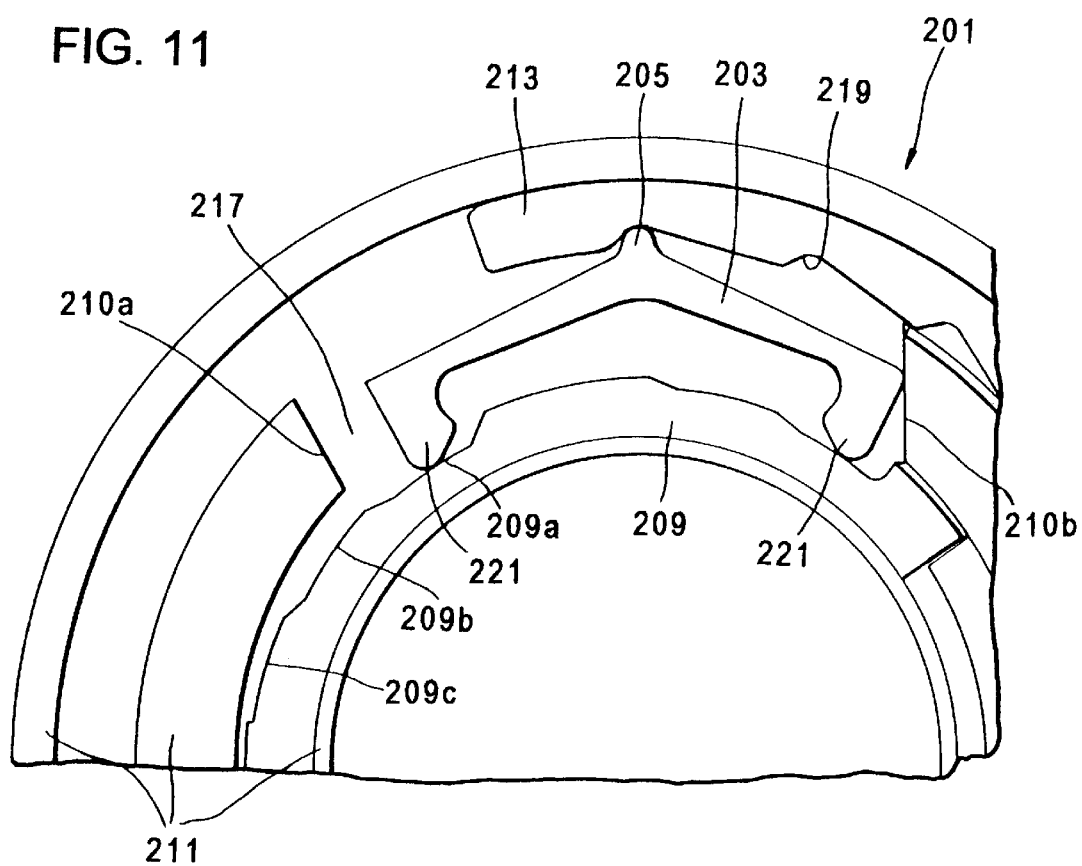
FIG. 11 shows a portion of a latching shifter with a housing, a latching element, a latching spring and a slide, with several bias stages.

One embodiment of an invention, as shown in FIG. 11, includes a detent or latching shifter 201 which can be, in particular, a twist grip shifter for the actuation of bicycle transmissions, such as hub transmissions or derailleurs. The latching shifter 201 can include a housing 211 and a detent or latching element 213, which latching element 213 can have detents or notches 219. The latching shifter 201 can also include a detent or latching spring 203. The latching spring 203 can preferably include a detent or latching lug 205 and two projections 221. The latching spring 203 can also have a slide 209 with various bias stages 209a, 209b, 209c etc. The bias stages 209a, 209b, 209c etc. can interact with the projections 221 of the latching spring 203.

The housing 211 can preferably be non-rotationally connected to the handlebar of the bicycle in the vicinity of the grip part. On the orbit of the latching spring 203, there can preferably be a recess, which recess can be formed by the stop surfaces 210a and 210b. In other words, there is a recess in a circumferential portion of the housing that is limited on one end by stop surface 210a and on the other end by stop surface 210b. The latching spring 203 can be located in this recess. The latching spring 203 can be in contact with the one stop surface 210a by means of the spring force generated by the bicycle transmission. Between the latching spring 203 and the other stop surface 210b, there can be a clearance, which clearance can represent a transition distance 217, whereby the position of the latching spring 203 in its rest position can be defined.

In accordance with one embodiment of an invention, therefore, the housing 211 can preferably be attached to the handlebar such that the housing 211 cannot rotate with respect to the area of the grip part of the handlebar. The latching spring 203 can preferably be located within the recess, which recess can include a space essentially between the stop surface 210a and the stop surface 210b. The latching spring 203 can orbit or move within this recess. One side of the latching spring 203 can preferably be biased against the stop surface 210b. The other end of the latching spring 203, which other end can face away from the stop surface 210b, can face toward the stop surface 210a. The transition distance 217 can thereby include the space or clearance between the end of the latching spring 203 and the stop surface 210a. The amount of clearance of the transition distance 217 can remain essentially constant when the latching spring 203 is in a rest position.

The recess in the housing 211 can be crossed or overrun by the latching element 213, which latching element 213 can preferably be connected to the rotational portion of the twist grip shifter. The latching element 213 can have several notches 219 facing the latching lug 205, as mentioned above, whereby a latching can occur when the latching lug 205 is essentially pressed with bias into the notches 219. This bias can be generated by the latching spring 203, which latching spring 203 can rest, by means of the two projections 221, on the slide 209. The slide 209 has the different bias stages 209a, 209b, 209c etc., each of which bias stages 209a, 209b, 209c etc. can lie on a different level with regard to the projections 221. The bias stages 209a, 209b, 209c etc. can be displaced in pairs, one after another, under the two projections 221, by changing the position of the slide 209.

Therefore, in accordance with one embodiment of an invention, the latching element 213 can be located along the outer portion of the recess, with reference to FIG. 11. The latching element 213 can rotate with respect to the rotational portion of the twist grip shifter. The latching element 213 can have several notches 219, which notches 219 can receive the latching lug 205 to thereby bias the latching spring 203 essentially between the latching element 213 and the slide 209. The latching spring 203 can include a pair of projections 221. The two projections 221 can simultaneously be displaced back and forth among the different bias stages 209a, 209b, and 209c etc. of the slide 209 by means of the rotation of the slide 209 in a clockwise or a counterclockwise direction with respect to FIG. 11.

Figure 12:
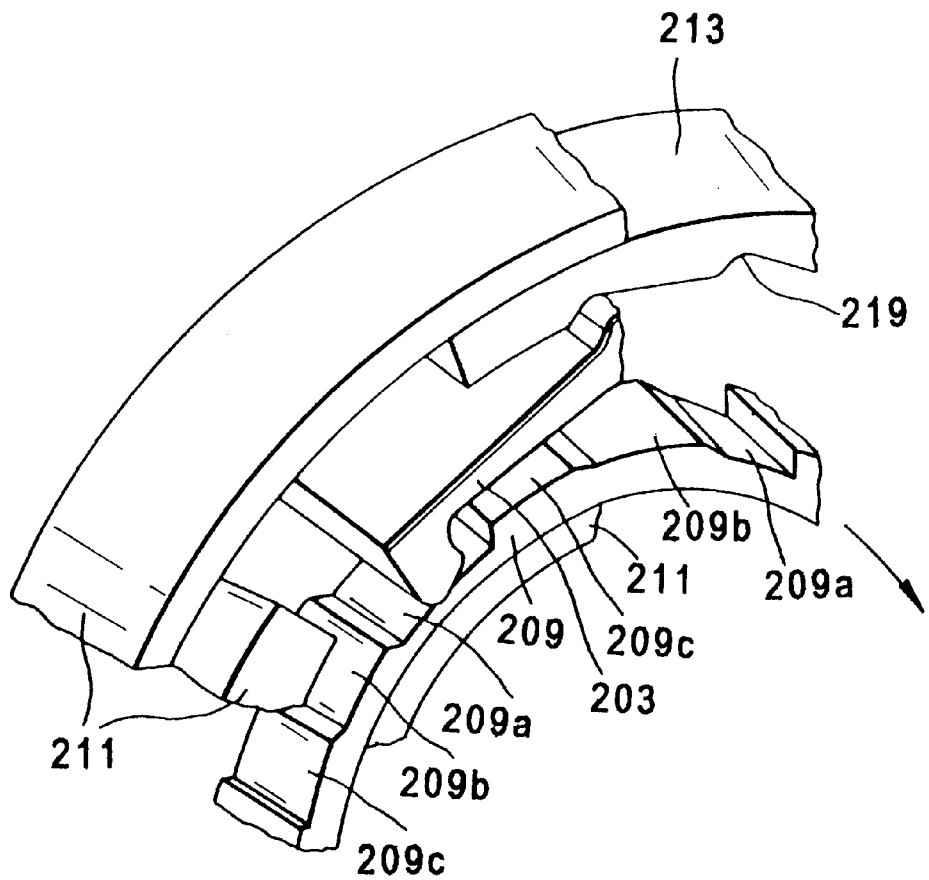
FIG. 12 shows a view in perspective of the portion of the latching shifter illustrated in FIG. 11, with a more detailed illustration of the slide.

In the position illustrated in FIGS. 11 and 12, the projections 221 of the latching spring 203 can each be considered to be on the bias stages 209a of the slide 209. In this position, the least bias is applied to the latching spring 203, which means that the latching element 213 can be pushed or pulled most easily from the retention position in the notch 219. If the slide 209 is rotated in the clockwise direction with respect to FIGS. 11 and 12, the projections 221 can be moved to the higher level of the subsequent bias stage 209b. As a result, the latching spring 203 can be essentially more strongly biased by the difference in level between the bias stages 209a and 209b, with the result that the latching spring 203 can develop a higher resistance against a rotational force. The retention force of the latching spring 203, when the bias stage 209c is subsequently moved under the projections 221 of the latching spring 203, can change accordingly.

Therefore, in accordance with one embodiment of an invention, when the two projections 221 are on the respective bias stages 209a, as shown in FIGS. 11 and 12, the least amount of biasing force can be applied to the latching spring 203. When the slide 209 is rotated in the clockwise direction, however, the two projections 221 can be biased against the respective bias stages 209b. As a result, because of the difference of levels between bias stages 209a and bias stages 209b, the latching spring 203 can thereby be more strongly biased between the latching element 213 and the slide 209. Similarly, when the slide 209 is further rotated in the clockwise direction, the two projections 221 can be biased against the respective bias stages 209c. As a result, because of the difference of levels between bias stages 209b and bias stages 209c, the latching spring 203 can thereby be even more strongly biased between the latching element 213 and the slide 209.

When the rotation of the slide 209 successively displaces the two projections 221 from the biasing stages 209a, to the biasing stages 209b, and then to the biasing stages 209c, etc., the bias of the latching spring 203 between the latching element 213 and the slide 209 can accordingly provide a greater resistance to the force of rotation.

The bias stages 209a, 209b, 209c etc. can be selected so that the peripheral extensions of each of the bias stages 209a, 209b, 209c etc. can be large enough that the latching spring 203 can be displaced by the peripheral length of the transition distance 217, without the projections 221 leaving the respective bias stage 209a or 209b or 209c etc. In other words, the circumferential length of the bias stages 209a, 209b, and 209c can be at least the length of the transition distance 217. Therefore, the latching spring 203 can move throughout the transition distance 217 without the projections 221 being displaced to another of the bias stages.

In summary, and in accordance with one embodiment of an invention, to essentially prevent the projections 221 from being displaced from the corresponding bias stages 209a, 209b, or 209c etc., the length of each of the bias stages 209a, 209b, and 209c etc. can be sized with respect to the length of the transition distance 217 such that the length of the bias stages 209a, 209b, and 209c etc. can preferably be relatively longer than the length of the transition distance 217. As a result, if the latching spring 203 essentially travels toward and along the transition distance 217, the projections 221 of the latching spring 203 can be prevented from leaving the corresponding pair of biasing stages 209a, 209b, or 209c etc. because the longer lengths of each of the biasing stages 209a, 209b, and 209c etc. can thereby compensate for the travel of the latching spring 203 along the shorter length of the transition distance 217.

Figure 13:
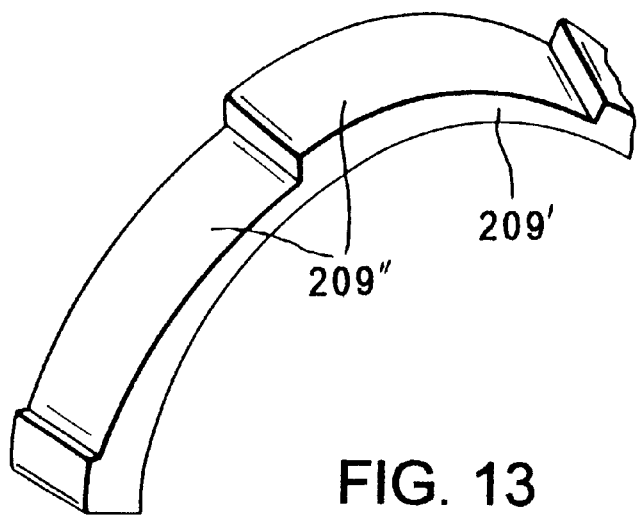
FIG. 13 shows a variant of the slide with the capability of continuously adjusting the bias of the latching spring.

FIG. 13 shows a slide 209' with contact surfaces 209", which contact surfaces 209" no longer include different bias stages. Each of the contact surfaces 209" can, however, include an inclined plane with a low angle of inclination, which has the special advantage that it can permit a continuous adjustment of the bias between the latching spring 203 and the latching element 213.

Therefore, in accordance with one embodiment of an invention, as shown in FIG. 13, each contact surface 209" of the slide 209' can include an arc-shaped or inclined surface. As a result, the height of one end of the contact surface 209" can be relatively shorter than the height of the other end of the contact surface 209" such that the height of the areas between the ends can thereby form an inclined plane of the contact surface 209". By realizing the contact surface 209" in the form of an arc-shaped or inclined plane, the bias of the latching spring 203 can be essentially continuously adjusted upon rotation of the slide 209'.

In general, with regard to the mode of operation of the latching shifter 201, it should be understood that the shifting motions can take place essentially exclusively by means of the latching element 213, since the latching element 213 can be connected on one hand directly to the twist grip, which twist grip can be actuated by the rider. And, on the other hand, the latching element 213 can be connected with the one end of a control wire of a Bowden cable, and the other end of the Bowden cable can be located on the adjustment mechanism of the derailleur, in which case the mechanism described here can change only the shifting resistance, in the order of the gears selected, with the ability to produce a stop in each gear, after the latching of the latching lug 205 in one of the notches 219 with the selective bias.

In accordance with one embodiment of an invention, therefore, the latching shifter 201 can operate by means of the motion of the latching element 213 since one end of the latching element 213 can be connected to the twist grip actuated by the rider. The latching element 213 can also be connected with one end of the Bowden cable, whereby the other end of the Bowden cable can preferably be connected to the derailleur to thereby adjust the shift resistance of the gears of the derailleur.

In accordance with one embodiment of an invention, one feature of an invention resides broadly in the latching or notching shifter 201 for a bicycle transmission, comprising a housing 211, a latching element 213 with notches 219, a latching spring 203 with at least one latching lug 205, two projections 221 which are located opposite the latching lug 205, viewed in the direction of the transmission of force, and a recess for the latching spring 203 with stop surfaces 210a and 210b on the housing 211, characterized by the fact that the latching spring 203 interacts with a slide 209 to generate a bias of the latching lug 205 in the notches 219 of the latching element 213, whereby each of the two projections 221 can be biased at different levels by selectively changing the position of the slide 209 from a first bias area 209a with a first level, or a second bias area 209b with a second level, or a third bias area 209c with a third level, etc.

In accordance with one embodiment of an invention, another feature of an invention resides broadly in the latching shifter characterized by the fact that the bias areas 209a, 209b, 209c etc. are designed in terms of their width so that a displacement of the latching spring 203 is possible by the order of magnitude of a transition distance 217 specified by the latching spring 203 and stop surface 210b without changing the level.

In accordance with one embodiment of an invention, yet another feature of an invention resides broadly in the latching shifter characterized by the fact that the slide 209' makes possible a continuous change of the level of the projections 221 by means of an inclined plane which corresponds to each of the bias areas 209a, 209b, 209c etc.

Figure 15:
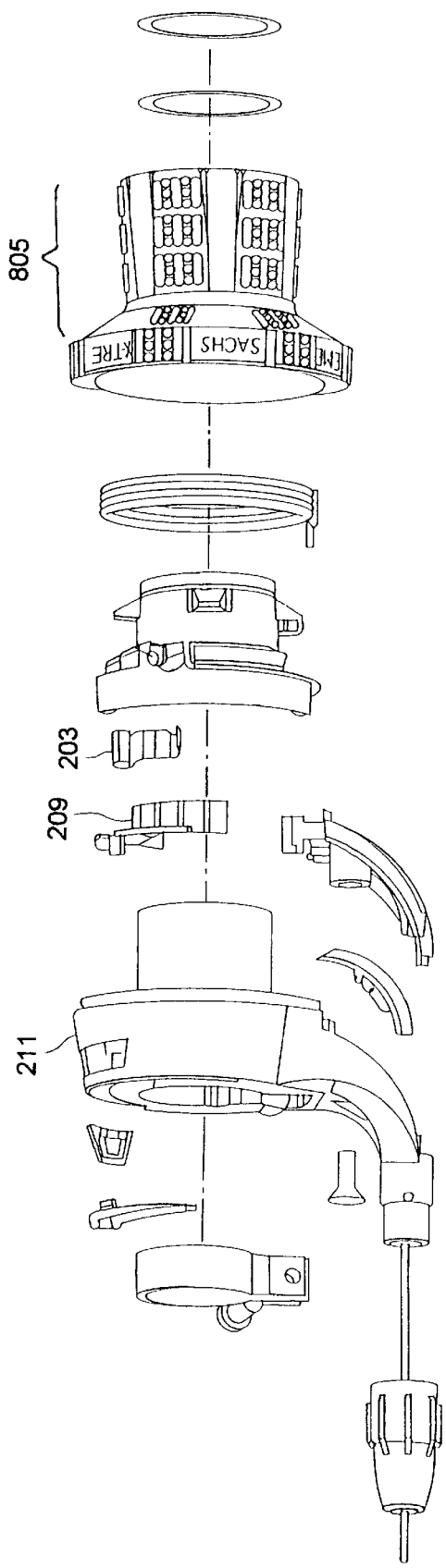
FIG. 15 shows an exploded view of the twist grip shifter assembly shown in FIG. 14.
Figure 14:
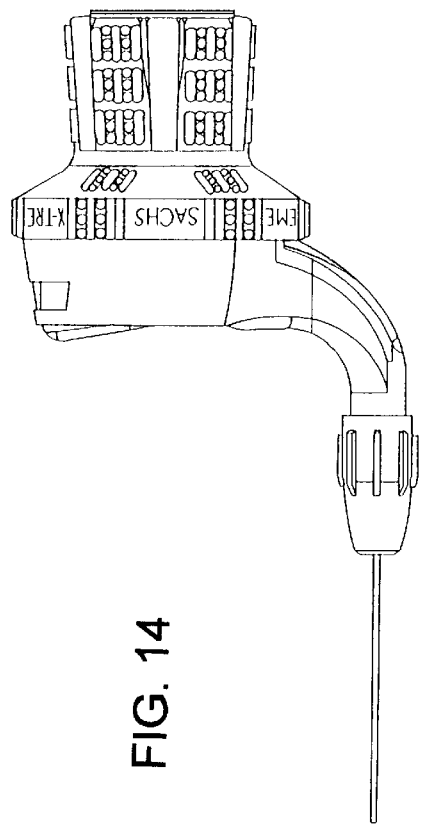
FIG. 14 shows a complete twist grip shifter assembly.

FIG. 14 shows a complete twist grip shifter assembly. FIG. 15 shows the assembly in an exploded view. The exploded view shows the spatial relationship of the various components of the assembly as they would appear in an embodiment of the present invention. FIG. 15 shows the internal components: the slide 209 and the detent spring 203, and how they are positioned with respect to each other. The detent spring 203 rests on the slide 209 as it is positioned within the housing 211. Also, FIG. 15 shows the rotational grip part 805 which surrounds the internal components and joins the housing 211.

Figure 16:
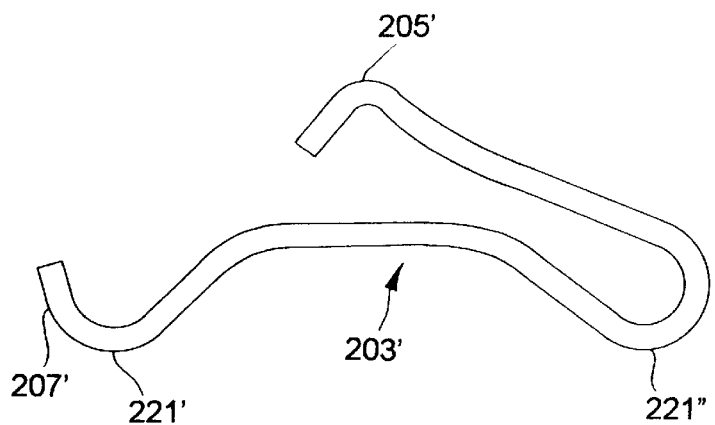
FIGS. 16 and 17 show two different aspects of one embodiment of the detent spring.
Figures 17, 18:
FIGS. 18, 19 and 20 show various aspects of one embodiment of the slide.

FIGS. 16 and 17 show two different aspects of one embodiment of the detent spring 203'. The aspects shown in FIGS. 16 and 17 are of a variant of the detent spring 203' as shown in FIG. 10. The detent spring 203' shown in FIGS. 16 and 17 does not have the notch 207" as shown in FIG. 10, but it does illustrate the joining of the detent spring 203' and the transition spring 207' as they would appear in a band steel embodiment.

Figure 19:
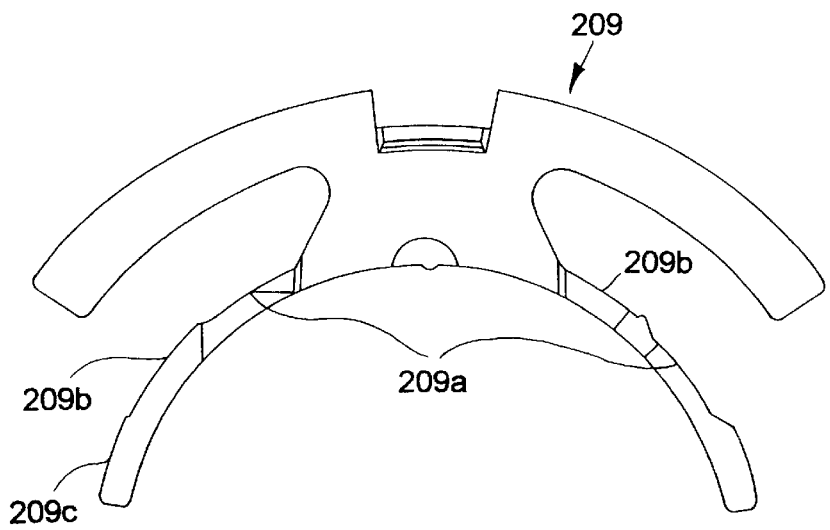
Figure 20:
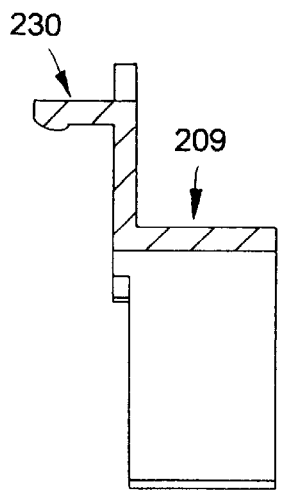
Figure 21:
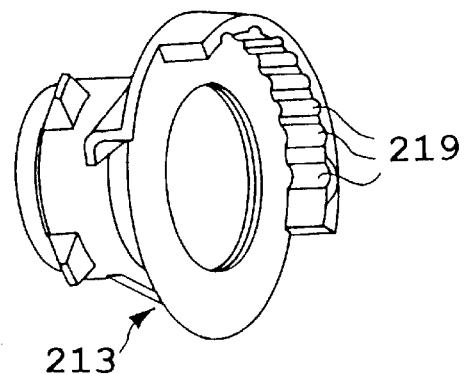
FIGS. 21, 22, 23, 24, and 25 show various aspects of one embodiment of the detent element.
Figure 22:
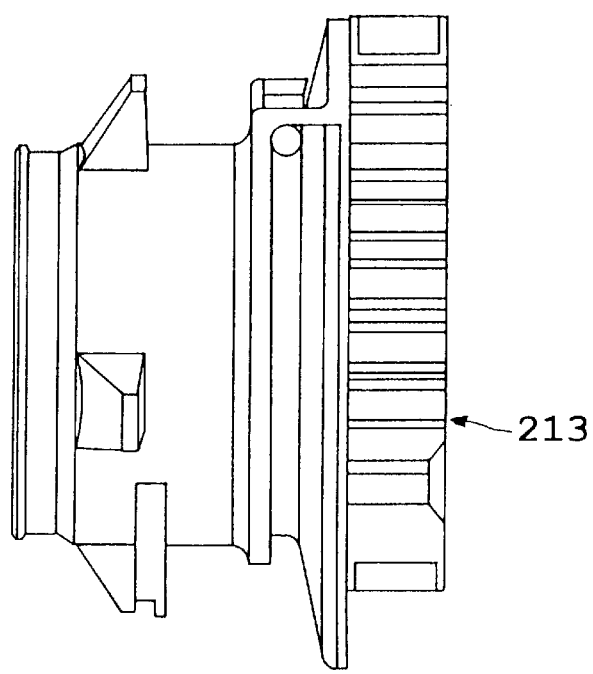
Figure 23:
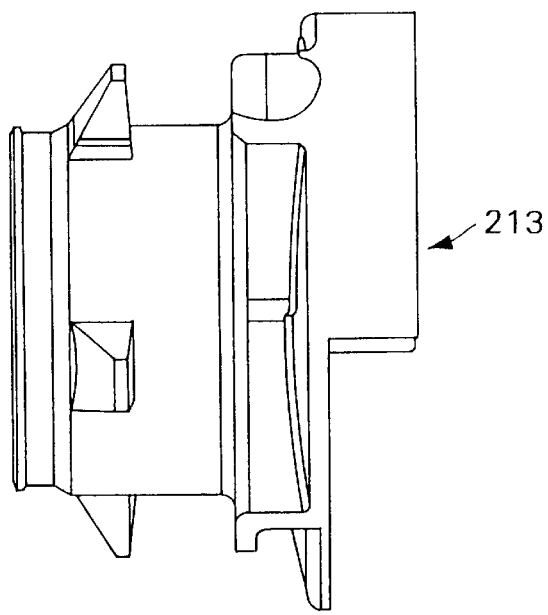
Figure 24:
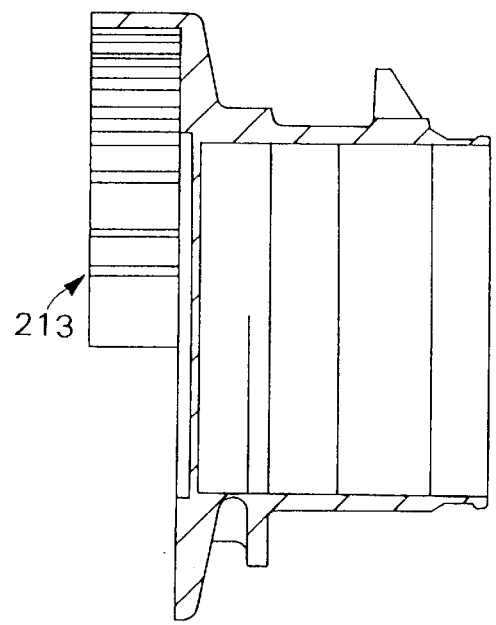
Figure 25:
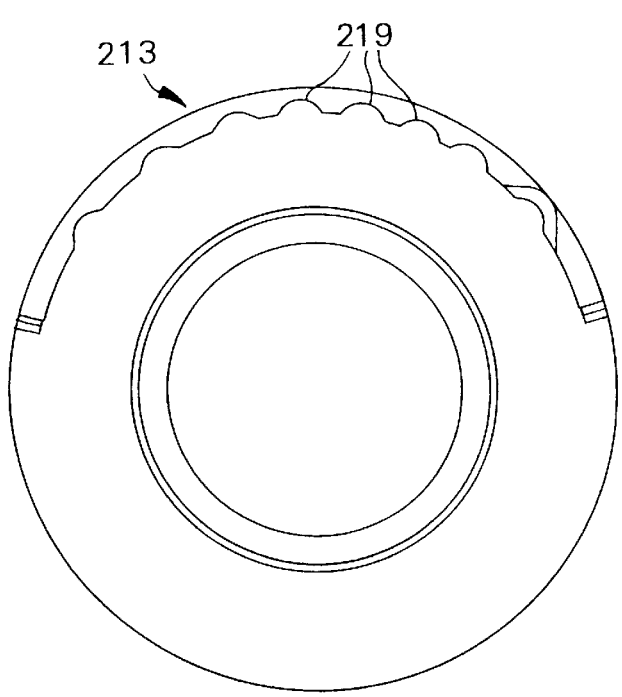

FIGS. 18, 19 and 20 show various aspects of one embodiment of the slide 209. The views shown in these FIGS. 18 and 19 provide different angles which show the bias stages 209a, 209b, and 209c. The FIGS. 18, 19 and 20 show the joining tang 230 which connects the slide 209 through an opening in the housing 211 to the user operated control that is used to reposition the slide 209 and thus to tune the bias to the user's preference.

FIGS. 21, 22, 23, 24 and 25 show various aspects of one embodiment of the detent element 213. The views shown present the parts of the detent element main body that interfaces with the rotational grip part 805. The various connecting prongs may be used to facilitate the user's selection of gear. Also, the FIGS. 21 and 25 clearly show the detent 219 positions that the lug 205 could rest in to restrain the actuator cable.

Figure 26:
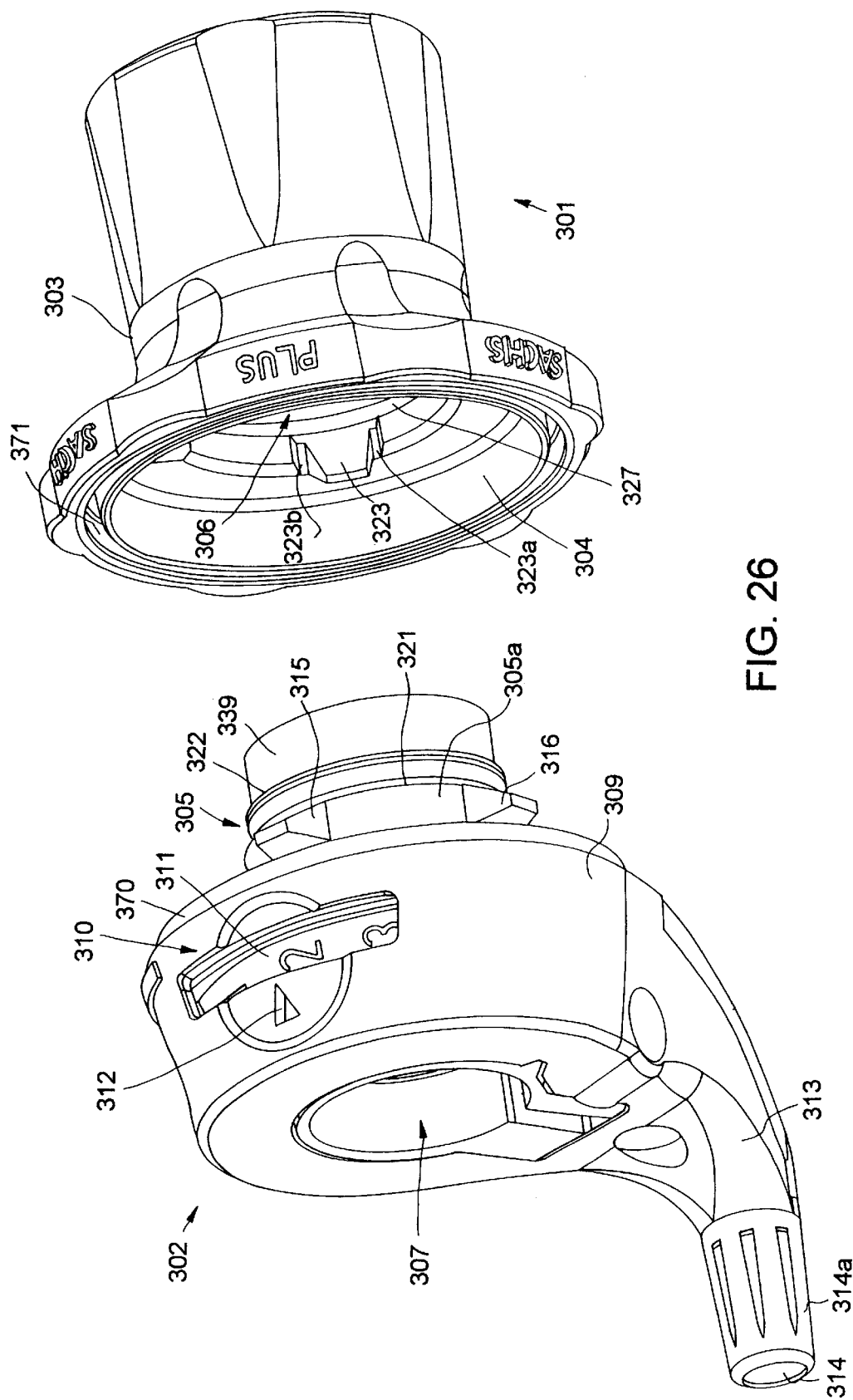
FIG. 26 shows an exploded view of a twist grip and a cable winding mechanism of a twist-grip shifter.
Figure 51:
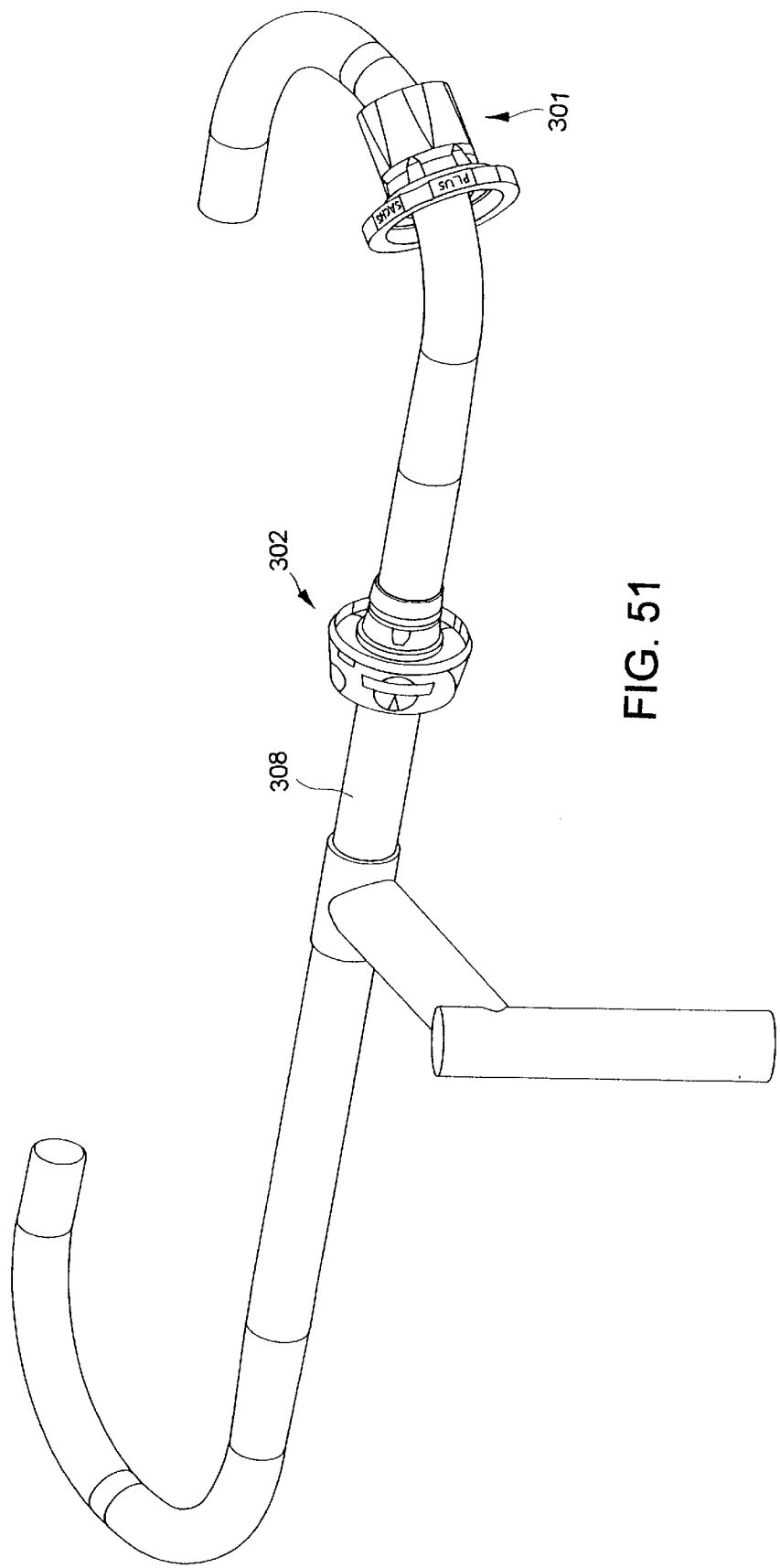
FIG. 51 shows the twist grip shifter similar to that of FIG. 26 being assembled on a handlebar of a bicycle.

FIG. 26 shows an exploded view of a twist-grip shifter including a twist grip or grip part 301 and a cable winding portion 302, which cable winding portion 302 houses a cable winding mechanism or winding drum 305. The twist grip 301 can preferably have an exterior portion or grip part 303 which the rider can grip to shift the gears of the bicycle transmission, and an interior portion or twist part 304, which interior portion 304 can be configured for accommodating a tubular extension 305a of the cable winding mechanism 305. Each of the twist grip 301, the cable winding portion 302, and the cable winding mechanism 305, which cable winding mechanism 305 fits inside the cable winding portion 302, can have longitudinal holes 306, 307, and 305b (see FIG. 42), respectively, for accommodating a handlebar 308 (see FIG. 51). The exterior portion 303 of the twist grip 301 can, in accordance with one embodiment, be made of an elastic and/or rubber material, in order to provide a non-slip surface for the fingers and/or hand of the rider.

The exterior portion 303 and the interior portion 304 of the twist grip 301 can be firmly attached to one another, for example by the molding method described further below, so that the twisting or rotational force applied by the rider to the exterior portion 303 is transmitted to the interior portion 304, in order to shift the gears of the bicycle.

The cable winding portion 302 can preferably include an outer housing 309, which housing 309 houses the cable winding mechanism 305 and other components. The housing 309 can include a shifting indicator 310 with a gear display 311, and an indicator 312, such as an arrow or other marking, so that the rider can visually surmise the current gear of the bicycle transmission. The bicycle transmission, for example, can be a hub transmission or a derailleur transmission such as that shown in FIG. 52. The cable winding portion 302 can also include an arm 313, through which arm 313 a shifting cable (not shown here but see FIGS. 49 and 50) passes by means of a hole 314, and a cable connection or cap 314a. The cable connection 314a can preferably be fastened to the end of arm 313, for example by a threaded connection or other fastening means. The shifting cable can be connected on one end to the cable winding mechanism 305 by threading the cable through a guide 305c (see FIGS. 42, 43 and 44) and then threading the end of the cable through an orifice 305f (see FIG. 43) formed in the guide 305c. The cable can then be held in the orifice 305f by means of a cap 305e (see FIG. 47), which cap 305e can be fixed on the end of the cable, for example by crimping. Thus, the cable can be held in place by means of the cap 305e, which cap 305e can have a larger diameter than the orifice 305f. The orifice 305f can preferably have one end 305d which is flared or wider than the diameter of orifice 305f, in which end 305d the cap 305e can he located. The other end of the cable can then be connected to the transmission of the bicycle.

FIG. 26 shows the twist grip or grip part 301 and the cable winding portion 302 disassembled from one another in order to illustrate the seal between the two parts. Since it is highly desirable to prevent dirt and debris from entering the interior of the twist-grip shifter, a seal can preferably be provided adjacent the connection of the cable winding portion 302 and the twist grip 301. In accordance with the embodiment shown in FIG. 26, the seal can be a contactless or frictionless seal that includes a collar or flange 370 disposed about the connecting end of the cable winding portion 302, and a groove 371 formed in the connecting end of the interior portion 304 of the twist grip 301. The collar 370 can be integral with the housing 309, or can be separate component and attached to the housing 309.

The collar 370 of the cable winding mechanism 302 can preferably be positioned with respect to the groove 371 so that when the cable winding portion 302 and the twist grip 301 are fastened to one another, as discussed in detail herebelow, the collar 370 essentially does not contact the walls of the groove 371. When fully assembled, the twist grip 301 can rotate along with the cable winding mechanism 305, which cable winding mechanism 305 is located inside the cable winding portion 302, and the collar 370 and housing 309 of the cable winding portion 302 can remain essentially stationary with respect to the twist grip 301 and the cable winding mechanism 305. Thus, the groove 371 can rotate with respect to the collar 370.

Figure 27:
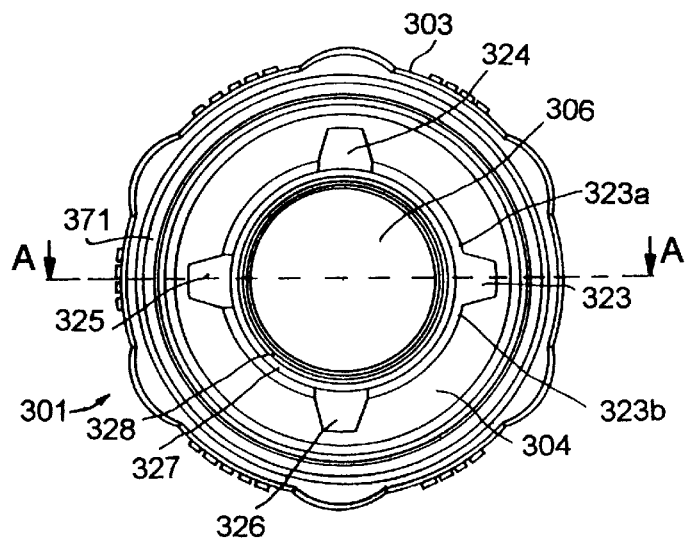
FIG. 27 shows an end view of the twist grip of the twist-grip shifter shown in FIG. 26.
Figure 28:
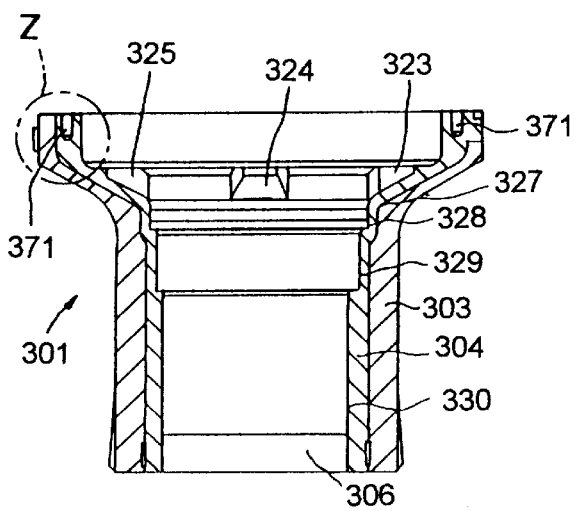
FIG. 28 shows a cross-section of the twist grip shown in FIG. 26.
Figures 29, 29A, 30:
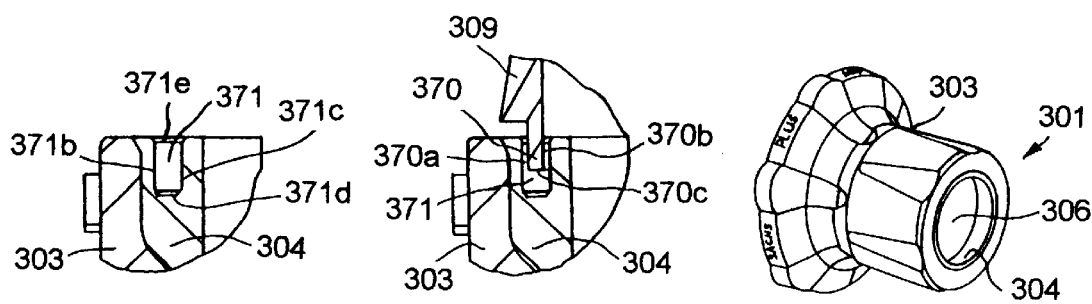
FIG. 29 shows an enlarged view "Z" of the twist grip shown in FIG. 28.
FIG. 29a shows essentially the same view as FIG. 29, but shows the collar.
FIG. 30 shows an additional perspective view of the twist grip shown in FIG. 26.

FIGS. 27, 28, 29, 29a and 30 show additional views of the twist grip 301 shown in FIG. 26. Specifically, FIG. 27 shows an end view of the twist grip 301, wherein essentially the entire interior portion 304 can be seen. FIG. 28 shows a cross-section of the twist grip 301 along line A—A in FIG. 27, FIG. 29 shows an enlarged view of area Z shown in FIG. 28, FIG. 29a shows a view similar to FIG. 29 (but also shows the collar 370), and FIG. 30 shows an additional perspective view of the twist grip 301.

FIGS. 29 and 29a respectively show enlarged views of the groove 371 and the collar 370 disposed within the groove 371. The groove 371 can preferably have two essentially parallel side walls 371b and 371c, a bottom wall 371d, and a flared or angled end portion 371e. Collar 370 likewise can have a generally rectangular cross-section, with two essentially parallel side walls 370a and 370b, and a bottom wall 370c. As can be seen in FIG. 29a, the seal between the cable winding portion 302 and the twist grip 301 can be contactless, or virtually contactless, since the collar 370 preferably does not come into contact with the walls 371b, 371c, and 371d of groove 371.

Figure 31:
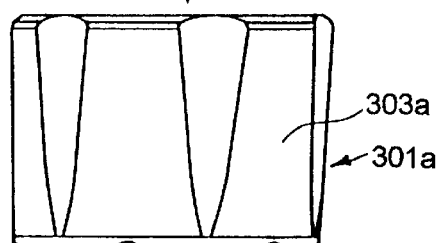
FIG. 31 shows a side view of the cable winding portion and a twist grip connected to one another.
Figure 31:
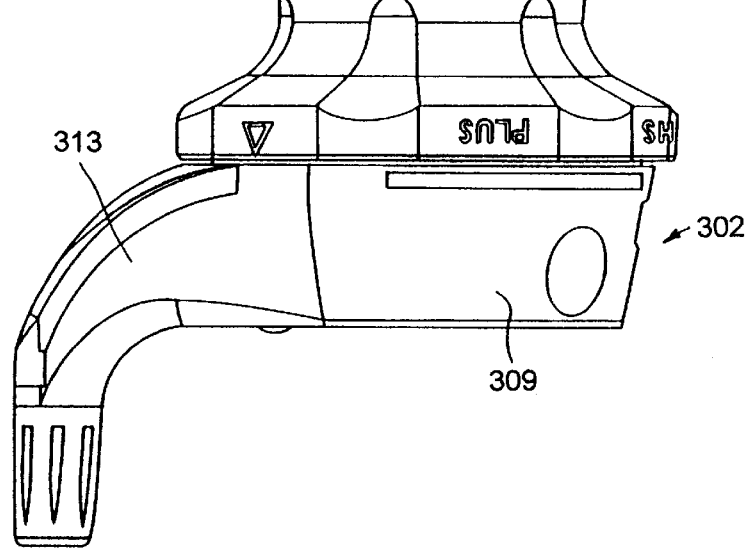
Figure 32:
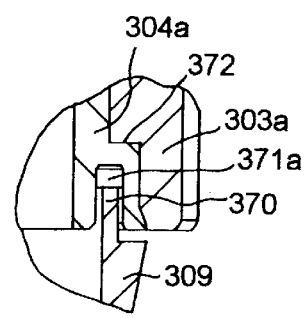
FIG. 32 shows a cross-section of the seal between the cable winding portion and the twist grip of FIG. 31.
Figure 33:
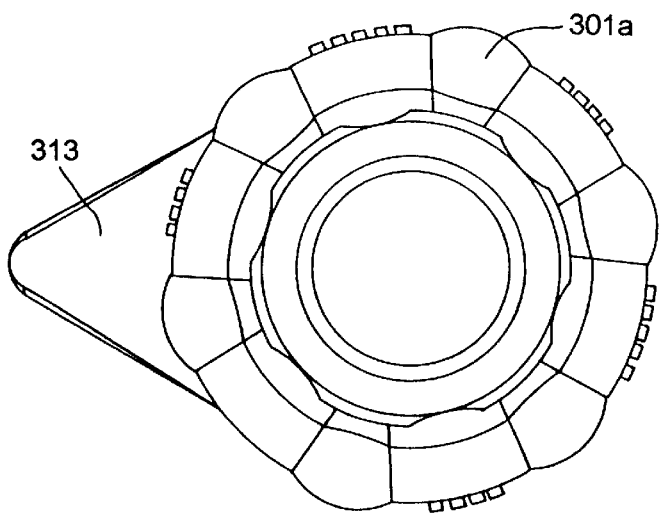
FIG. 33 shows view "B" of FIG. 31.

FIGS. 31, 32 and 33 show the cable winding portion 302 and an additional embodiment of a twist-grip 301a wherein the twist grip 301a has an end portion which is configured somewhat differently than that of the twist grip 301 shown in detail in FIGS. 29 and 29a. FIG. 31 shows a side view of the cable winding portion 302 and the twist grip 301a connected to one another, FIG. 33 shows view B of FIG. 31, and FIG. 32 shows a cross-section of the seal between the cable winding portion 302 and the twist grip 301a. Components of the twist grip 301a shown in FIG. 32 which are similar to components of the twist grip 301 have been given the same reference numbers plus an "a". Essentially the only difference between the end portion of the twist grip 301a and the end portion of the twist grip 301 is that the interior portion 304 of twist grip 301 (shown in FIGS. 29 and 29a) can preferably be rounded along its juncture with the exterior portion 303, and, in contrast, the end portion of twist grip 301a preferably has a stepped portion 372.

FIGS. 34, 35 and 36 show an additional embodiment of a twist-grip shifter in accordance with the present invention, wherein FIG. 34 shows a cross-section taken along line C—C in FIG. 36, which FIG. 36 shows an end view, and FIG. 35 shows a cross-section of the area "X" of FIG. 34, which shows the seal formed by twist grip 301z and cable winding portion 302z. Components which are similar to the components of the twist grip 301 and cable winding portion 302 have been given the same reference numbers plus a "z". The seal shown in FIG. 35 is similar to the seal shown in FIG. 32, with the exception that the embodiment shown in FIGS. 34, 35 and 36 does not include an exterior portion such as the exterior portion 303 and 303a shown in FIGS. 26 and 31, respectively.

FIGS. 37, 37a, 37b, 38 and 39 show an additional embodiment similar to that shown in FIGS. 26–30, but wherein the seal is not a contactless or frictionless seal, but can be considered a lip seal or friction seal. This type of seal is useful for bicycles which are primarily used for competitive events, such as racing for example, where debris can typically be much more common and plentiful. Thus, since the chance of debris entering the interior portion of the twist-grip shifter is typically greater with competition bicycles, a lip seal or friction seal may highly desirable. Essentially the only difference between the embodiment shown in FIGS. 37–39 and the embodiment shown in FIGS. 26–30 is that the exterior portion 303x of FIGS. 37–39 can preferably be molded to have a flange or lip seal 373. The seal 373 can preferably extend towards the collar 370, over part of the groove 371, and can ultimately contact the collar 370.

Figure 37:
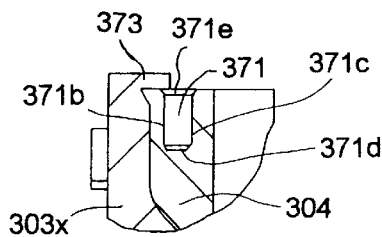
FIG. 37 shows a cross-section of the seal between the cable winding portion and twist grip of an additional embodiment of a twist-grip shifter.
Figure 37A:
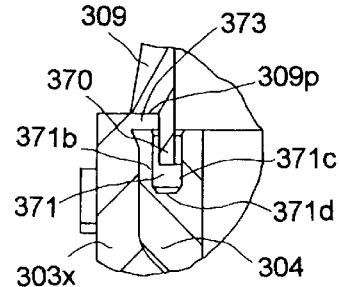
FIG. 37a shows a view similar to that of FIG. 37, but shows the collar.
Figure 38:
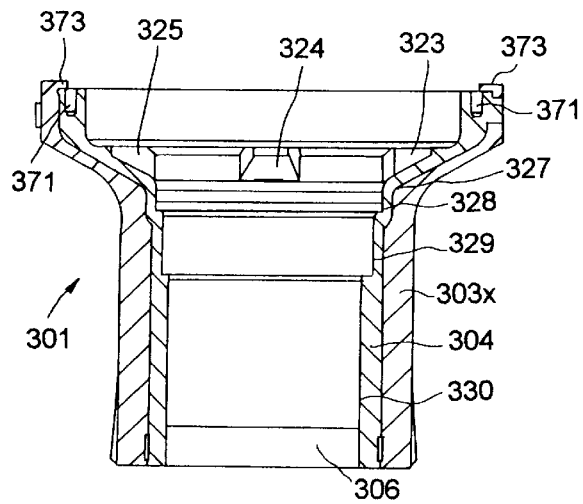
Figure 37B:
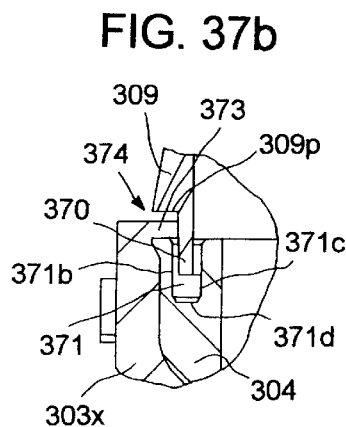
FIG. 37b shows a view similar to that of FIG. 37a, but shows an additional embodiment of a seal.
Figure 39:
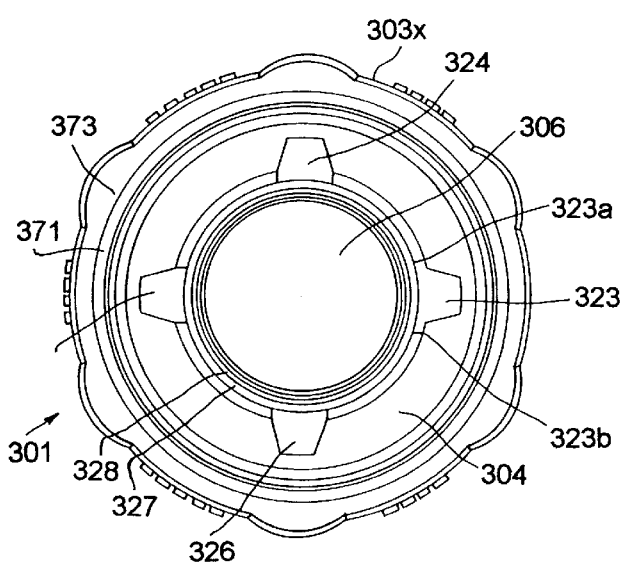
FIG. 39 shows an end view of the twist grip shown in FIG. 37.

As shown in FIG. 37a, the lip seal 373 can also contact a portion 309p of the housing 309, however, this contact between the housing portion 309p and seal 373 may not be necessary. In the embodiment shown in FIG. 37b, a gap 374 can preferably be disposed between the housing portion 309p and the seal 373, if desired.

FIGS. 40, 41, and 41a show an embodiment similar to that shown in FIGS. 31–33, but wherein the embodiments shown in FIGS. 40–41a instead include a lip seal or friction seal. The embodiments shown in FIGS. 40, 41 and 41a include a flange or lip seal 375 which can be molded from the exterior portion 303y. The seal 375 can, as discussed above with regard to FIGS. 37–39, extend toward the collar 370, over part of the groove 371, and can contact the collar 370. Similar to the the embodiments of FIGS. 37–39, the lip seal 375 shown in the embodiment of FIG. 41 can contact housing portion 309p. The embodiment shown in FIG. 41a can preferably include a gap 376 between housing portion 309p and seal 375.

Other types of seals which may be utilized in accordance with the present invention are presented herebelow, near the close of the instant specification. Thus, it should be understood that the types of seals discussed hereinabove are only several variations of seals which could be used in accordance with the present invention, and that the present invention should not be interpreted as being limited to the specific seals mentioned hereinabove.

With regard to the connection between the grip part 301 and the cable winding portion 302, as mentioned briefly above, on the tubular extension 305a of the cable winding mechanism 305, there can preferably be four claws or projections 315, 316, 317 and 318, wherein only claws 315 and 316 can be seen in FIG. 26 due to the orientation of the cable winding portion 302. The two remaining claws 317 and 318 are shown in FIGS. 42–44, 47 and 48.

Figure 42:
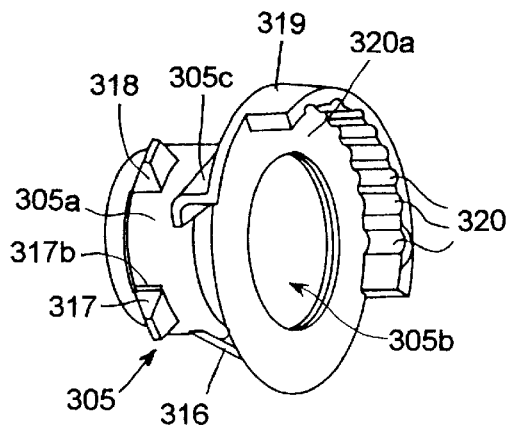
FIG. 42 shows a perspective view of the tubular extension of the cable winding mechanism.
Figure 43:
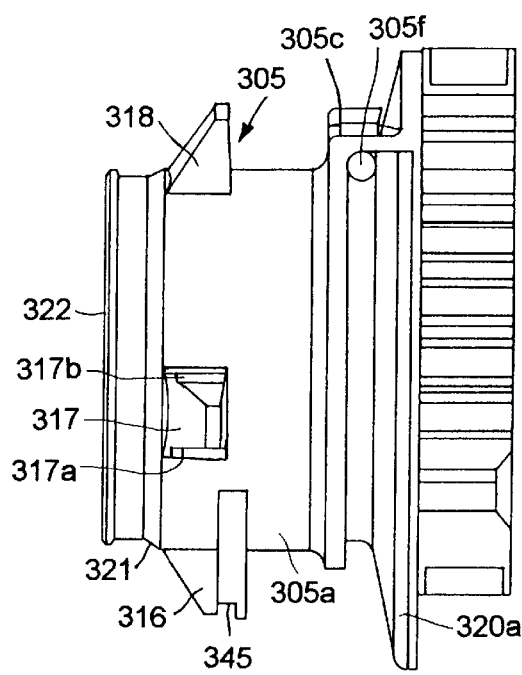
FIG. 43 shows a side view of the tubular extension of the cable winding mechanism.
Figure 44:
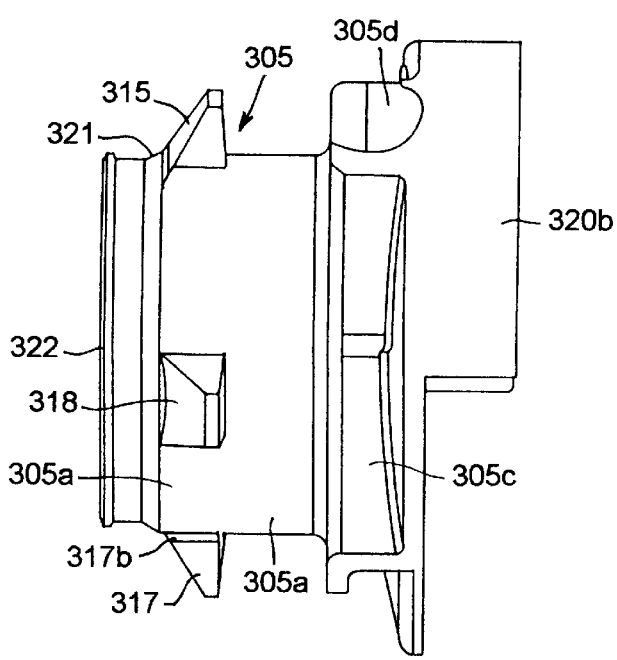
FIG. 44 shows an additional side view of the tubular extension of the cable winding mechanism, rotated by about 45° with respect to the view shown in FIG. 43.
Figure 45:
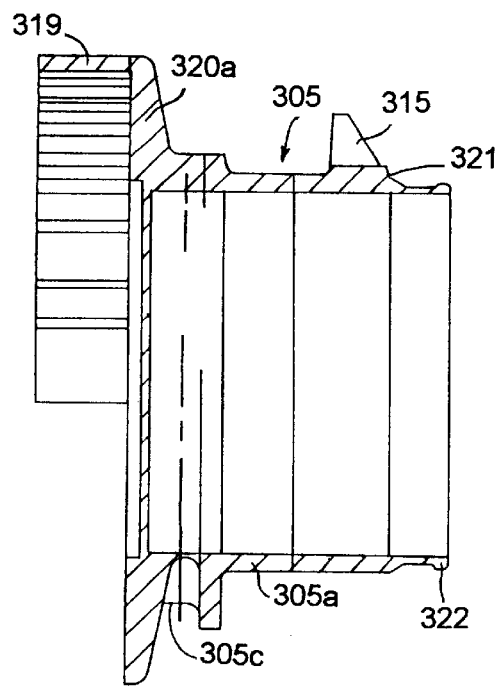
FIG. 45 shows a cross-section of the tubular extension of the cable winding mechanism.
Figure 46:
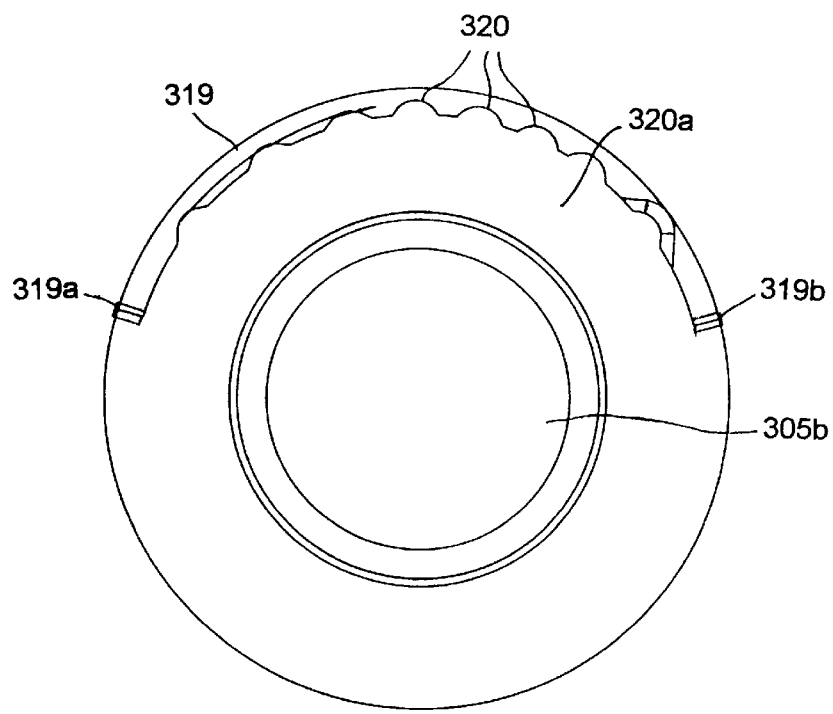
FIG. 46 shows an end view of the tubular extension of the cable winding mechanism.

FIG. 42 shows a perspective view of the tubular extension 305a of the cable winding mechanism 305, FIG. 43 shows a side view of the tubular extension 305a, FIG. 44 shows an additional side view of the tubular extension 305a rotated by about 45° from the view shown in FIG. 43, FIG. 45 shows a cross-section of the tubular extension 305a taken adjacent claw 315, and FIG. 46 shows an end view of the tubular extension 305a.

FIG. 46 also shows a latching element or detent element 319 having detents or notches 320, which latching element 319 is part of the internal shifting mechanism of the twist-grip shifter. The latching element 319 can, in accordance with one embodiment of the present invention, be part of, or integral with, the tubular extension 305a of the cable winding mechanism 305, and a disk portion 320a can serve to connect the latching element 319 and the tubular extension 305a to one another. Of course, latching element 319, tubular extension 305a, and disk portion 320a could also be separate components from one another, and could then be attached to one another by adhesive or other fastening means. The guide 305c discussed immediately above can be disposed on, and can preferably be part of, the disk portion 320a. Further, the side 320b of the latching element 319 which faces outwardly, opposite from the notches 320, can preferably have gear markings, such as numbers, which numbers, when the twist-grip shifter is assembled, can be seen through the gear display 311 (see FIG. 26). In addition, located at each of the two ends of the latching element 319, there can also be projections or stops 319a and 319b (see FIGS. 46 and 48), which stops 319a and 319b can serve to limit the rotation of the cable winding mechanism 305 within the housing 309, by interacting with corresponding stops inside the housing 309 (not shown here). The particular functioning of a latching element or detent element similar to the latching element 319 is discussed further above.

Figure 47:
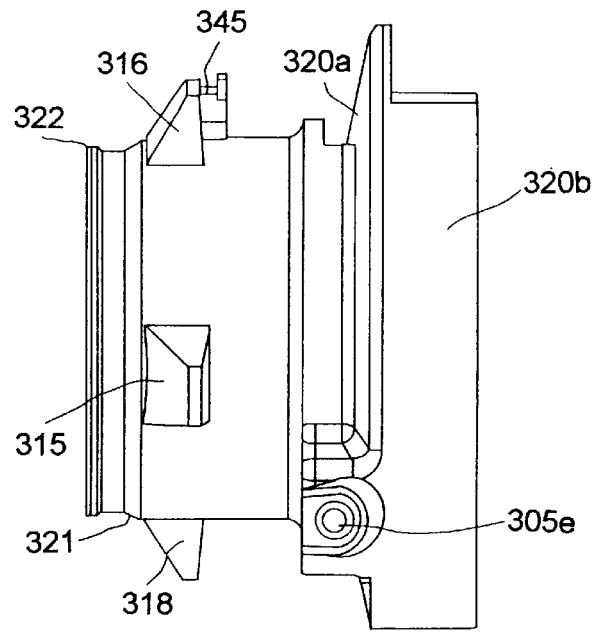
FIG. 47 shows an additional side view of the tubular extension of the cable winding mechanism, rotated by about 45° from the view shown in FIG. 44.
Figure 48:
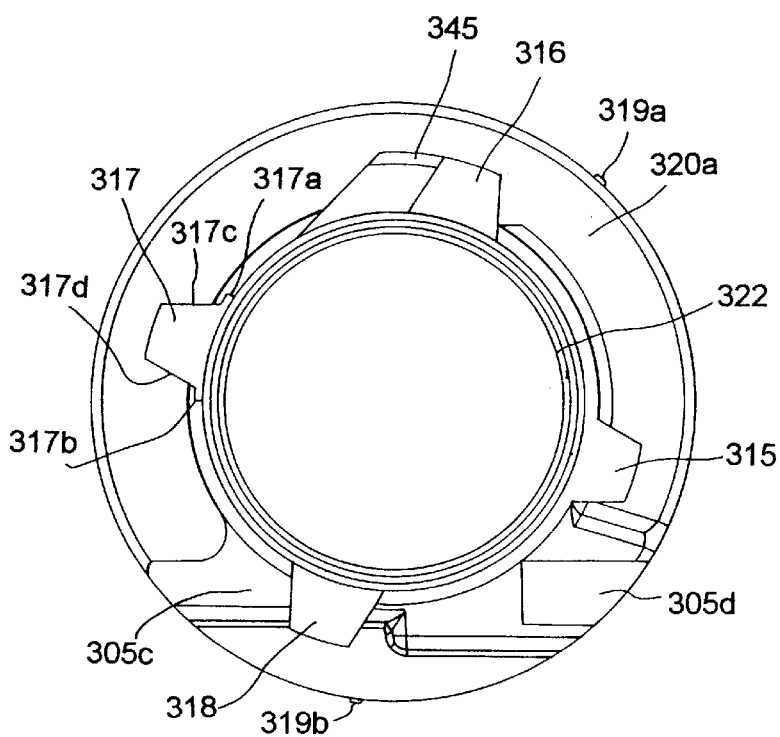
FIG. 48 shows an additional end view of the tubular extension of the cable winding mechanism, opposite of the end view shown in FIG. 46.

FIG. 47 shows another side view of the tubular extension 305a, rotated by about 45° from the view shown in FIG. 44. FIG. 48 shows an additional end view of the tubular extension 305a, opposite of the end view of the tubular extension 305a shown in FIG. 46.

In order to ensure the correct installation of the cable winding mechanism 305 of the cable winding portion 302 into the twist grip 301, one of the claws 315, 316, 317 or 318, in this particular case claw 317, can have a somewhat different configuration than that of the other claws 315, 316 and 318. Claw 317 can therefore have stepped portions 317a and 317b, which stepped portions 317a and 317b can preferably be located at the base of claw 317 (i.e. where claw 317 joins tubular extension 305a), and on both sides 317c and 317d of claw 317 (as best shown in FIG. 48). Of course other configurations of claw 317 would be within the scope of the present invention, and stepped portions 317a and 317b are presented as one example of a method for configuring claw 317 differently from the other claws 315, 316 and 318.

Twist grip 301, as shown in FIGS. 26, 27, 28 and 30, can, along the same lines, have four recesses 323, 324, 325 and 326 located in interior portion 304, in which recesses claws 315, 316, 317 and 318 of tubular extension 305a can be engaged. In FIG. 26 only one recess 323 can be seen, due to the particular orientation of the twist grip 301, but see FIG. 27. The recess 323 shown in FIG. 26 can preferably be configured to engage only with claw 317 of the tubular extension 305a, so that an incorrect installation of tubular extension 305a inside the twist grip 301 can be avoided. Thus, recess 323 can have stepped portions 323a and 323b for respectively engaging with stepped portions 317a and 317b of claw 317.

With regard to the above, a specific orientation of the twist grip 301 with respect to the cable winding portion 302 may be desirable if the twist grip 301 has a marking on the exterior portion 303 at its largest diameter, such as an arrow for example, which marking can be used to point to the current gear in gear display 311 located on housing 309 of the cable winding portion 302. In this case, the claw and recess which are to have the different configuration than that of the other claws and recesses should be selected so the location of the "special" claw and recess coordinate with the location of the gear display 311 on the housing 309. In other words, the location of the "special" claw and recess should be chosen so that the range of rotation of the twist grip 301 coordinates with the location of the gear display 311 on the cable winding portion 302. In this situation, the indicator 312 shown in FIG. 26 which is located on the housing 309 essentially would not be necessary, since a marking or gear indicator would instead be located on the exterior portion 303 of the twist grip 301. Thus, once the twist grip 301 is connected to the cable winding portion 302, the marking on the twist grip 301 can be utilized to indicate the current gear of the bicycle transmission by pointing to a gear number shown in the gear display 311. Alternatively, the above-discussed marking could simply be used to indicate the location where the cable winding portion 302 and the twist grip 301 can be disconnected from one another.

In addition, it should be understood that a greater or lesser number of claws 315, 316, 317, and 318 and recesses 323, 324, 325 and 326 would be within the scope of the present invention, provided that the number of claws is sufficient for transmitting the torque applied by the rider's hand or fingers to the cable winding mechanism 305.

In accordance with one embodiment of the present invention, the claws 315, 316, 317 and 318 can preferably be located at about 90° intervals from one another along tubular extension 305a. Similarly, recesses 323, 324, 325 and 326 can also be located at about 90° intervals from one another inside interior portion 304. Of course, it should be understood that the above-mentioned angular orientations of the claws 315, 316, 317, and 318 and recesses 323, 324, 325 and 326 with respect to one another are only one example of one type of configuration in accordance with the present invention, and that other configurations and/or orientations of the claws 315, 316, 317 and 318 and recesses 323, 324, 325 and 326 would be within the scope of the present invention.

The tubular extension 305a of the cable winding mechanism 305 can also preferably have an angled or sloped circular portion 321 located near claws 315, 316, 317, and 318, and a bead or flange 322 (see FIGS. 26, 43, 44, 45 and 47) located next to angled portion 321. Angled portion 321 can engage with a corresponding angled portion 327 (see FIG. 26) located in the interior portion 304 of the twist grip 301, and the bead 322 can likewise engage with a groove 328 located inwardly of angled portion 327 (see FIGS. 27 and 28). Thus, once the cable winding mechanism 305 has been inserted into the twist grip 301, and the claws 315, 316, 317 and 318 are engaged in a corresponding recess 323, 324, 325 and 326, bead 322 can be engaged in groove 328, and angled portion 321 can fit against angled portion 327. Once inserted into the twist grip 301, the tubular extension 305a will then be non-rotationally connected to the twist grip 301, such that when the twist grip 301 is turned by the rider, the interior portion or twist part 304 rotates, and thus rotates the tubular extension 305a, and, since the shifting cable is connected to the cable winding mechanism 305 by means of the guide 305c discussed hereinabove, the shifting cable can be moved along with the tubular extension 305a in order to change the gears of the bicycle by means of a hub transmission or derailleur transmission (see FIG. 52).

In other words, and in accordance with one embodiment of the present invention, one end of the control or shifting cable can preferably be fastened to the hub or derailleur transmission of the bicycle. This end of the cable can be biased by a spring or similar device in the bicycle transmission. The other end of the cable can be connected to the cable winding mechanism 305 by means of orifice 305f and guide 305c as discussed above. Thus, when for example, the rider upshifts (i.e. shifts from a lower gear to a higher gear), the cable is essentially released from the previous gear position, and can essentially be "unwound" from the tubular extension 305a of the cable winding mechanism 305. This motion of the cable can be assisted by the spring in the transmission which pulls on the cable. For this movement, i.e. upshifting, relatively little force is typically needed on the twist grip 301, so the portion of the twist grip 301 with the smaller diameter can preferably be used by the rider. Oppositely, when the rider downshifts (i.e. shifts from a higher gear to a lower gear), the cable is "wound" around the tubular extension 305a of the cable winding mechanism 305, against the force of the transmission spring. For this movement, i.e. downshifting, a larger force is typically needed on the twist grip 301, so the portion of the twist grip 301 having the larger diameter can be used by the rider in this situation for a more effective transmission of torque.

As best seen in FIG. 28, the interior portion 304 of the twist grip 301 can also have two stepped portions 329 and 330, located inwardly from groove 328. Stepped portion 329 can preferably have a smaller diameter than does the groove 328, and a larger diameter than stepped portion 330.

FIG. 49 shows an additional exploded view of a complete twist-grip shifter, which twist-grip shifter has a different twist grip 331 than the twist grip 301 discussed above, and also has a different cable connection or cap 334a than the cap 314a shown in FIG. 26. FIG. 50 shows the twist-grip shifter of FIG. 49 fully assembled. The twist grip 331 shown in FIGS. 49 and 50 has a different exterior surface 332 than that of exterior portion or grip part 303 of twist grip 301, otherwise, the twist-grip shifter shown in FIGS. 49 and 50 is virtually identical to the twist-grip shifter discussed hereinabove. The description presented herebelow can be considered to be one possible method of assembling the twist-grip shifter of the present invention.

The twist-grip shifter shown in FIGS. 49 and 50 can preferably have a bracket 333 which can be inserted inside one end of the cable winding portion 302. The bracket 333 is adjustable, and the distance between two ends 333a and 333b of the bracket 333 can be moved with respect to one another by means of a screw adjustment or other clamping arrangement, for the purpose of clamping the twist-grip shifter on the handlebar 308 (see FIG. 51) of the bicycle. As mentioned briefly above, a cable 334 can pass through the arm or cable inlet segment 313 of the cable winding portion 302, and the cable 334 can ultimately be fastened at one end to the cable winding mechanism 305 by insertion of the cable 334 into the guide 305c and the orifice 305f. The arm 313 of the cable winding portion 302 can include a guide part 335 and a cover 336, which guide part 335 and cover 336 are removable from the arm 313. Guide part 335 can be inserted inside the arm 313, and can serve to guide the cable 334 towards the guide 305c of the cable winding mechanism 305. The cable 334 can preferably extend along a guide wall 335a of guide 335, on a side of guide wall 335a, which guide wall 335a cannot be seen in FIG. 49 (but see FIG. 50d) due to the particular orientation of the guide 335, once the guide 335 has been inserted into the arm 313.

The cable winding mechanism 305, along with a slide 337 and a latching spring 338, can then be mounted over a tubular extension 339 (see also FIG. 26) of the cable winding portion 302. In accordance with one embodiment of the present invention, the tubular extension 305a can be slidably rotatable with respect to the tubular extension 339 and, if desired, lubricating medium can be applied to extension 339 to facilitate this rotation of the tubular extension 305a. Once the cable winding mechanism 305 is installed on the tubular extension 339 of the cable winding portion 302, the cover 336 can then be positioned over the exposed cable 334 and screwed into place by means of a screw 340. The screw 340 can extend into a hole 341 in the arm 313. The cover 336 can preferably have a cylindrical mounting portion 342 having interior threads (not shown) for engaging with the threads of the screw 340.

Figure 50A:
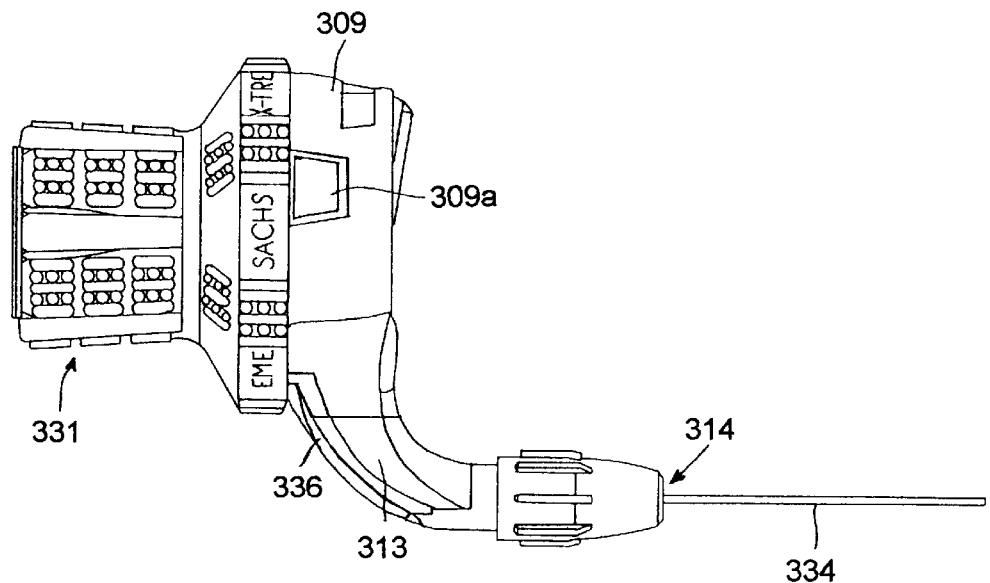
FIG. 50a also shows the twist-grip shifter of FIG. 49 fully assembled, but shows the opposite side of the twist-grip shifter than that shown in FIG. 50.
Figure 50B:
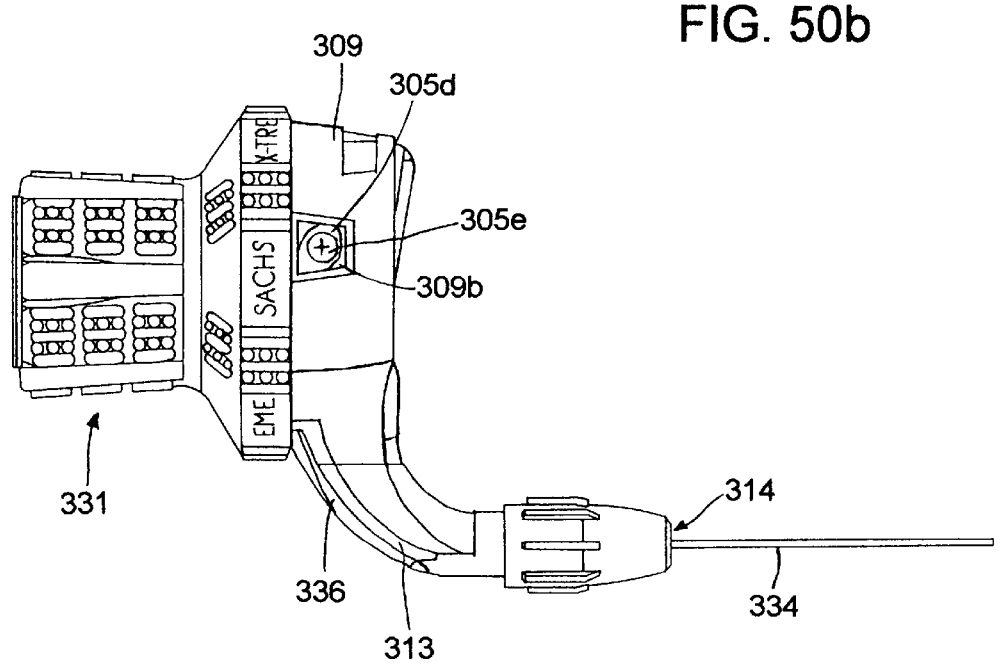
FIG. 50b shows substantially the same view as shown in FIG. 50a, but with the cover panel removed.

In accordance with one embodiment of the present invention, if the cable 334 needs to be replaced, for example if the cable 334 breaks, the process of changing the cable 334 can be relatively simple. In order to facilitate easy changing of the cable 334, the housing 309 of the cable winding portion 302 can preferably include a cover panel 309a, which panel 309a is removable from the housing 309, FIG. 50a shows the opposite side of the twist-grip shifter shown in FIG. 50, and thus shows the cover panel 309a in place on the housing 309. FIG. 50b also shows the opposite side of the twist-grip shifter shown in FIG. 50, but shows the cover panel 309a removed from the housing 309. When the cable 334 is to be replaced with a new cable, the cover panel 309a can be removed, which removal can preferably expose a window 309b (see FIG. 50b) in housing 309, and the flared end 305d of orifice 305f, and also the cap 305e. However, some rotation of the grip part 331 may be necessary in order to align the flared end 305d of orifice 305f with the window 309b. Thus, the grip part 331 can preferably be rotated until the cap 305e appears in window 309b, and the opposite end of the cable 334 which is connected to the transmission of the bicycle can be disengaged from the transmission. The cable 334 can then be pulled through arm 313 and guide 305c, and out of window 309b by means of the cap 305e. A new cable can then be installed by threading the transmission end of the cable into window 309b, through guide 305c, through arm 313, and out of the hole 314 in arm 313. Thus, very little disassembly of the twist-grip shifter is necessary in order to change the cable 334, other than to remove the cover panel 309a.

Figure 50C:
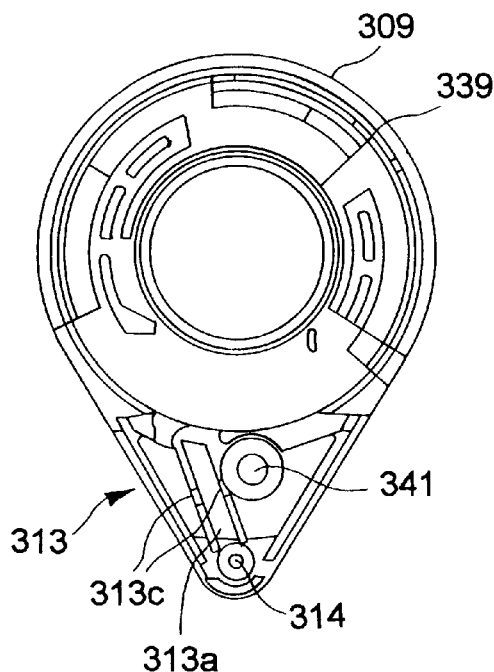
FIG. 50c shows the interior of the cable winding portion.
Figure 50D:
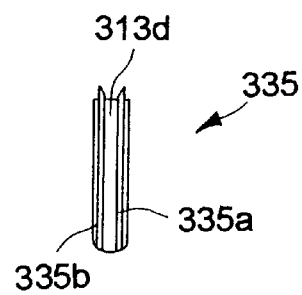
FIG. 50d shows a frontal view of the guide.
Figure 50E:
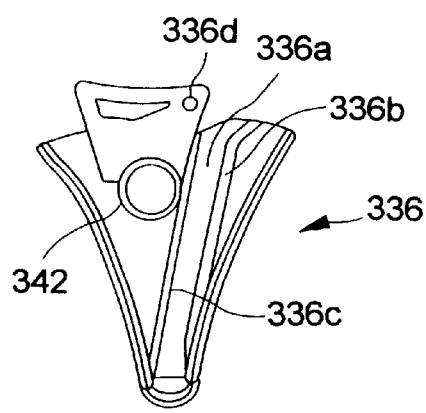
FIG. 50e shows the interior of the cover for the arm or cable inlet segment.
Figure 50F:
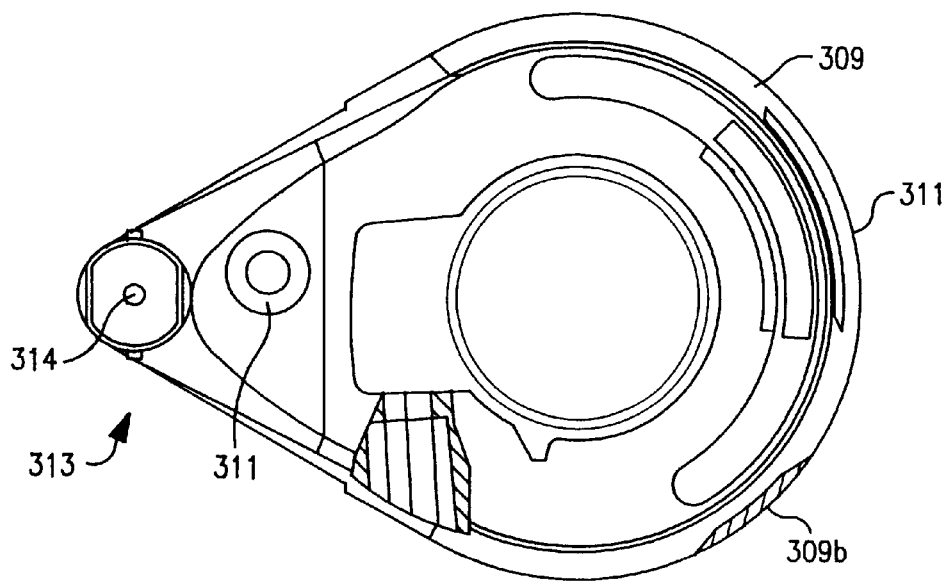
FIGS. 50f–50h, 50j, 50k, 50m, 50n, and 50p–50t show various aspects of the cable winding portion.
Figure 50G:
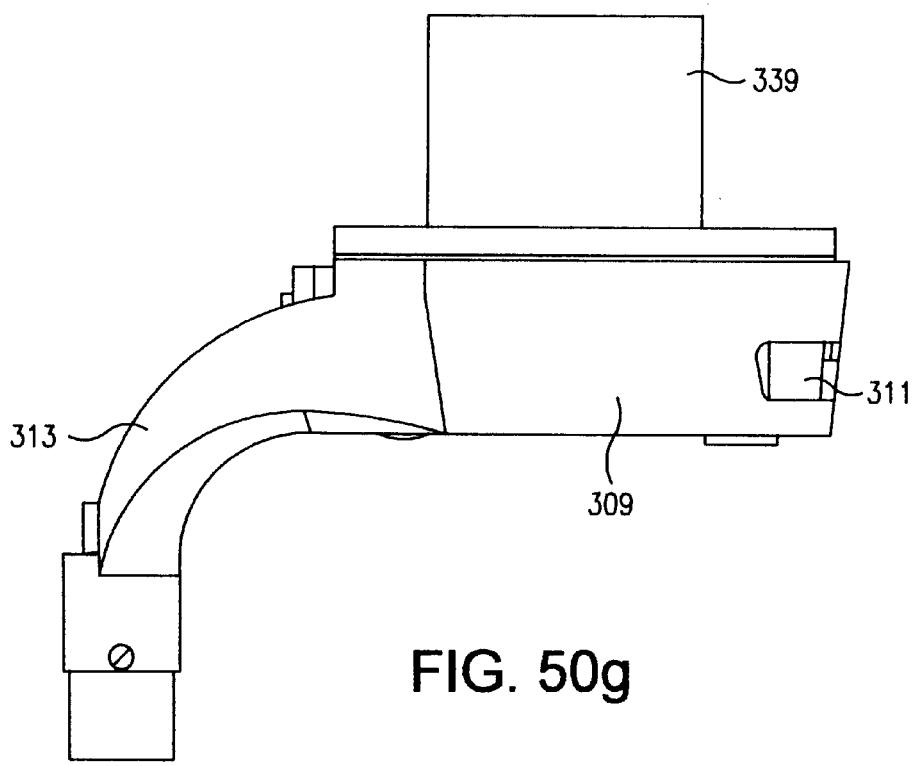
Figure 50H:
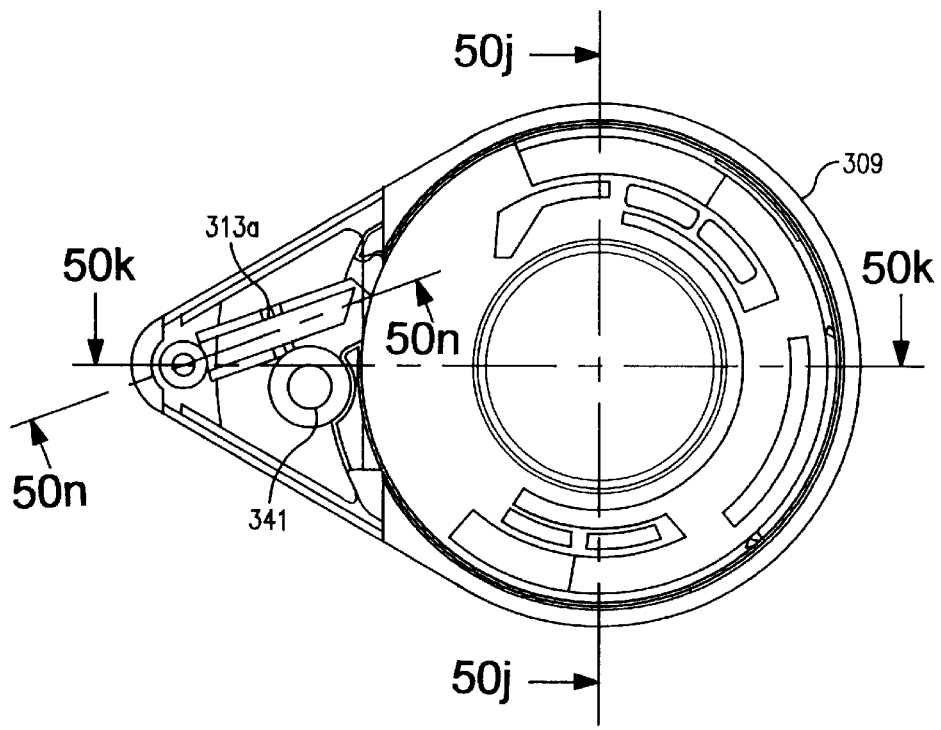
Figure 50J:
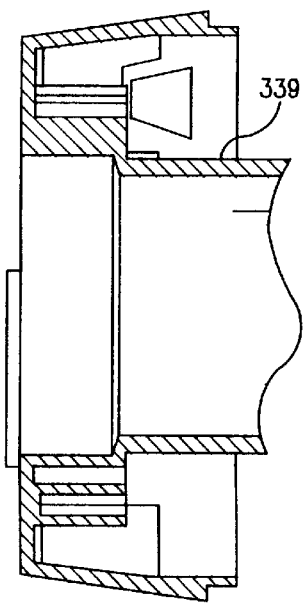
Figure 50M:
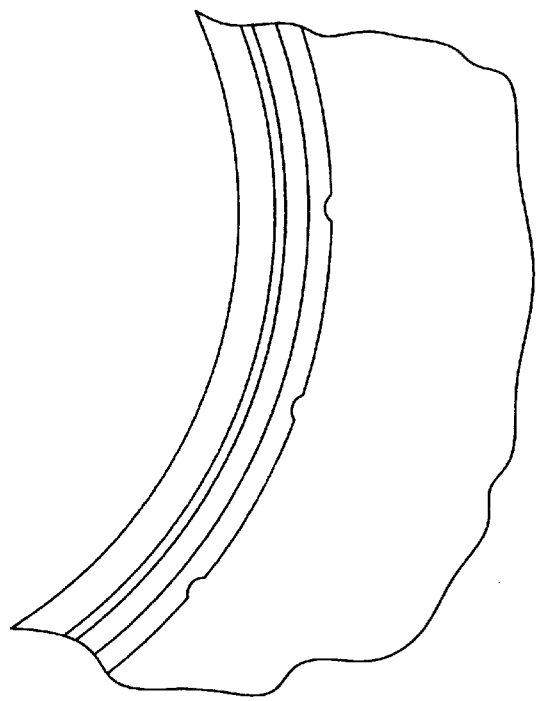
Figure 50K:
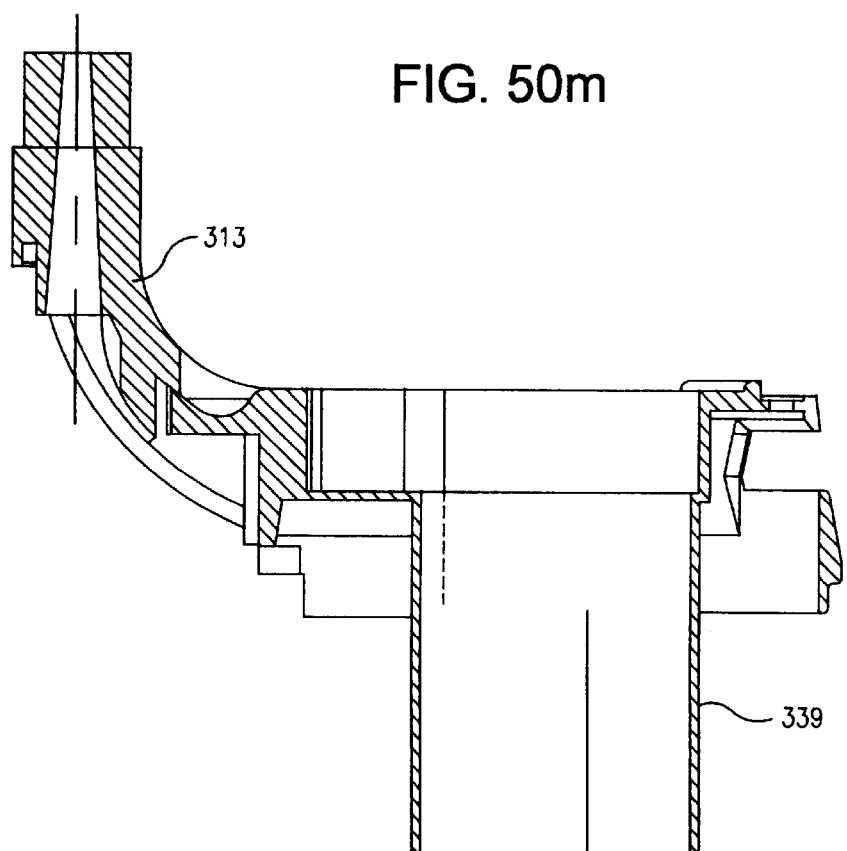
Figure 50N:
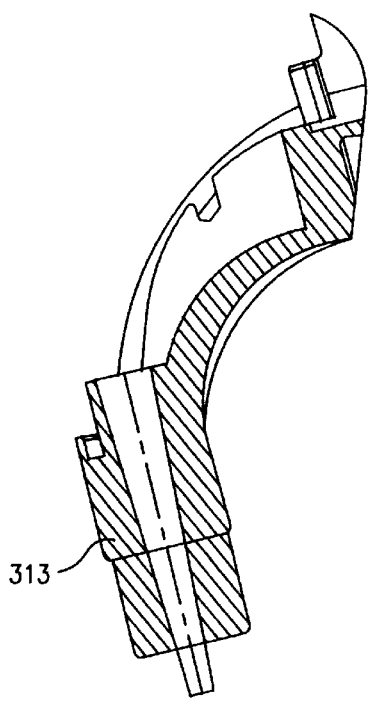
Figure 50P:
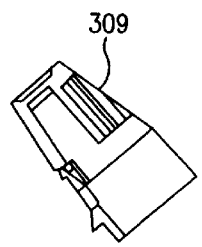
Figure 50Q:
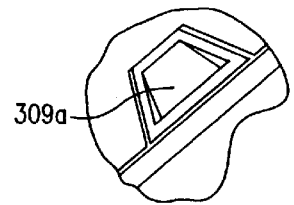
Figure 50R:
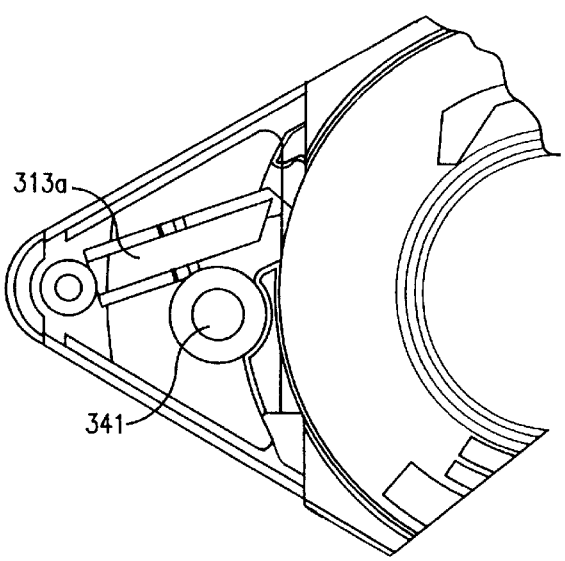
Figure 50S:
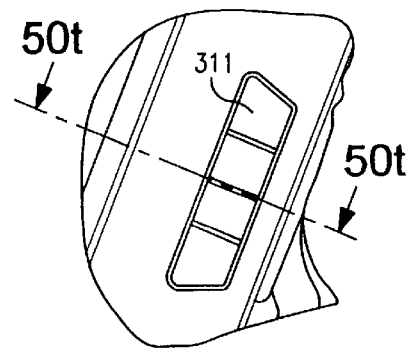
Figure 50T:
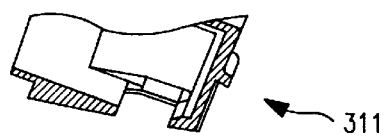

In order to ensure that the new cable is accurately guided through the arm 313, the arm 313, which arm 313 is shown in FIG. 50c with the cover 336 and the guide part 335 removed therefrom, can have a channel 313a in which the guide part 335 can preferably be engaged. The guide part 335 can engage in the channel 313a by means of a projecting portion 313b (see FIG. 49) disposed on the guide 335, which projecting portion 313b fits into two recesses 313c in channel 313a. The recesses 313c can preferably be disposed transversely with respect to the channel 313a. The guide part 335, a frontal view of which is shown in FIG. 50d, can also have a channel 313d bordered by guide wall 335a mentioned hereinabove and an additional parallel guide wall 335b. Thus, the new cable can be guided in the channel 313d by walls 335a and 335b. Similarly, as shown in FIG. 50e, the cover 336 can also have a guide channel 336a. FIG. 50e shows a frontal view of the cover 336, wherein only a side view of the cover 336 is shown in FIG. 50. The guide channel 336a is bordered by two guide walls 336b and 336c. The guide channel 336a, once the cover 336 is in place on the arm 313, can be joined with the channel 313d of the guide part 335 to form a guide channel which can preferably enclose the cable on essentially all sides. In particular, since the channel 336a is preferably wider than the channel 313d, the walls 335a and 335b of guide part 335 can fit inside channel 336a of the cover 336, and each of the walls 335a and 335b of guide 335 can contact walls 336b and 336c, respectively. FIGS. 50f–50h, 50j, 50k, 50m, 50n, and 50p–50t show various additional views and aspects of one embodiment of the cable winding portion 302 and arm 313.

Referring back to FIG. 49, a torsion spring 343 can be disposed about the tubular extension 305a, in a gap 344 behind the claws 315, 316, 317 and 318, one end (not shown) of which spring 343 can have a hook for permitting attachment of the spring 343 to a portion 345 (see also FIGS. 43, 47, and 48) of claw 316. The other end 346 of torsion spring 343 can be inserted into a hole 336d in cover 336, which hole 336d cannot be seen due to the particular view of the cover 336 shown in FIG. 49, but see FIG. 50e. In accordance with one embodiment, spring 343 can exert a biasing force on tubular extension 305a, in a direction opposite to the force-exerted on extension 305a by the transmission spring discussed above, which transmission spring is connected to one end of cable 334, the other end of cable 334 being connected to tubular extension 305a. Twist grip 331 can then be fitted over the tubular extension 305a of the cable winding mechanism 305 in the manner discussed hereinabove, so that claw 317 engages with recess 323, and claws 315, 316 and 318 engage with a corresponding recess 324, 325 or 326. As mentioned hereinabove, FIG. 50 shows the twist-grip shifter of FIG. 49 essentially completely assembled.

Figure 52:
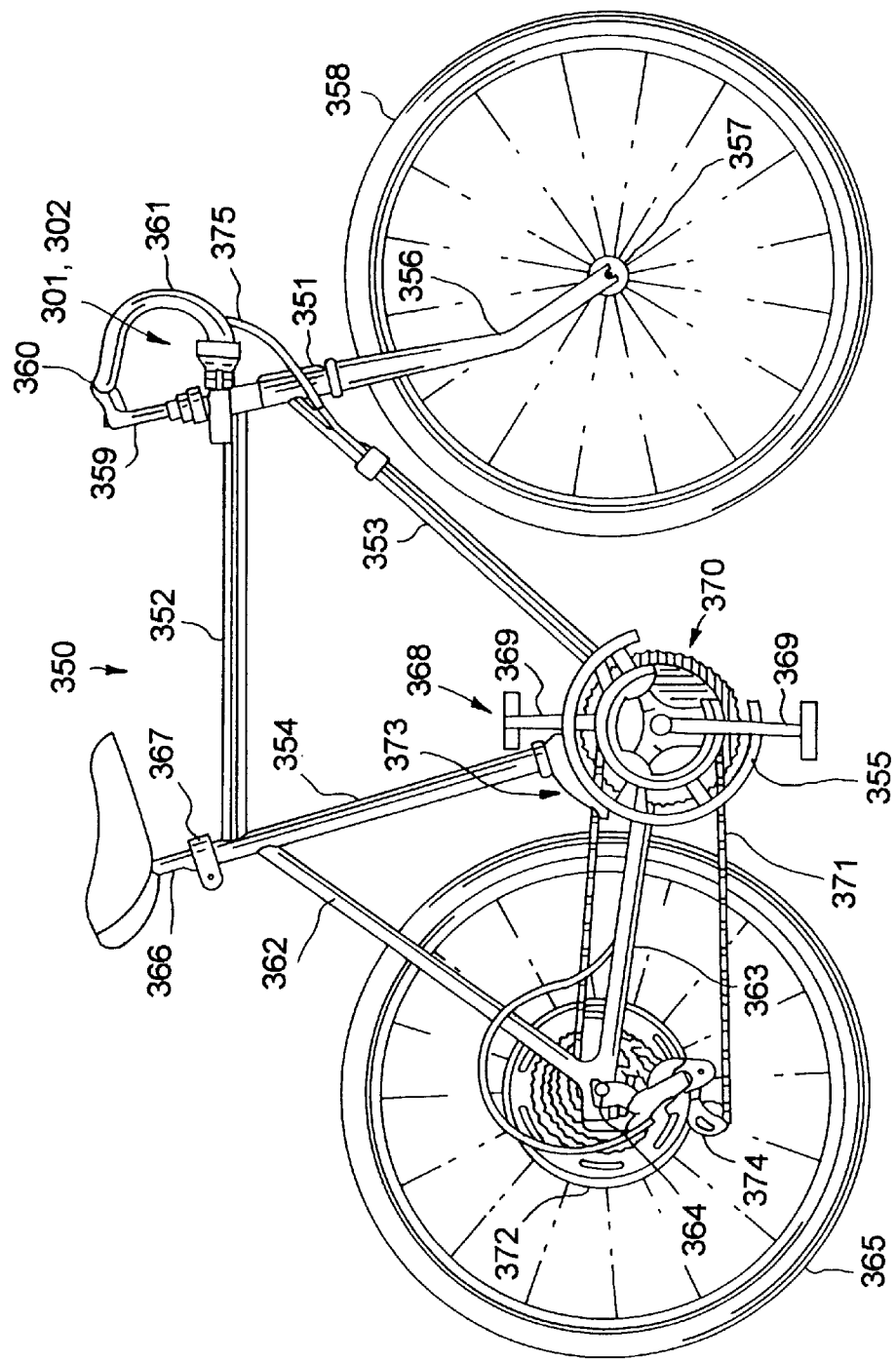
FIG. 52 shows one example of a bicycle and bicycle transmission incorporating the present invention.

FIG. 52 shows one example of a bicycle 350, in which a rear derailleur mechanism can be actuated by a rear twist-grip shifter in accordance with the present invention, and a two-chain front derailleur mechanism which can be actuated by a front twist-grip shifter in accordance with the present invention. It should be understood that the description which follows is presented only as an example of one type of bicycle and transmission system in which the present invention-could be utilized. Thus, the present invention could also be utilized with other types of bicycles and bicycle transmissions, such as hub transmissions.

The bicycle 350 has a primary frame which is generally triangular in shape, and which includes a head tube 351, a generally horizontal top tube 352 connected at its front end to head tube 351, a main down tube 353 extending downwardly and rearwardly from head tube 351, and a seat tube 354 connected to the rear end of top tube 352 and extending downwardly and forwardly therefrom. Main down tube 353 and seat tube 354 are joined at their lower ends to bottom bracket 355, shown in phantom, within which bottom bracket 355 the pedal crank is horizontally journalled. A front fork 356 defines the axis 357 of front wheel 358. A steering tube (not shown) at the upper end of front fork 356 extends upwardly into head tube 351, and is wedge-clamped to a handlebar stem designated 359, which stem 359 extends down into the steering tube within head tube 351. Handlebar stem 359 includes a handlebar clamp 360 at its upper end for gripping handlebar 361. The handlebar 361 shown in FIG. 52 is of the traditional drop bar type, although it is to be understood that the present invention is equally applicable to virtually any type of bicycle handlebar.

A down fork 362 consisting of left and right seat stays extends downwardly and rearwardly from the upper portion of seat tube 354, and a bottom fork 363 consisting of left and right chain stays extends rearwardly from bottom bracket 355. The left sides of down fork 362 and bottom fork 363 are connected at their rear ends, and similarly the right sides of down fork 362 and bottom fork 363 are connected at their rear ends, and these rear connections support rear wheel dropouts which define the axis 364 of rear wheel 365.

A seat stem 366 is engaged in the upper end of seat tube 354, and is releasably secured by a seat clamp 367. The pedal cranks generally designated 368, is rotatably journalled in bottom bracket 355, and includes right and left crank arms 369. A chain wheel cluster designated 370 is rigidly supported on pedal crank 368, and constitutes the sprocket cluster of the front derailleur assembly. Most commonly, the chain wheel cluster will embody two chain wheels, although it is also common to have chain wheel clusters with three chain wheels. An endless drive chain 371 transmits power from the chain wheel cluster 370 to a multiple freewheel 372 that is operatively connected to the rear wheel hub mechanism in a conventional manner.

A front derailleur mechanism designated 373 cooperates with chain wheel cluster 370 to shift chain 371 laterally between two chain wheels of cluster 370, down-shifting from the smaller chain wheel to the larger chainwheel, or up-shifting from the larger chain wheel to the smaller chain wheel. A rear derailleur mechanism designated 374 is pivotally connected to the frame proximate the right side portions of down fork 362 and bottom fork 363 for shifting chain 371 laterally from sprocket to sprocket of the multiple freewheel 372. A front control cable (not shown) operatively connects a front twist-grip shifter (not shown) in accordance with the present invention to the front derailleur mechanism 373 such that the front twist-grip shifter cooperates with and controls the shifting of the front derailleur mechanism 373. Similarly, a rear control cable 375 operatively connects a rear twist-grip shifter, including twist grip 301 and cable winding portion 302 in accordance with the present invention, to the rear derailleur mechanism 374 such that the rear twist-grip shifter cooperates with and controls the shifting of the rear derailleur mechanism 374.

Figure 53:
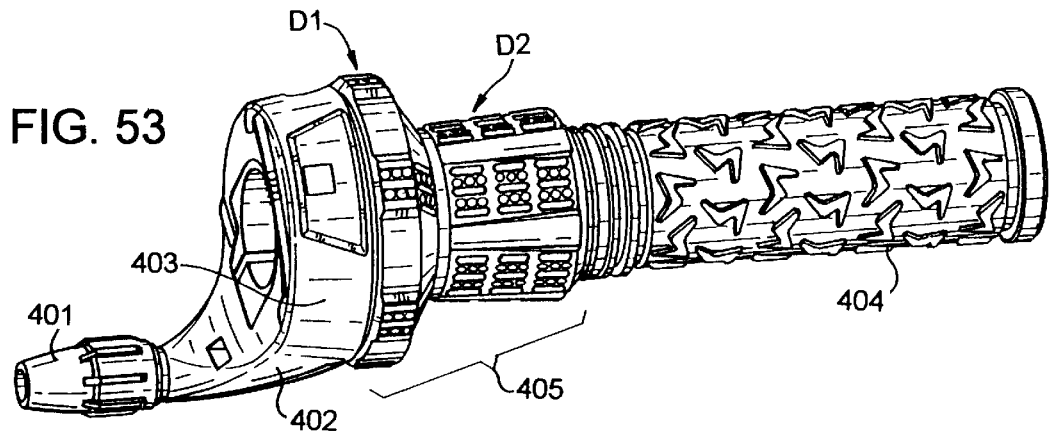
FIG. 53 shows a perspective view of a twist grip shifter with a grip part fixed to the handlebar, and a rotational grip part.

FIG. 53 shows a twist grip shifter with a connection for an actuator cable 401 and a cable inlet segment 402. The twist grip shifter can have a cable windup segment 403, which cable windup segment 403 can include a winding drum to wind up the actuator cable. The twist grip shifter can further include a grip part 404, which grip part 404 can be fixed to the handlebars In addition, the twist grip shifter can include a rotational grip part 405, which rotational grip part 405 can preferably be located directly adjacent to the cable windup segment 403. The rotational grip part 405 can preferably lie between the cable windup segment 3 and the grip part 404 fixed to the handlebar.

The rotating grip part 405 can have an area with a large diameter D1 and an area with a small diameter D2. The rotational grip part 405 with the large diameter D1 can thereby be adjacent to the cable windup segment 403, and the area with the small diameter D2 can be adjacent to the grip part 404 fixed to the handlebar. The diameters on one hand of the area with the large diameter D1 and of the cable windup segment 403, and on the other hand of the grip part 404 which can be fixed to the handlebar and of the area with the small diameter D2, can be essentially approximately equal to one another. The rotating grip part 405, viewed in longitudinal section, can thus have a step-like contour, whereby the connecting line between the two areas with the diameters D1 and D2 in this contour can be described as a cone, or a radial transition similar to the one illustrated in FIG. 55.

In accordance with one embodiment of the present invention, therefore, the large diameter D1 of the grip part 405 can be approximately equal to the diameter of the adjacent cable windup segment 403. Similarly, the small diameter D2 of the grip part 405 can be approximately equal to the diameter of the adjacent grip part 404 fixed to the handlebar. Since the rotational grip part 405 can include a large diameter D1 and a small diameter D2, there can preferably be a connection, in the form of a radial transition, between the large diameter D1 and the small diameter D2. The radial transition can preferably include a cone shape such that the smaller portion of the cone shape can be located adjacent the small diameter D2 and the larger portion of the cone shape can be located adjacent the large diameter D1. The cone shape of the radial transition can thereby permit the bicyclist's hand to essentially easily slide back and forth between the small diameter D2 and the large diameter D1.

The area with the large diameter D1 and the area with the small diameter D2, as well as the grip part 404 fixed to the handlebar, can preferably have a structured surface. The structure on the grip part 404 fixed to the handlebar preferably does not have any particular directional orientation, since essentially the only purpose of the structured surface of the grip part 404 is to provide ventilation for the cylindrical surface enclosed by the bicyclist's hand. The surface of the area with the small diameter D2 and the surface of the area with the large diameter D1, on the other hand, can preferably have a surface structure with a directional orientation, which directional orientation can preferably be essentially parallel to the center axis of the twist grip shifter, to thereby better transmit the torque applied by the rider to the rotational grip part 405.

Figure 54:
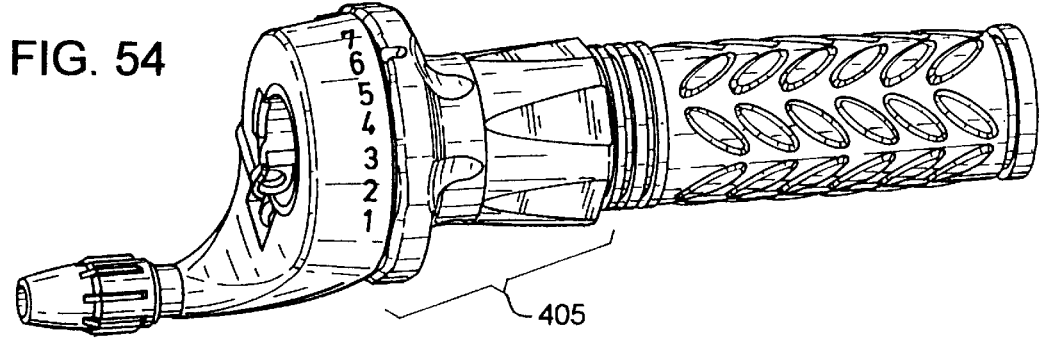
FIG. 54 shows a twist grip shifter, similar to the one shown in FIG. 53, with a variant in terms of the surface structure.

As shown in FIGS. 53 and 54, this surface structure, in particular, on the large diameter D1 can have areas which can even be sharply raised or recessed, to thereby permit an essentially interlocking connection between the bicyclist's fingers and the rotating grip part 405, which interlocking connection can further reduce the amount of effort required to wind the cable in order to shift the gears of the bicycle. The advantage of the step-like configuration of the rotating grip part 405 can be that while the bicyclist is steering the bicycle, the bicyclist's hand can surround both the non-rotational grip part 404 as well as the area of the rotational grip part 405 with the small diameter D2. When the bicyclist shifts gears, in particular, when the actuator cable is released, only relatively small shifting forces can be required, whereby the bicyclist can keep his hand in essentially the same position if he actuates the rotating grip part 405 of the twist grip shifter. If, on the other hand, the actuator cable is being reeled in on the winding drum in the cable windup segment 403, larger rotational forces can be required, the bicyclist can then push slightly with his shifting hand toward the center of the handlebar to thereby apply a grip around the area of the rotating grip part 405 with the large diameter D1. In this manner, essentially higher actuation forces can be exerted on the actuator cable.

In accordance with one embodiment of the present invention, therefore, the small diameter D2 can be rotated to provide the small shifting forces for the release of the actuator cable. The increased diameter of the large diameter D1 can, on the other hand, provide a significant increase in the amount of force to thereby reel in the actuator cable. Furthermore, the surface of the small diameter D2 and the surface of the large diameter D1 can preferably include recessed areas and raised areas. The raised and recessed areas can preferably be oriented in a direction essentially parallel to the center axis of the rotational grip part 405, to thereby provide a frictional surface whereby the bicyclist can more easily grip and twist the rotational grip part 405. In addition, the raised and recessed areas can also essentially prevent grip slippage, especially in wet or muddy conditions.

The surface of the rotating grip part 405, in the vicinity of the large diameter D1 and in the vicinity of the small diameter D2, can preferably have a surface structure which can be directionally oriented to transmit the torque toward the center axis of the twist grip shifter. The surface structure of the rotating grip part 405 can therefore essentially prevent the bicyclist's hand from slipping off of the grip part 405. As mentioned above, the grip part 404 fixed to the handlebar can have a surface structure with raised surface segments to provide ventilation for the contact surfaces between the bicyclist's hand and the non-rotational grip part 404.

FIG. 54 shows a variant of the twist grip shifter illustrated in FIG. 53, in which FIG. 54 the surface structures of each of the grip part 404 fixed to the handlebar, of the area with the small diameter D2 and of the large diameter D1 can be different from the surface structures of the twist grip shifter illustrated in FIG. 53. The surface structures as shown in FIG. 54 can, however, perform essentially the same function as the surface structures as shown in FIG. 53. The transition between the areas with the large diameter D1 and with the small diameter D2 can be provided, both in the embodiment illustrated in FIG. 53 and in the embodiment illustrated in FIG. 54, with a surface structure that can advantageously make it easier for the bicyclist to overcome increased torque merely by pressing his hand against this transitional area.

In summary, in accordance with one embodiment of the present invention, the amount of effort required to wind in the actuator cable can be further reduced. Thus, to reel in the actuator cable, as an alternative to twisting the large diameter D1, the radial transition can be twisted. In other words, the area between the small diameter D2 and the large diameter D1, as shown in FIG. 54, can be twisted to thereby reel in the actuator cable. As mentioned above, when the bicyclist steers the bicycle, the bicyclist's hand can surround the non-rotational grip part 404 and the small diameter D2 of the rotational grip part 405. Thus, to twist the radial transition, the bicyclist's hand need move only slightly away from the small diameter D2 to thereby contact and twist the radial transition with only the inner portion of the hand, i.e. the sides of the index finger and the thumb. As a result, the bicyclist can exert less effort, yet still apply a greater force to the actuator cable.

Figure 55:
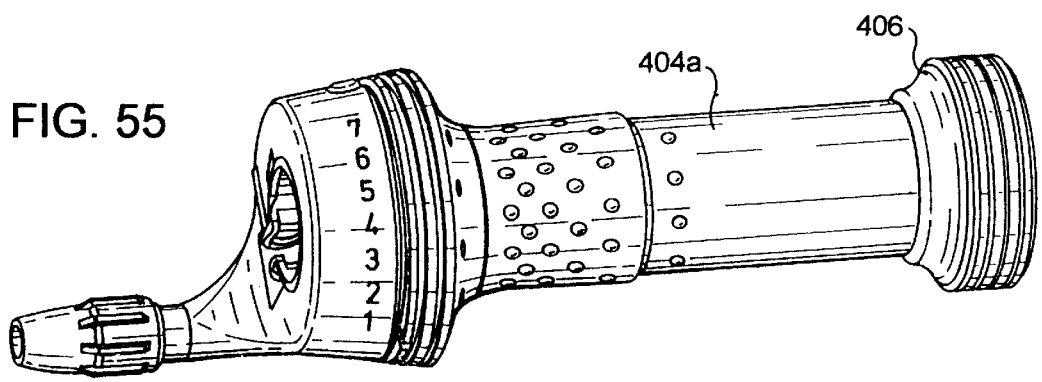
FIG. 55 shows a twist-grip shifter employing the technology of the twist grip shifter illustrated in FIGS. 53 and 54, but with a ring-shaped bead on the grip part fixed to the handlebar.

FIG. 55 illustrates a twist grip shifter, whereby the grip part 404a fixed to the handlebar can have a ring-shaped bead 406, which ring-shaped bead 406 can be located on the end of the grip part 404a fixed to the handlebar. The bead 406 can, thus, coincide with the end of the handlebar, and in terms of diameter, shape and surface structure, the ring-shaped bead 406 can be approximately the same as the portion of the rotational grip part 405 provided with the large diameter D1. The advantage of the ring-shaped bead 406 lies in the enhancement of the visual appearance of the twist grip shifter, as well as in the increased safety provided for the end of the handlebar in the event of impacts, and finally in the improved guidance of the bicyclist's hand toward the end of the handlebar.

In accordance with one embodiment of the present invention, the ring-shaped bead 406, as shown in FIG. 55, can be in the form of an expansion of the end of the non-rotational grip part 404a facing away from the small diameter D2 and the large diameter D1. The design, shape, and diameter of the grip part 405 having the large diameter D1 can preferably be approximately the same as the design, shape, and diameter of the ring-shaped bead 406. And although the non-rotational grip part 404a can have an essentially smooth surface, the expanded end formed by the ring-shaped bead 406 can essentially prevent the bicyclist's hand from slipping off the non-rotational grip part 404a in a direction away from the grip part 405.

Figure 53A:
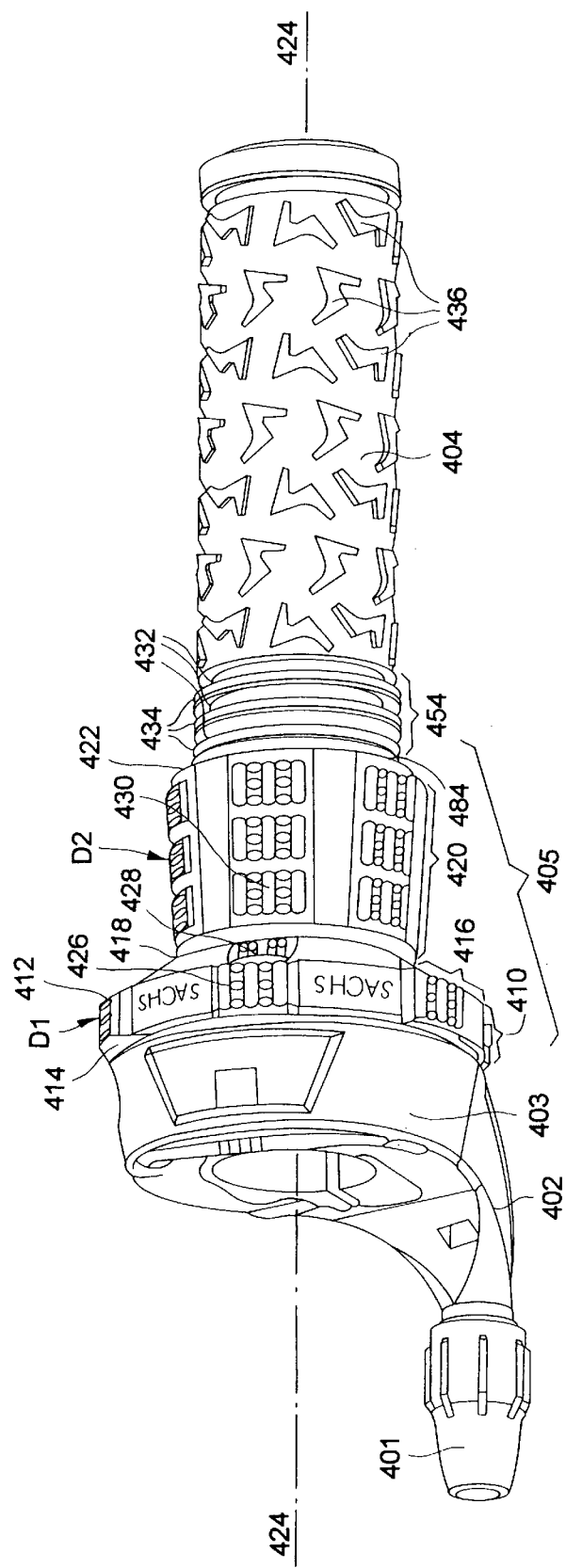
FIG. 53a shows a twist-grip shifter similar to that shown in FIG. 53, but includes additional details.

In accordance with one embodiment of the present invention shown in FIG. 53a, the larger diameter D1 can be defined by a cylinder 410. The cylinder 410 can preferably be constructed of a firm, rubber-like material, The cylinder 410 can have two edges, 412 and 414. The diameter of the cylinder 410 can preferably be about 53 mm. The cylinder 410 can have an axial dimension from edge 412 to edge 414 of about 6 mm. A cylindrical conical transition area 416 can extend from edge 412 to an edge 418. The conical transition area 416 can be constructed from the same firm, rubber-like material as the cylinder 410. The diameter of the conical transition area 416 at edge 418 can be about 30 mm. The axial dimension of the conical transition area 416 from edge 412 to edge 418 can be about 9 mm. The smaller diameter D2 can be defined by a conical member 420. The conical member 420 of the smaller diameter D2 can be constructed of the same firm, rubber-like material as the cylinder 410 and as the conical transition area 416. The conical member 420 extends from edge 418 to an edge 422. The diameter of the conical member 420 at edge 422 can be about 33 mm. The conical member 420 can have an axial dimension from edge 18 to edge 422 of about 424 mm. The twist grip shifter can preferably have a longitudinal axial hole 424, which is disposed therethrough. The length of the axial hole 424 along the longitudinal axis can be about 56 mm in. The conical transition area 416 can be angled at about 28 degrees in relation to the longitudinal axial hole 424. The conical member 420 can be angled at about 15 degrees in relation to the longitudinal axial hole 424.

The grip part 405 having the larger diameter D1 can preferably contain a repeating pattern 426. The repeating pattern 426 contains a block having a line, followed by a series of three dots, followed by a line, followed by a series of three dots, followed by a line. The lines and dots of the repeating pattern 426 can all be disposed circumferentially around the larger diameter D1. The repeating pattern 426 can be raised above the surface of the larger diameter D1. The repeating pattern 426 can be repeated a total of six times along the circumference of the larger diameter D1. The lines of the repeating pattern 426 can be disposed essentially parallel to the longitudinal axial hole 424. The series of three dots of the repeating pattern 426 can also be disposed essentially parallel to the longitudinal axial hole 424. The parallel lines of the repeating pattern 426 can extend a longitudinal distance of about 6 mm along the axial dimension which is essentially parallel to the longitudinal axial hole 424. The series of three dots of each repeating pattern 426 can extend a longitudinal distance of about 6 mm along the axial dimension which is essentially parallel to the longitudinal axial hole 424. Each repeating pattern 426 can extend a distance of about 9 mm along the circumference of the larger diameter D1. A space of about 15 mm can be present between each repeating pattern 426. The word X-TREME or the word SACHS can be found between each repeating pattern 426. The word X-TREME and the word SACHS are raised above the surface of the larger diameter D1, and can be placed in an alternating pattern between the repeating pattern 426. The letters in the word X-TREME and the letters in the word SACHS are disposed substantially perpendicular to the longitudinal axis 424. The letters in the word X-TREME and the letters in the word SACHS can extend a longitudinal distance of about 2 mm along the axial dimension of the larger diameter D1 which is essentially parallel to the longitudinal axial hole 424. The word X-TREME can extend a distance of about 12 mm along the circumference of the larger diameter D1. The word SACHS can extend a distance of about 10 mm along the circumference of the larger diameter D1.

The conical transition area 416 can also contain a repeating pattern 428. The repeating pattern 428 contains a block having a line, followed by a series of three dots, followed by a line, followed by a series of three dots, followed by a line. The dots land lines which make up the repeating pattern 428 make an angle with respect to the longitudinal axial hole 424. The dots and lines which make up the repeating pattern 428 can be hollowed-out portions of the conical transition area 416. The repeating pattern 428 can be directly aligned with the repeating pattern 426. The repeating pattern 428 can be repeated a total of six times along the circumference of the conical transition area 416. The repeating pattern 428 can extend a distance of about 6 mm along the conical transition area 416, from edge 412 to edge 418. The repeating pattern 428 can extend a distance of about 8 mm along the circumference of the conical transition area 416.

The smaller diameter D2 can preferably contain a repeating pattern 430. The repeating pattern 430 contains a block having a line, followed by a series of three dots, followed by a line, followed by a series of three dots, followed by a line. The dots and lines which make up the repeating pattern 430 can be angled with respect to the longitudinal axial hole 424. The dots and lines which make up the repeating pattern 430 can be raised. The repeating pattern 430 can preferably be directly aligned with the repeating pattern 428. The repeating pattern 430 can be repeated a total of six times along the circumference of the smaller diameter D2. The repeating pattern 430 can be disposed along the axial length of the smaller diameter D2, and can be repeated a total of three times along the axial length of the smaller diameter D2. The repeating pattern 430 can extend-down the axial length of the smaller diameter D2 a distance of about 21 mm.

Adjacent the area having the smaller diameter D2, there can be a transitional area 454 having grooved indentations 432. The grooved indentations 432 can be repeated a total of six times along the axial direction. The width of each grooved indentation 432 can be about 6 mm.

With further reference to FIG. 53a, the grip part 404 shown in FIG. 53a can extend longitudinally from the conical member 420 having the diameter D2. The grip part 404 can a preferably be stationary or fixed with respect to grip part 405. The grip part 404 can preferably include the transition area 454 mentioned above. The transition area 454 can also include a series of three raised bands 434 disposed about the circumference of the grip part 404, and between the indentations 432 mentioned above. The transition area 454 can preferably be located adjacent to the conical member 420 at a portal 484 of the longitudinal axial hole 424, which portal 484 is adjacent to edge 422. The grip part 404 can also contain a raised repeating pattern 436 disposed about the circumference of the grip part 404, and which raised repeating pattern 436 is located between the transition area 454 and the end portion of the grip part 404.

Figure 54A:
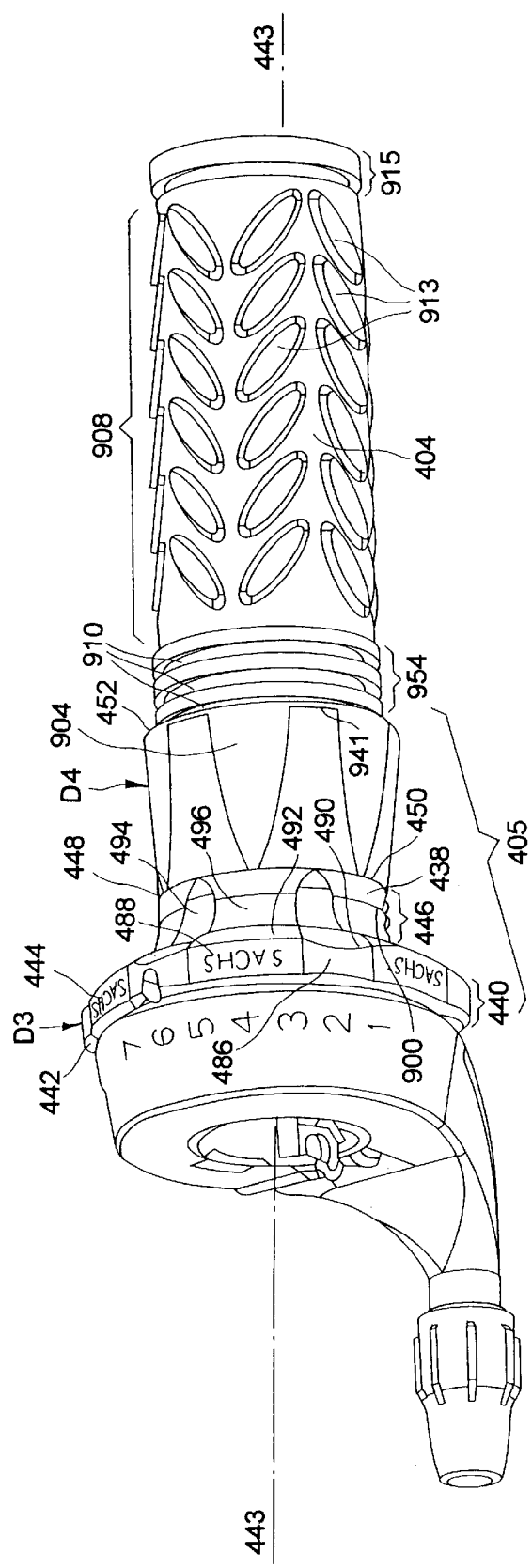
FIG. 54a shows a twist-grip shifter similar to that shown in FIG. 54, but includes additional details.

FIG. 54a shows an alternative embodiment of a twist grip shifter similar to that of FIG. 54. The rotational grip part 405 of the twist grip shifter of FIG. 54a contains a larger diameter D3 and a smaller diameter D4. The larger diameter D3 is defined by a cylindrical portion 440. The cylindrical portion 440 contains an alternating pattern of grooves 486 and flush surfaces 488, which flush surface 488 contains the word SACHS in raised letters. The grooves 486 of cylindrical portion 440 can extend the entire axial length of cylinder 440 from an edge 442 to an edge 444. The letters in the word SACHS of flush surface 488 can be disposed essentially perpendicular to a longitudinal axial hole 443 extending axially through the twist-grip shifter. The alternating pattern of grooves 486 and flush surfaces 488 can surround the circumference of the cylindrical portion 440. An alternating pattern of grooves 490 and flush surfaces 492 can surround the cylindrical portion 440 at edge 444. The grooves 490 of edge 444 can be in direct alignment with the grooves 486 of the cylindrical portion 440.

The smaller diameter D4 can be defined by a fluted area 446. The fluted area 446 extends from edge 444 to an edge 448. The fluted area 446 forms a rounded inside corner 438 of the smaller diameter D4, which rounded inside corner 438 can surround the smaller diameter D4 circumferentially. The fluted area 446 can contain an alternating pattern of grooves 494 and flush surfaces 496. The grooves 494 and flush surfaces 496 of the fluted area 446 can be disposed along the axial length of the fluted area 446, and the grooves 494 can be in direct alignment with the grooves 490 of edge 444. The grooves 494 of the fluted area 446 taper to a point at edge 448, where the grooves 494 of the fluted area 446 are flush with the surface of the smaller diameter D4. A band 900 can surround the fluted area 446 circumferentially at a point approximately two-thirds of the axial length of the fluted area 446.

The grip part 405 having the smaller diameter D4 can preferably include a conical member 450. The conical member 450 extends from edge 448 to an edge 452. The conical member 450 can contain grooved indentations 904, which grooved indentations 904 can be disposed along the axial length of conical member 450. The grooved indentations 904 can taper from edge 452 to a point at edge 448 where the grooved indentations 904 are flush with the surface of the smaller diameter D4. The grooved indentations 904 are preferably not in alignment with the grooved indentations 494 of the fluted area 446.

The grip part 404 of the embodiment of FIG. 54a extends longitudinally from the grip part 405 having a diameter D4. The grip part 404 can have a stationary cylindrical portion 908. The grip part 404 can also have a transition area 954. The transition area 954 can contain a series of three raised bands 910 which can surround the circumference of the grip part 404. The transition area 954 can be disposed adjacent to the conical member 450 at a portal 941 of longitudinal axial hole 443. The grip part 404 can contain a raised repeating pattern 913 which can surround the circumference of the grip part 404. The raised repeating pattern 913 of the grip part 404 can be located between the transition area 954 and an end portion 915 of grip part 404.

Figure 55A:
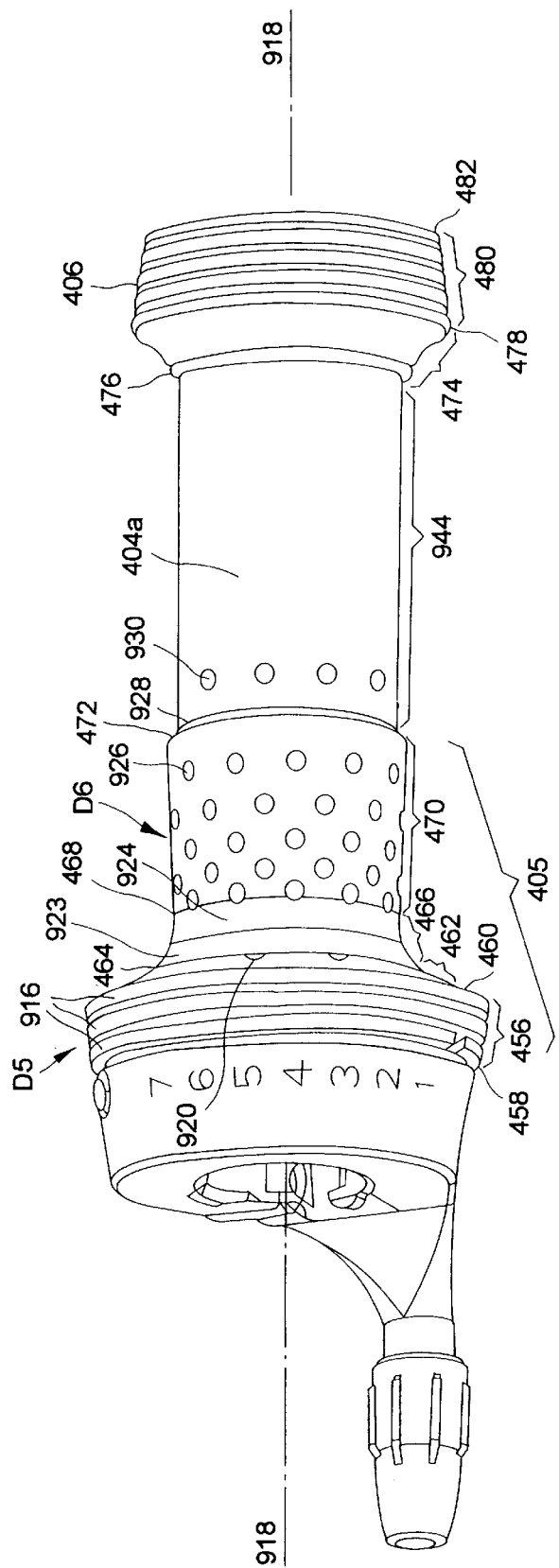
FIG. 55a shows a twist-grip shifter similar to that shown in FIG. 55, but includes additional details.

FIG. 55a shows an additional embodiment of a twist grip shifter similar to that shown in FIG. 55. The rotational grip part 405 of the twist grip shifter of FIG. 55a can contain a larger diameter D5 and a smaller diameter D6. The larger diameter D5 can be defined by a conical member 456. The conical member 456 can contain three bands 916 which can surround the conical member 456 circumferentially. The cylinder 456 can have an axial dimension which extends from an edge 458 to an edge 460.

A conical transition area 462 can extend from edge 460 to an edge 464. The conical transition area 462 can be disposed at an angle in relation to a longitudinal axial hole 918. A repeating pattern 920 containing a row of raised dots is disposed along the circumference of the conical transition area 462.

The smaller diameter D6 can be defined by a fluted area 466. The fluted area 466 can extend from edge 464 to an edge 468. The fluted area 466 can form a rounded inside corner 923 of the smaller diameter D6, which rounded inside corner 923 surrounds the grip part 405 having the smaller diameter D6 circumferentially. The fluted area 466 can contain a band 924, which band 924 can surround the fluted area 466 circumferentially at a point approximately half the length of the fluted area 466.

The smaller diameter D6 can be defined by a conical member 470. The conical member 470 can extend from edge 468 to an edge 472. The conical member 70 can contain a series of raised dots 926, which raised dots 926 are disposed along the axial length of the conical member 470.

The grip part 404 of FIG. 55a can extend longitudinally from the smaller diameter D6. The grip part 404 can include a stationary cylinder 944. The grip part 404 is adjacent to the smaller diameter D6 at portal 928 of the longitudinal axial hole 918, which portal 928 is substantially adjacent to edge 472. The grip part 404 can contain a row of raised dots 930 which surround the circumference of the grip part 404, and which row of raised dots 930 is substantially adjacent to edge 472.

FIG. 55a also shows an end collar 406. The end collar 406 can extend longitudinally from the grip part 404. The end collar 406 can be disposed adjacent to the grip part 404 at a point substantially adjacent to an edge 476. The end collar 406 can contain a fluted area 474. The fluted area 474 can extend from edge 476 to an edge 478. The fluted area 474 can begin at a narrow point adjacent to edge 476, and can widen up to edge 478. The end collar 406 contains a member 480, which can be considered to be either conical or cylindrical. The member 480 extends from edge 478 to an edge 482. The member 480 can begin at a point adjacent to edge 478, and in conical form is somewhat narrower at edge 482.

The twist grip shifter can enable the bicyclist to change gears with greater ease and reduced wrist effort. The need for greater ease and reduced wrist effort is evident during the downshifting process, when a larger shifting force must typically be exerted upon the gear mechanism. The twist grip shifter also provides a comfortable hand position, as well as reduces the chance of hand slippage while riding in a variety of weather conditions. The locus of movement necessary for the shifting process to occur is entirely within the width of the grip of the bicyclist. The firm rubber-like material which can be used to construct the twist grip shifter can allow for a greater degree of control by a bicyclist. The firm rubber-like material can also complement the larger diameter described in the embodiments as D1, D3, or D5 by providing a secure, hard surface along the substantial longitudinal length of D1, D3, or D5. Such a secure, hard surface allows for the shifting process to be accomplished with greater ease. The range of pivotal movement necessary for either upshifting or downshifting is controlled by the application of pressure from the hand. The twist grip shifter permits the thumb and forefinger to rest comfortably at desired times upon an area of larger diameter described in the embodiments as D1, D3, or D5. Also, the area of smaller diameter described in the embodiments as D2, D4, or D6 provides a conical surface adequate for the remaining fingers to rest comfortably, and allows the shifting process to occur without the need to switch hand positions, and with little expenditure of effort, Further, as the ratio of the smaller diameter to the larger diameter is preferably in the range of 1:1.40 to 1:1.85, and more preferably 1:1.60, the thumb and forefinger may rest upon the cylindrical surface at a greater height than the smaller diameter. The greater height provides for more gripping power, and also allows the middle finger to encircle the smaller diameter at an area which effectuates maximal downshifting pressure with minimal effort. Additionally, the conical transition area 416 of FIG. 53a, the conical transition area 462 of FIG. 55a, and the fluted area 446 of FIG. 54a all provide alternative gripping surfaces for the hand, which also allows for maximal shifting power with little effort. Finally, the ridged, grooved, and raised surfaces of the diameters described in all of the embodiments not only provide the necessary friction for shifting, but also may prevent hand slippage in wet or muddy conditions.

The dimensions and angles described herein are for illustrative purposes only, and may be changed in certain alternative embodiments. Further, the ratios, angles, and diameters described herein may be greater or smaller, and likewise are presented for illustrative purposes only, with possible variations forthcoming in certain alternative embodiments.

Examples of methods for making decorated injection moldings which may be utilized in accordance with the present invention can be found in U.S. Pat. No. 4,427,615 entitled "Method of Making Injection Moulded Plastic Objects with Imbedded Decorative and/or Descriptive Prints".

Examples of methods for molding rubber onto a plastic molding which may be utilized in accordance with the present invention can be found in U.S. Pat. Nos.: 4,896,922 to Guthe on Jan. 30, 1990, entitled "Plastic Wheel Assembly"; 4,970,103 to Wolf et al. on Nov. 13, 1990, entitled "Preformed Part Made of Plastics with Integrally Formed Rubber Elastic Parts"; 4,743,422 to Kalriss-Nielsen et al. on May 10, 1988, entitled "Method for Manufacturing a Sealing Body for a Pipe Joint"; and 5,302,336 entitled "Method for Producing Molded Hose Branches from Rubber and a Hose Produced by the Method".

An additional example of a method for making a molded article having a coating can be found in U.S. Pat. No. 4,961,894 entitled "Process for Producing Synthetic Resin Molded Articles".

Examples of injection molding machines and/or methods which can be utilized in accordance with the present invention can be found in U.S. Pat. No. 4,954,074 entitled "Injection Bladder Press", U.S. Pat. No. 5,059,113 entitled "Injection Molding Apparatus", U.S. Pat. No. 5,087,190 entitled "Multiplunger Molding Machine for Liquid Silicone Rubber", U.S. Pat. No. 4,540,359 entitled "Injection Molding Machine", U.S. Pat. No. 3,921,963 entitled "Injection Molding Machine Construction and Method of Operation", U.S. Pat. No. 3,904,078 entitled "Injection Molding Machine having a Programming Device and a Method of Operating the Machine", and U.S. Pat. No. 5,200,208 entitled "Multi-station Rubber Injection Molding Machine".

Examples of injection moldable thermoplastic materials which may be utilized in accordance with the present invention can be found in U.S. Pat. Nos.: 4,902,738 to Mitsuno et al. on Feb. 20, 1990, entitled "Thermoplastic Elastomer Composition and Process for Producing Same"; 5,100,960 to Grigo et al. on Mar. 31, 1992, entitled "Thermoplastic Molding Composition of a Polysiloxane Block Copolycarbonate and a Polycarbonate Based on Certain Dihydroxydiphenylcyclo Alkanes"; 5,187,230 entitled "Rubber-modified Polymer Blends of Polycarbonate and PETG"; and 5,095,063 to Okada et al. on Mar. 10, 1992, entitled "Polypropylene Composition".

Examples of injection moldable rubber compositions which may be utilized in accordance with the present invention can be found in U.S. Pat. Nos.: 5,082,886 to Jeram at al. on Jan. 21, 1992, entitled "Low Compression Set, Oil and Fuel Resistant, Liquid Injection Moldable, Silicone Rubber"; 5,010,136 to Ohmae et al. on Apr. 23, 1991, entitled "Process for Producing Impact-resistant Polyamide Resin Compositions"; and 5,145,997 to Levif et al. on Sep. 8, 1992, entitled "Rubbery Composition and Polynorbornene-based Thermoplastic Elastomer with Improved Heat Stability".

Examples of injection-compression molding machines and/or methods can be found in U.S. Pat. No. 5,059,364 entitled "Injection-Compression Molding Machine and Method of Molding by Using the Machine", U.S. Pat. No. 5,057,255 entitled "Molding Method and Molding Apparatus in an Injection-Compression Molding Machine", and U.S. Pat. No. 5,044,925 entitled "Injection-Compression Mold".

An example of a process control can be found in U.S. Pat. No. 4,146,601 entitled "Injection Mold Process Control".

Examples of hot runner or nozzle valves or shutters can be found in U.S. Pat. No. 5,078,589 entitled "Multicavity Injection Molding Apparatus having Precision Adjustment and Shut Off of Injection Flow to Individual Mold Cavities", U.S. Pat. No. 5,071,340 entitled "Cooling Arrangement for Valve Stem Gates in Hot Runner Injection Molding Machine Systems", and U.S. Pat. No. 5,067,893 entitled "Injection Molding Apparatus with Shut Off Valve Pin Actuation System".

Examples of a clamping apparatus can be found in U.S. Pat. No. 5,066,217 entitled "Clamping Apparatus for an Injection Molding Machine", U.S. Pat. No. 4,781,568 entitled "Mold Clamping Unit of Injection Molding Machine", and U.S. Pat. No. 4,545,756 entitled "Hydraulic Clamping Apparatus for an Injection Molding Machine".

Examples of a transport apparatus and gripper device can be found in U.S. Pat. No. 5,087,315 entitled "Fabric Lifting Apparatus and Method", U.S. Pat. No. 5,056,246 entitled "Device for Taking Trousers Off an Ironing Machine", U.S. Pat. No. 5,048,815 entitled "Gripper Device on Sheet-Feed Rotary Printing Machines", and U.S. Pat. No. 4,889,221 entitled "Vending Machine for Newspapers or Periodicals".

Examples of bicycle shifting mechanisms which may be utilized in accordance with the embodiments of the present invention, may be disclosed in the following U.S. patents: U.S. Pat. No. 4,900,291, which issued to Patterson on Feb. 13, 1990, entitled "Bicycle Gear Shifting Method and Apparatus"; No. 4,938,733, which issued to Patterson on Jul. 03, 1990, entitled "Bicycle Gear Shifting Method and Apparatus"; No. 5,009,629, which issued to Tagawa on Apr. 23, 1991, entitled "Shift Lever Assembly for Bicycle"; No. 5,102,372, which issued to Patterson et al on Apr. 07, 1992, entitled "Bicycle Derailleur Cable Actuating System"; No. 5,135,441, which issued to Gelbien on Aug. 04, 1992, entitled "Shifting Apparatus for Multispeed Bicycles"; No. 5,178,033, which issued to Kund on Jan. 12, 1993, entitled "Bicycle Gear Display"; No. 5,186,071, which issued to Iwasaki on Feb. 16, 1993, entitled "Bicycle Speed Change Lever Assembly"; No. 5,186,072, which issued to Nagano on Feb. 16, 1993, entitled "Bicycle Speed Control System for Controlling a Change Speed Device Through a Change Speed Wire"; No. 5,191,807, which issued to Hsu on Mar. 09, 1993, entitled "Indexed Gear-Shift Mechanism"; No. 5,197,927, which issued to Patterson et al on Mar. 30, 1993, entitled "Bicycle Derailleur Cable Actuating System"; No. 5,205,794, which issued to Browning on Apr. 27, 1993, entitled "Shift Mechanism for Bicycle"; No. 5,213,005, which issued to Nagano on May 25, 1993, entitled "Speed Control Devise for Bicycle Derailleur"; No. 5,241,878, which issued to Nagano on Sep. 07, 1993, entitled "Bicycle Control Devise"; No. 5,287,766, which issued to Nagano on Feb. 22, 1994, entitled "Speed Control Apparatus for a Bicycle"; No. 5,303,608, which issued to Iwasaki on Apr. 19, 1994, entitled "Bicycle Speed Change Lever Assembly"; No. 5,315,891, which issued to Tagawa on May 31, 1994, entitled "Bicycle Speed Change Operation Assembly"; No. 5,322,487, which issued to Nagano on Jun. 21, 1994, entitled "Self-Contained Change Speed Apparatus with Shaped Pawls to Equalize a Shifting Force for a Bicycle"; No. 5,325,735, which issued to Nagano on Jul. 05, 1994, entitled "Bicycle Speed Control Apparatus Having a Speed Indicator"; No. 5,354,240, which issued to Hunter, Jr. on Oct. 11, 1994, entitled "Variable Transmission"; No. 5,355,745, which issued to Wu and Hsuan on Oct. 18, 1994, entitled "Bicycle Speed Controller"; and No. 5,361,645, which issued to Feng and Kang on Nov. 08, 1994, entitled "Shift Lever Apparatus for Use in Bicycle".

Some examples of latching shifters which may be used in accordance with the embodiments of the present invention, may be disclosed in the following U.S. patents: U.S. Pat. No. 5,421,219 entitled "Bicycle Speed Change System, Bicycle Speed Change Method and Bicycle Speed Change Operation Assembly" to Maeda and Bridgestone; No. 5,390,565 entitled "Bicycle Speed Change System, Bicycle Speed Change Method and Bicycle Speed Change Operation Assembly" to Maeda and Bridgestone; No. 5,315,891 entitled "Bicycle Speed Change Operation Assembly" to Maeda; and No. 5,241,877 entitled "Gear Selector" issued Sep. 7, 1993.

Some examples of latching shifters which may be used in accordance with the embodiments of the present invention, may be disclosed in the following Federal Republic of Germany Patents: No. DE 32 15 426 A1 to Fichtel & Sachs and No. DE 38 23 741 A1 to Shimano.

An additional example of latching shifters which may be used in accordance with the embodiments of the present invention, may be found in French Patent No. 2 540 818.

Some examples of twist grip shifters which may be used in accordance with the embodiments of the present invention, may be disclosed in the following U.S. patents: U.S. Pat. No. 3,218,879 entitled "Twist Grip Controls" to Raleigh; No. 5,134,897 entitled "Twist-grip Device for Operating the Gears of a Bicycle" to Campagnolo; No. 4,938,733 entitled "Bicycle Gear Shifting Method and Apparatus" to Sram Corporation; and No. 4,900,291 entitled "Bicycle Gear Shifting Method and Apparatus" to Sram Corporation.

Additional examples of twist grip shifters and related components which may be used in accordance with the embodiments of the present invention, may be disclosed in the following Federal Republic of Germany Patents: No. DE 32 15 427 A1 to Fichtel & Sachs and No. DE 37 27 933 A1.

Types of lip seals which may be utilized in accordance with the present invention may be disclosed in the following U.S. patents: U.S. Pat. No. 5,184,684 to Kohlman on Feb. 9, 1993; No. 5,209,497 to Von Bergen et al. on Sep. 5, 1991; No. 5,209,495 to Ruff et al. on May 11, 1993; No. 5,213,342 to Weber on May 25, 1993; No. 5,267,739 to Vaughan on Dec. 7, 1993; No. 5,324,046 to Tomatis on Jun. 28, 1994; and No. 5,370,404 to Klein et al. on Dec. 6, 1994.

Types of friction seals which may be utilized in accordance with the present invention may be disclosed in the following U.S. patents: U.S. Pat. No. 5,186,548 to Sink on Feb. 16, 1993; No. 5,207,436 to Lederman on May 4, 1993; No. 5,244,113 to Stymiest on Sep. 14, 1993; No. 5,372,389 to Tam et al. on Jun. 22, 1993; No. 5,409,181 to Patrick on Jul. 26, 1993; and No. 5,417,441 to Hill on May 23, 1995.

Types of contactless seals which may be utilized in accordance with the present invention may be disclosed in the following U.S. patents: U.S. Pat. No. 5,228,700 to Biesold et al. on Mar. 2, 1992; and No. 5,368,314 to Victor at al. on Nov. 29, 1994.

Types of shifting actuators and components thereof which may be utilized in accordance with the present invention may be disclosed in the following U.S. patents: U.S. Pat. No. 4,055,093 to Ross; No. 4,194,408 to Hedrich; No. 4,201,095 to Cirami; No. 4,267,744 to Yamasaki; No. 4,384,864 to Bonnard; No. 4,504,250 to Juy; No. 4,599,079 to Chappell; No. 4,693,700 to Chappell; No. 5,033,991 to McLaren; and No. 5,135,441 to Gelbien.

Types of transmissions for bicycles, and components thereof, which may be utilized in accordance with the embodiments of the present invention may be disclosed in the following U.S. patents: U.S. Pat. No. 3,944,253 to Ripley on Mar. 16, 1976, entitled "Infinitely Variable Transmission for Pedal-Driven Vehicles"; No. 4,973,297 to Bergles on Nov. 27, 1990, entitled "Multispeed Drive Hub With More Than Three Speeds"; No. 4,721,015 to Hartmann on Jan. 26, 1988, entitled "Three Stage Planetary Driving Wheel for Pedal Powered Vehicles"; No. 4,063,469 to Bergles on Dec. 20, 1977, entitled "Multiple Speed Hub for a Vehicle Wheel"; No. 4,727,965 to Zach et al.; No. 4,721, 013 to Steuer et al.; No. 4,651,853 to Bergles et al.; No. 4,628,769 to Nagano; No. 4,400,999 to Steuer; No. 5,273, 500; and No. 5,443,279 to Nurnberger.

Examples of bicycle derailleur cable actuating systems which may be utilized in accordance with the present invention may be found in the following U.S. patents: U.S. Pat. No. 5,197,927 to Patterson et al. on Mar. 30, 1993; No. 5,102,372 to Patterson et al. on Apr. 7, 1992; and No. 4,938,733 to Patterson on Jul. 3, 1990.

Examples of bicycles, in which the embodiments of the present invention may be employed, may be found in the following U.S. patents: U.S. Pat. No. 5,324,059, which issued to Bryne on Jun. 28, 1994; No. 5,312,125 which issued to Tse-acu-a-o-shu on May 17, 1994; No. 5,242,182, which issued to Bezerra et al. on Sep. 7, 1993; and No. 5,240,268, which issued to Allsop et al. on Aug. 31, 1993.

Examples of derailleurs, which may be utilized in accordance with the embodiments of the present invention, may be found in the following U.S. patents: U.S. Pat. No. 4,439,171, which issued to Bergles on Mar. 27, 1984; No. 4,231,264, which issued to Bergles on Nov. 4, 1980; No. 4,183,255, which issued to Leiter on Jan. 15, 1980; and No. 3,927,904, which issued to Bergles on Dec. 23, 1975.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicants option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A handlebar mountable twist grip shifter for shifting bicycle gears, said twist grip shifter comprising:

a shift actuator device to be mounted on a handlebar generally coaxially with a handlebar;

a control cable;

said control cable having a first end and a second end;

said first end of said control cable being connected to said shift actuator device, said second end of said control cable to be operatively connected to gearing;

said shift actuator device comprising:

a rotatable grip part, said rotatable grip part having an axis of rotation, the axis of rotation defining an axial direction parallel to the axis of rotation;

said rotatable grip part to be operatively connected to gearing;

a cable winding mechanism;

said cable winding mechanism comprising apparatus to actuate said first end of said control cable;

said rotatable grip part comprising:

a first end and a second end disposed a substantial axial distance from one another;

an inner portion;
said inner portion comprising apparatus to non-rotationally connect said inner portion to said cable winding mechanism;
an outer portion;
said outer portion being disposed about said inner portion and being non-rotatably attached to said inner portion;
said outer portion comprising a surface to be gripped by the fingers of a rider;
at least one projection disposed on said surface of said outer portion, said at least one projection extending in a radial direction with respect to the axis of rotation; and
said at least one projection comprising a continuous and smoothly changing surface, said continuous and smoothly changing surface extending in the axial direction over a substantial portion of said rotatable grip part from said first end of said rotatable grip part to said second end of said rotatable grip part.

2. The gear shifter according to claim 1 wherein said at least one projection comprises a one-piece projection.

3. The gear shifter according to claim 2 wherein:
said continuous and smoothly changing surface being a first surface;
said at least one projection comprises two additional continuous and smoothly changing surfaces extending in the axial direction;
said two additional continuous and smoothly changing surfaces being second and third surfaces;
said first surface being disposed between and adjoining said second surface and said third surface; and
said second surface and said third surface being disposed with respect to one another to form a peak at said first surface.

4. The gear shifter according to claim 3 wherein:
said at least one projection comprises at least two projections disposed on said surface of said outer portion;
said outer portion having a circumference extending about the axis of rotation;
said peak of one of said at least two projections and said peak of the other one of said at least two projections being disposed a circumferential distance from one another on said surface of said outer portion; and
said circumferential distance being substantially equal to the distance between two joints of the index finger of an adult rider, said peaks being configured and disposed to engage in two joints of the index finger of an adult rider.

5. The gear shifter according to claim 4 wherein:
said at least two projections each have a cross-section defined transverse to the axis of rotation, said cross-section having a generally triangular shape; and
said first, second and third surfaces extend in the axial direction substantially from said first end of said rotatable grip part to said second end of said rotatable grip part.

6. The gear shifter according to claim 5 wherein:
said at least two projections comprises at least six projections disposed on said surface of said outer portion, each of said at least six projections being disposed at a circumferential distance from an adjacent one of said at least six projections, said circumferential distance being substantially equal to the distance between the first two joints of the index finger of an adult rider;

said rotatable grip part comprises a plurality of additional projections, each of said additional projections being disposed between two of said at least six projections and extending axially along said surface of said outer portion;
each of said additional projections has a first part and a second part, said first part being disposed adjacent said first end of said rotatable grip part and said second part being disposed adjacent said second end of said rotatable grip part;
said first part and said second part of each of said additional projections being substantially axially aligned with one another along said surface of said outer portion;
said surface of said outer portion comprises a substantially smooth area disposed axially between said first part and said second part of each of said additional projections, said substantially smooth area comprising an area of interruption of said additional projections; and
said areas of interruption being configured and disposed for engaging with the portion of the index finger of an adult rider which is located between two joints of the index finger.

7. The gear shifter according to claim 6 wherein:
said second surface and said third surface are disposed with respect to one another to form about a 90° angle at said peak;
said second surface comprises a substantially convex surface;
said third surface comprises a substantially flat surface facing away from said substantially convex surface, said substantially flat surface of said third surface being disposed to receive force from the index finger of an adult rider to wind up said control cable in said cable winding mechanism;
said inner portion comprises a first injection-molded part, said first injection-molded part comprising a first molding compound;
said outer portion comprises a second injection-molded part, said second injection-molded part comprising a second molding compound comprising rubber material;
said second injection-molded part being disposed on said first injection-molded part to non-rotationally connect said first injection-molded part and said second injection-molded part to one another;
said first molding compound being different from said second molding compound;
said rotatable grip part being detachably connected to said cable winding mechanism;
said first end of said rotatable grip part being disposed adjacent said cable winding mechanism;
said second end of said rotatable grip part to be disposed adjacent a fixed hand grip;
said rotatable grip part has a first portion, a second portion and a third portion;
said first portion is disposed immediately adjacent said first end of said rotatable grip part;
said second portion is disposed immediately adjacent said second end of said rotatable grip part;
said third portion is disposed between said first portion and said second portion of said rotatable grip part;
said first portion and said second portion each having a diameter defined transverse to the axis of rotation, said diameter of said first portion being substantially greater than said diameter of said second portion;

said third portion having a frusto-conical shape and forming a transition between said first portion and said second portion;

each of said areas of interruption being disposed at said second portion of said rotatable grip part;

each of said at least six projections extend axially along all of said first, second and third portions of said rotatable grip part;

each of said first, second and third surfaces of each of said at least six projections together comprise a curved shape having a plurality of radial heights, each of said at least six projections having a maximum radial height adjacent a center of said second portion of said rotatable grip part and a minimum radial height adjacent said third portion of said rotatable grip part; and each of said at least six projections having an intermediate radial height adjacent said first portion of said rotatable grip part, said intermediate radial height being less than said maximum radial height and greater than said minimum radial height.

8. A twist grip for a handlebar mountable twist grip shifter for shifting bicycle gears, said twist grip comprising:

a rotatable grip part, said rotatable grip part having an axis of rotation, the axis of rotation defining an axial direction parallel to the axis of rotation;

said rotatable grip part to be operatively connected to gearing;

said rotatable grip part comprising:

a first end and a second end disposed a substantial axial distance from one another;

an inner portion;

said inner portion comprising apparatus to non-rotationally connect said inner portion to a cable winding mechanism of a twist-grip shifter;

an outer portion;

said outer portion being disposed about said inner portion and being non-rotatably attached to said inner portion;

said outer portion comprising a surface to be gripped by the fingers of a rider;

at least one projection disposed on said surface of said outer portion, said at least one projection extending in a radial direction with respect to the axis of rotation; and said at least one projection comprising a continuous and smoothly changing surface, said continuous and smoothly changing surface extending in the axial direction over a substantial portion of said rotatable grip part from said first end of said rotatable grip part to said second end of said rotatable grip part.

9. The twist grip according to claim 8 wherein said at least one projection comprises a one-piece projection.

10. The twist grip according to claim 9 wherein:

said continuous and smoothly changing surface being a first surface;

said at least one projection comprises two additional continuous and smoothly changing surfaces extending in the axial direction;

said two additional continuous and smoothly changing surfaces being second and third surfaces;

said first surface being disposed between and adjoining said second surface and said third surface; and said second surface and said third surface being disposed with respect to one another to form a peak at said first surface.

11. The twist grip according to claim 10 wherein:

said at least one projection comprises at least two projections disposed on said surface of said outer portion;

said outer portion having a circumference extending about the axis of rotation;

said peak of one of said at least two projections and said peak of the other one of said at least two projections being disposed at a circumferential distance from one another on said surface of said outer portion; and said circumferential distance being substantially equal to the distance between two joints of the index finger of an adult rider, said peaks being configured and disposed to engage in two bends of the index finger of an adult rider.

12. The twist grip according to claim 11 wherein:

said inner portion comprises a first injection-molded part, said first injection-molded part comprising a first molding compound;

said outer portion comprises a second injection-molded part, said second injection-molded part comprising a second molding compound comprising elastic material; and said second injection-molded part being disposed on said first injection-molded part to non-rotationally connect said first injection-molded part and said second injection-molded part to one another.

13. The twist grip according to claim 12 wherein:

said at least two projections each have a cross-section defined transverse to the axis of rotation, said cross-section having a generally triangular shape; and said first, second and third surfaces extend in the axial direction substantially from said first end of said rotatable grip part to said second end of said rotatable grip part.

14. The twist grip according to claim 13 wherein:

said at least two projections comprises at least six projections disposed on said surface of said outer portion, each of said at least six projections being disposed at a circumferential distance from an adjacent one of said at least six projections, said circumferential distance being substantially equal to the distance between the first two joints of the index finger of an adult rider;

said rotatable grip part comprises a plurality of additional projections, each of said additional projections being disposed between two of said at least six projections and extending axially along said surface of said outer portion;

each of said additional projections has a first part and a second part, said first part being disposed adjacent said first end of said rotatable grip part and said second part being disposed adjacent said second end of said rotatable grip part;

said first part and said second part of each of said additional projections being substantially axially aligned with one another along said surface of said outer portion;

said surface of said outer portion comprises a substantially smooth area disposed axially between said first part and said second part of each of said additional projections, said substantially smooth area comprising an area of interruption of said additional projections; and said areas of interruption being configured and disposed for engaging with the portion of the index finger of an adult rider which is located between two joints of the index finger.

15. The twist grip according to claim 14 wherein said second surface and said third surface are disposed with respect to one another to form about a 90° angle at said peak.

16. The twist grip according to claim 15 wherein:
said second surface comprises a substantially convex surface;
said third surface comprises a substantially flat surface facing away from said substantially convex surface, said substantially flat surface of said third surface being disposed to receive force from the index finger of an adult rider to wind up a control cable in a cable winding mechanism of a twist grip shifter.

17. The twist grip according to claim 16 wherein:
said first injection-molded part is coated with said second injection-molded part to non-rotationally connect said first injection-molded part and said second injection-molded part to one another;
said first molding compound being different from said second molding compound;
said rotatable grip part to be detachably connected to a cable winding mechanism of a twist grip shifter;
said first end of said rotatable grip part to be disposed adjacent a cable winding mechanism of a twist grip shifter;
said second end of said rotatable grip part to be disposed adjacent a fixed hand grip of a twist grip shifter;
said rotatable grip part has a first portion, a second portion and a third portion;
said first portion is disposed immediately adjacent said first end of said rotatable grip part;
said second portion is disposed immediately adjacent said second end of said rotatable grip part;
said third portion is disposed between said first portion and said second portion of said rotatable grip part;
said first portion and said second portion each having a diameter defined transverse to the axis of rotation, said diameter of said first portion being substantially greater than said diameter of said second portion;
said third portion having a frusto-conical shape and forming a transition between said first portion and said second portion;
said elastic material of said outer portion comprises a rubber material;
each of said areas of interruption being disposed at said second portion of said rotatable grip part;
each of said at least six projections extend axially along all of said first, second and third portions of said rotatable grip part;
each of said first, second and third surfaces of each of said at least six projections together comprise a curved shape having a plurality of radial heights, each of said at least six projections having a maximum radial height adjacent a center of said second portion of said rotatable grip part and a minimum radial height adjacent said third portion of said rotatable grip part; and
each of said at least six projections having an intermediate radial height adjacent said first portion of said rotatable grip part, said intermediate height being less than said maximum radial height and greater than said minimum radial height.

18. A method of making a handlebar mountable twist-grip shifter for the handlebar of a bicycle, the handlebar mountable twist-grip shifter having a rotatable outer part and an inner part for transmitting the torque received from the rotatable outer part, said method comprising:
providing an injection molding apparatus;
providing a first mold, the first mold being configured for forming a first predetermined shape of a handlebar mountable twist-grip shifter for the handlebar of a bicycle;
providing a second mold, the second mold being configured for forming a second predetermined shape of a handlebar mountable twist-grip shifter for the handlebar of a bicycle;
providing a first molding compound;
providing a second molding compound;
said method further comprising forming the inner part of the twist-grip shifter by:
injecting, with the injection molding apparatus, the first molding compound into the first mold;
permitting the first molding compound to harden;
removing the inner part of the handlebar mountable twist-grip shifter from the first mold;
said method further comprising forming the rotatable outer part of the handlebar mountable twist-grip shifter by:
disposing the inner part of the handlebar mountable twist-grip shifter inside the second mold;
injecting, with the injection molding apparatus, the second molding compound into the second mold and around the inner part of the handlebar mountable twist-grip shifter;
permitting the second molding compound to harden on the inner part of the handlebar mountable twist-grip shifter; and
removing the inner part and the rotatable outer part of the handlebar mountable twist-grip shifter from the second mold.

19. The method of making a handlebar mountable twist-grip shifter according to claim 18, wherein:
said step of injecting, with the injection molding apparatus, the first molding compound into the first mold comprises injecting one of a plastic material and a thermoplastic material into the first mold; and
said step of injecting, with the injection molding apparatus, the second molding compound into the second mold and around the inner part of the handlebar mountable twist-grip shifter comprises injecting one of an elastic material and a rubber material into the second mold and around the inner part of the handlebar mountable twist-grip shifter.

20. The method of making a handlebar mountable twist-grip shifter according to claim 19, wherein said step of forming the rotatable outer part of the handlebar mountable twist-grip shifter further comprises:
providing a transport device to insert functional material into the second mold;
positioning the functional material inside the second mold with the transport device; and
placing the functional material into contact with a holding element to hold the functional material inside the second mold.

* * * * *